US011425529B2

(12) United States Patent
Mehta et al.

(10) Patent No.: US 11,425,529 B2
(45) Date of Patent: Aug. 23, 2022

(54) SYSTEMS AND METHODS FOR EMERGENCY COMMUNICATIONS

(71) Applicant: RapidSOS, Inc., New York, NY (US)

(72) Inventors: Anil Mehta, Makanda, IL (US); Michael John Martin, Long Island City, NY (US); Nicholas Edward Horelik, Long Island City, NY (US); Reinhard Ekl, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 16/378,363

(22) Filed: Apr. 8, 2019

(65) Prior Publication Data

US 2019/0306664 A1    Oct. 3, 2019

Related U.S. Application Data

(63) Continuation of application No. 15/589,847, filed on May 8, 2017, now abandoned.

(Continued)

(51) Int. Cl.
*H04W 4/024* (2018.01)
*H04L 12/66* (2006.01)
(Continued)

(52) U.S. Cl.
CPC ............ *H04W 4/024* (2018.02); *G06Q 50/10* (2013.01); *H04L 12/66* (2013.01); *H04M 11/04* (2013.01); *H04W 4/02* (2013.01); *H04W 4/90* (2018.02)

(58) Field of Classification Search
CPC ....... H04W 4/90; H04W 4/029; H04W 76/50; H04W 4/023; H04W 4/046; H04W 4/024; H04W 4/021; H04W 4/025; H04W 4/026; H04W 4/027; H04W 4/043; H04W 4/14; H04W 4/33; H04W 4/44; H04W 64/00; G08B 25/016; G08B 25/005; G08B 25/006; G08B 27/001; G08B 25/009;
(Continued)

(56) References Cited

U.S. PATENT DOCUMENTS 5,379,337 A    1/1995  Castillo et al.
5,479,482 A   12/1995  Grimes
(Continued)

FOREIGN PATENT DOCUMENTS

CA    2662606 A1   10/2009
CA    2697986 A1    9/2010
(Continued)

OTHER PUBLICATIONS

Abel et al. Semantics + Filtering + Search = Twitcident exploring information in social web streams. HT'1—Proceedings of 23rd ACM Conference on Hypertext and Social Media (10 pgs) (2012).
(Continued)

*Primary Examiner* — Golam Sorowar
(74) *Attorney, Agent, or Firm* — Wilson Sonsini Goodrich & Rosati

(57) ABSTRACT

Described herein are methods, devices, media, and systems for automatic public safety answering point lookup, location tracking of first responders, and facilitating data exchange during emergency communications.

20 Claims, 14 Drawing Sheets

Related U.S. Application Data

(60) Provisional application No. 62/333,538, filed on May 9, 2016, provisional application No. 62/339,310, filed on May 20, 2016, provisional application No. 62/377,881, filed on Aug. 22, 2016.

(51) Int. Cl.
*H04W 4/90* (2018.01)
*G06Q 50/10* (2012.01)
*H04M 11/04* (2006.01)
*H04W 4/02* (2018.01)

(58) Field of Classification Search
CPC ...... G08B 21/10; G08B 25/001; G08B 25/08; G08B 27/005; G08B 27/006; G08B 19/005; G08B 21/0211; G08B 21/0415; G08B 21/0423; G08B 21/0461; G08B 21/18; G08B 25/00; H04M 3/5116; H04M 1/72538; H04M 2242/04; H04M 1/72536; H04M 1/72541; H04M 2203/252; H04M 2207/18; H04M 3/42357; H04M 3/42382; H04M 11/04; H04M 2201/50; H04M 2203/1058; H04M 2203/254; H04M 2203/553; H04M 2203/557; H04M 2242/15; H04M 2250/12
See application file for complete search history.

(56) References Cited

U.S. PATENT DOCUMENTS

| | | |
|---|---|---|
| 5,563,931 A | 10/1996 | Bishop et al. |
| 5,596,625 A | 1/1997 | LeBlanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lighter et al. |
| 6,262,655 B1 | 7/2001 | Yoshioka et al. |
| 6,292,687 B1 | 9/2001 | Lowell et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,494,868 B2 | 7/2013 | Saalsaa |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,761,721 B2 | 6/2014 | Li |
| 8,792,867 B1 | 7/2014 | Negahban et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 | 4/2015 | Hodgson et al. |
| 9,071,643 B2 | 6/2015 | Saito et al. |
| 9,077,676 B2 | 7/2015 | Price et al. |

(56) References Cited

U.S. PATENT DOCUMENTS

| | | |
|---|---|---|
| 9,078,092 B2 | 7/2015 | Piett et al. |
| 9,094,816 B2 | 7/2015 | Maier et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,497,585 B1 | 11/2016 | Cooley et al. |
| 9,503,876 B2 | 11/2016 | Saito et al. |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| 9,629,185 B1 | 4/2017 | Gluckman et al. |
| 9,635,534 B2 | 4/2017 | Maier et al. |
| 9,648,479 B2 | 5/2017 | Michaelis et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,877,177 B2 | 1/2018 | Lesage et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,998,507 B2 | 6/2018 | Mehta et al. |
| 10,002,375 B1 | 6/2018 | Scythes et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,142,469 B2 | 11/2018 | Klaban |
| 10,142,816 B2 | 11/2018 | Cavendish et al. |
| 10,165,431 B2 | 12/2018 | Bozik et al. |
| 10,708,412 B1 | 7/2020 | Killpack |
| 10,922,776 B2 | 2/2021 | Kumar et al. |
| 2001/0036224 A1 | 11/2001 | Demello et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2003/0195775 A1 | 10/2003 | Hampton et al. |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0176403 A1 | 8/2005 | Lalos |
| 2005/0190053 A1 | 9/2005 | Dione |
| 2005/0190892 A1 | 9/2005 | Dawson et al. |
| 2005/0220277 A1 | 10/2005 | Blalock et al. |
| 2005/0239477 A1 | 10/2005 | Kim et al. |
| 2005/0242944 A1 | 11/2005 | Bankert et al. |
| 2005/0282518 A1 | 12/2005 | D'Evelyn et al. |
| 2005/0285181 A1 | 12/2005 | Yasui et al. |
| 2006/0085275 A1 | 4/2006 | Stokes et al. |
| 2006/0109960 A1 | 5/2006 | D'Evelyn et al. |
| 2006/0154642 A1 | 7/2006 | Scannell, Jr. |
| 2006/0217105 A1 | 9/2006 | Kumar P S et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2008/0309486 A1 | 12/2008 | McKenna et al. |
| 2009/0018875 A1 | 1/2009 | Monatesti et al. |
| 2009/0041206 A1 | 2/2009 | Hobby et al. |
| 2009/0134982 A1 | 5/2009 | Robertson et al. |
| 2009/0186596 A1 | 7/2009 | Kaltsukis et al. |
| 2009/0214000 A1 | 8/2009 | Patel et al. |
| 2009/0257345 A1 | 10/2009 | King |
| 2009/0280771 A1 | 11/2009 | Bolin |
| 2009/0284348 A1 | 11/2009 | Pfeffer |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159976 A1 | 6/2010 | Marocchi et al. |
| 2010/0161727 A1 | 6/2010 | Shaffer et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0261448 A1 | 10/2010 | Peters |
| 2010/0262668 A1* | 10/2010 | Piett ............... H04W 4/90 709/206 |
| 2010/0291907 A1 | 11/2010 | MacNaughtan et al. |
| 2010/0317317 A1* | 12/2010 | Maier ............ H04W 4/029 455/404.2 |
| 2011/0009086 A1 | 1/2011 | Poremba et al. |
| 2011/0029600 A1 | 2/2011 | Theimer |
| 2011/0044444 A1 | 2/2011 | Abramson |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0151829 A1 | 6/2011 | Velusamy et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0281547 A1 | 11/2011 | Cordero |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0066139 A1 | 3/2012 | Guzman et al. |
| 2012/0092161 A1 | 4/2012 | West |
| 2012/0144019 A1 | 6/2012 | Zhu |
| 2012/0157795 A1* | 6/2012 | Chiu ............... G06F 19/3418 600/301 |
| 2012/0202428 A1 | 8/2012 | Mirbaha et al. |
| 2012/0210325 A1 | 8/2012 | de Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0012155 A1 | 1/2013 | Forstall et al. |
| 2013/0030825 A1 | 1/2013 | Bagwandeen et al. |

(56) References Cited

U.S. PATENT DOCUMENTS

| | | |
|---|---|---|
| 2013/0036175 A1 | 2/2013 | Lau |
| 2013/0052983 A1 | 2/2013 | Fletcher et al. |
| 2013/0065569 A1 | 3/2013 | Leipzig et al. |
| 2013/0082837 A1 | 4/2013 | Cosentino et al. |
| 2013/0084824 A1 | 4/2013 | Hursey |
| 2013/0102351 A1 | 4/2013 | Mo |
| 2013/0120106 A1 | 5/2013 | Cauwels et al. |
| 2013/0120459 A1 | 5/2013 | Dickinson et al. |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0260710 A1* | 10/2013 | H R .................. H04W 4/90 455/404.1 |
| 2013/0309994 A1 | 11/2013 | Hellwig et al. |
| 2013/0331055 A1 | 12/2013 | Mckown et al. |
| 2013/0331058 A1 | 12/2013 | Harvey |
| 2014/0031000 A1 | 1/2014 | Hanover |
| 2014/0045450 A1 | 2/2014 | Ballantyne et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0096195 A1* | 4/2014 | Morgan ............... G06F 21/43 726/4 |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0218537 A1 | 8/2014 | Nepo |
| 2014/0222462 A1 | 8/2014 | Shakil et al. |
| 2014/0248848 A1 | 9/2014 | Mufti et al. |
| 2014/0253326 A1 | 9/2014 | Cho et al. |
| 2014/0257846 A1* | 9/2014 | Hermiz ............... G06F 19/328 705/3 |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1* | 12/2014 | deCharms ........... H04W 4/021 348/14.02 |
| 2014/0370836 A1 | 12/2014 | Gladstone |
| 2014/0370839 A1 | 12/2014 | Hatton |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0054639 A1 | 2/2015 | Rosen |
| 2015/0055453 A1 | 2/2015 | Chaki et al. |
| 2015/0055554 A1 | 2/2015 | Sedlacek et al. |
| 2015/0065082 A1 | 3/2015 | Sehgal |
| 2015/0080021 A1 | 3/2015 | Bietz et al. |
| 2015/0081209 A1 | 3/2015 | Yeh et al. |
| 2015/0081927 A1 | 3/2015 | Xu et al. |
| 2015/0085997 A1 | 3/2015 | Biage et al. |
| 2015/0087259 A1 | 3/2015 | Hinsen |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0112883 A1 | 4/2015 | Orduna et al. |
| 2015/0137972 A1 | 5/2015 | Nepo et al. |
| 2015/0140936 A1 | 5/2015 | Sachs et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1 | 2/2016 | Ahmed et al. |
| 2016/0065748 A1 | 3/2016 | Li et al. |
| 2016/0088455 A1* | 3/2016 | Bozik .................. H04W 4/90 370/225 |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0316493 A1 | 10/2016 | Davis et al. |
| 2016/0330769 A1* | 11/2016 | Edge .................. H04W 4/90 |
| 2016/0337831 A1 | 11/2016 | Piett et al. |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0078226 A1 | 3/2017 | Daly et al. |
| 2017/0099579 A1 | 4/2017 | Ryan et al. |
| 2017/0108862 A1 | 4/2017 | Mikkelsen |
| 2017/0116845 A1 | 4/2017 | See et al. |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1 | 11/2017 | Mehta et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0039737 A1 | 2/2018 | Dempers et al. |
| 2018/0053401 A1 | 2/2018 | Martin et al. |
| 2018/0077282 A1 | 3/2018 | Herron et al. |
| 2018/0077553 A1 | 3/2018 | Gideon, III |
| 2018/0150928 A1 | 5/2018 | Dejewski et al. |
| 2018/0152563 A1 | 5/2018 | Mehta et al. |
| 2018/0176271 A1 | 6/2018 | Laurent |
| 2018/0242133 A1 | 8/2018 | Anand et al. |
| 2018/0249315 A1 | 8/2018 | Mehta et al. |
| 2018/0262544 A1 | 9/2018 | Mehta et al. |
| 2018/0310159 A1 | 10/2018 | Katz et al. |
| 2018/0352408 A1 | 12/2018 | Baer et al. |
| 2019/0020993 A1 | 1/2019 | Nguyen |
| 2019/0073894 A1 | 3/2019 | Mehta et al. |
| 2019/0104395 A1 | 4/2019 | Mehta et al. |
| 2019/0130719 A1 | 5/2019 | D'Amico |
| 2019/0166480 A1 | 5/2019 | Rauner |
| 2019/0281165 A1 | 9/2019 | Mehta et al. |
| 2019/0320310 A1 | 10/2019 | Horelik et al. |
| 2019/0327597 A1 | 10/2019 | Katz et al. |
| 2019/0335310 A1 | 10/2019 | Anand et al. |
| 2019/0380020 A1 | 12/2019 | Pellegrini et al. |
| 2020/0059776 A1 | 2/2020 | Martin et al. |

(56) References Cited

U.S. PATENT DOCUMENTS

| | | |
|---|---|---|
| 2020/0068374 A1 | 2/2020 | Mehta et al. |
| 2020/0126174 A1 | 4/2020 | Halse et al. |
| 2020/0221279 A1 | 7/2020 | Mehta et al. |
| 2021/0006961 A1 | 1/2021 | King-Berkman et al. |
| 2021/0014659 A1 | 1/2021 | Mehta et al. |
| 2021/0037368 A1 | 2/2021 | Leavitt et al. |
| 2021/0120394 A1 | 4/2021 | Martin et al. |
| 2022/0103995 A1 | 3/2022 | Horelik et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 106021508 A | 10/2016 |
| EP | 2161912 A2 | 3/2010 |
| JP | H10314133 A | 12/1998 |
| JP | H1170086 A | 3/1999 |
| JP | 2006319946 A | 11/2006 |
| JP | 2006334369 A | 12/2006 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0165763 A2 | 9/2001 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |
| WO | WO-2020172612 A1 | 8/2020 |
| WO | WO-2020205033 A1 | 10/2020 |
| WO | WO-2021034859 A1 | 2/2021 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).
Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/162,171, filed Oct. 16, 2018.
Co-pending U.S. Appl. No. 16/209,892, filed Dec. 4, 2018.
Co-pending U.S. Appl. No. 16/271,634, filed Feb. 8, 2019.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency No. Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
National Emergency No. Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-v1_Functional_Interface_Standards_NG911J3.pdf [retrieved on Feb. 5, 2018] (121 pgs).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Preliminary Report on Patentability dated May 17, 2018.
PCT/US2016/060189 International Search Report and Written Opinion dated Feb. 24, 2017.
PCT/US2016/065212 International Preliminary Report on Patentability dated Jun. 21, 2018.
PCT/US2016/065212 International Search Report and Written Opinion dated Feb. 20, 2017.
PCT/US2016/067366 International Preliminary Report on Patentability dated Jun. 28, 2018.
PCT/US2016/067366 International Search Report and Written Opinion dated Mar. 31, 2017.
PCT/US2016/068134 International Preliminary Report on Patentability dated Jul. 5, 2018.
PCT/US2016/068134 International Search Report and Written Opinion dated Apr. 21, 2017.
PCT/US2017/029465 International Preliminary Report on Patentability dated Nov. 8, 2018.
PCT/US2017/029465 International Search Report and Written Opinion dated Aug. 9, 2017.
PCT/US2017/031605 International Search Report and Written Opinion dated Jul. 31, 2017.
PCT/US2017/047854 International Preliminary Report on Patentability dated Mar. 7, 2019.
PCT/US2017/047854 International Search Report and Written Opinion dated Nov. 28, 2017.
PCT/US2018/028951 International Search Report and Written Opinion dated Aug. 10, 2018.
PCT/US2018/063935 International Search Report and Written Opinion dated Mar. 22, 2019.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, JAPAN 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.

(56) References Cited

OTHER PUBLICATIONS

U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
U.S. Appl. No. 16/209,892 Office Action dated Feb. 8, 2019.
Weather Company Data For IBM Bluemix APIs. Available at https://twcservice.mybluemix.net/rest-api/ (100 pgs) (Accessed Sep. 2017).
Co-pending U.S. Appl. No. 16/798,049, filed Feb. 21, 2020.
Co-pending U.S. Appl. No. 16/834,914, filed Mar. 30, 2020.
PCT/US2019/027538 International Search Report and Written Opinion dated Aug. 2, 2019.
PCT/US2020/013176 International Search Report and Written Opinion dated May 8, 2020.
PCT/US2020/019341 International Search Report and Written Opinion dated Jun. 29, 2020.
Song. Next Generation Emergency Call System with Enhanced Indoor Positioning, Columbia University. Thesis [online] [retrieved Apr. 20, 2020 from< url:https://scholar.google.co.kr/citations/?user=h_4uUqAAAAAJ&hl=ko (156 pgs) (2014)</url:<a>.
U.S. Appl. No. 16/150,099 Office Action dated Jun. 25, 2019.
U.S. Appl. No. 16/162,171 Office Action dated Apr. 9, 2020.
U.S. Appl. No. 16/178,476 Office Action dated May 30, 2019.
U.S. Appl. No. 16/271,634 Office Action dated Jun. 13, 2019.
U.S. Appl. No. 16/384,600 Office Action dated Apr. 2, 2020.
U.S. Appl. No. 16/421,355 Office Action dated Feb. 4, 2020.
U.S. Appl. No. 16/436,810 Office Action dated Aug. 9, 2019.
U.S. Appl. No. 16/740,207 Office Action dated Mar. 11, 2020.
Co-pending U.S. Appl. No. 16/740,207, filed Jan. 10, 2020.
U.S. Appl. No. 15/682,440 Office Action dated Jan. 27, 2020.
U.S. Appl. No. 15/976,600 Office Action dated Jan. 30, 2020.
PCT/US2020/046857 International Search Report and Written Opinion dated Nov. 18, 2020.
U.S. Appl. No. 16/823,192 Office Action dated Dec. 4, 2020.
U.S. Appl. No. 16/834,914 Office Action dated Dec. 2, 2020.
U.S. Appl. No. 15/976,600 Office Action dated Aug. 3, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
U.S. Appl. No. 16/509,296 Office Action dated Sep. 3, 2020.
U.S. Appl. No. 16/740,207 Office Action dated Aug. 17, 2020.
U.S. Appl. No. 16/798,049 Office Action dated Jul. 17, 2020.
Co-pending U.S. Appl. No. 16/684,366, filed Nov. 14, 2019.
U.S. Appl. No. 16/162,171 Office Action dated Nov. 4, 2019.
U.S. Appl. No. 16/271,634 Office Action dated Dec. 16, 2019.
U.S. Appl. No. 16/436,810 Office Action dated Dec. 17, 2019.
U.S. Appl. No. 16/526,195 Office Action dated Dec. 27, 2019.
U.S. Appl. No. 16/684,366 Office Action dated Dec. 23, 2020.
U.S. Appl. No. 15/976,600 Office Action dated May 13, 2021.
U.S. Appl. No. 16/162,171 Office Action dated Apr. 8, 2021.
U.S. Appl. No. 16/384,600 Office Action dated Jun. 9, 2021.
U.S. Appl. No. 16/421,355 Office Action dated May 12, 2021.
U.S. Appl. No. 16/537,377 Office Action dated Apr. 16, 2021.
U.S. Appl. No. 16/798,049 Office Action dated Mar. 8, 2021.
U.S. Appl. No. 16/865,179 Office Action dated Jul. 9, 2021.
U.S. Appl. No. 17/115,098 Office Action dated Mar. 9, 2021.
U.S. Appl. No. 17/196,438 Office Action dated May 10, 2022.
U.S. Appl. No. 17/221,568 Office Action dated May 2, 2022.
U.S. Appl. No. 17/545,244 Office Action dated Apr. 1, 2022.
U.S. Appl. No. 17/671,493 Office Action dated May 10, 2022.
U.S. Appl. No. 17/671,510 Office Action dated Apr. 22, 2022.

* cited by examiner

SYSTEMS AND METHODS FOR EMERGENCY COMMUNICATIONS

CROSS-REFERENCE TO RELATED APPLICATIONS

This application is a continuation of U.S. application Ser. No. 15/589,847, filed May 8, 2017, which claims the benefit of U.S. Provisional Application No. 62/333,538, filed May 9, 2016, U.S. Provisional Application No. 62/339,310, filed May 20, 2016, and U.S. Provisional Application No. 62/377,881, filed Aug. 22, 2016, which applications are incorporated herein in their entirety by reference.

BACKGROUND

In most countries across the world, designated 3-digit numbers exist to place calls for emergency assistance. These calls for requesting emergency assistance are normally made via analog communication channels such as a public switched telephone network (PSTN) since most emergency service providers such as emergency dispatch centers (EDC) or public-safety access points (PSAP) are generally suited to only receive analog landline based calls. However, a vast number of calls requesting emergency assistance now originate from mobile communication devices such as, for example, mobile phones that are capable of communicating via data communication channels (e.g., Internet Protocol (IP)-based communication sessions). Despite the convenience of mobile communication devices, emergency service providers have been unable to leverage these capabilities to provide enhanced emergency communications in responding to emergency requests for assistance.

SUMMARY

Although an increasing number of emergency calls are made by modern communication devices, emergency services have failed to effectively respond to such requests for emergency assistance, oftentimes sending first responders to incorrect locations when seconds can mean the difference between life and death.

One advantage of the systems, devices, and methods disclosed herein is identifying the appropriate emergency dispatch center for responding to an emergency based on accurate and current location information of a user requesting emergency assistance. In some cases, an emergency dispatch center is identified that serves the jurisdiction in which the user's communication device is located before an emergency situation occurs. In this way, the location of the user communication device is used in a pre-emptive fashion to locate an EDC that serves the estimated location. As a result, the appropriate EDC is readily available at a Tandem Switch or MSC or another cellular call switching center and allows a request for emergency assistance be routed to the appropriate EDC without having to perform a search, for example, a look-up to an ALI or MSAG database for calls received from land-line phones or a SRDB for calls received from portable devices. In such a method, instances of unnecessary and possibly life threatening delays after a request for emergency assistance is placed may be reduced or eliminated. Alternatively, in some cases, an emergency dispatch center is identified after the emergency situation arises. In some embodiments, a new emergency dispatch center is identified when the user changes location into another jurisdiction currently served by the new emergency dispatch center. In some embodiments, an emergency communication session between a dispatch center and the user device switches dispatch centers seamlessly during the course of the session to ensure the user is being assisted by the appropriate emergency dispatch center.

Another advantage provided by the systems, devices, and methods disclosed herein is providing responder forecast(s) to users requesting emergencies. Responder forecasts include information useful to the user such as, for example, an estimated time to arrival and/or type of first responder. In some embodiments, the responder forecast or information from said forecast is displayed on a user communication device. Sometimes, the forecast is displayed on a map. In some embodiments, the map shows a location of the communication device and location(s) of any responder assets. In some embodiments, the type of information provided to the communication device depends on the user type and/or authorization.

Another advantage provided by the systems, devices, and methods disclosed herein is the facilitation of efficient data exchange during emergency situations or emergency communications. For example, existing PSAP infrastructure is often antiquated and unable to access important information (e.g. information stored by a communication device requesting assistance) relevant to an emergency. In some cases, PSAPs are unable to communicate with one another effectively, often relying on direct dialing each other. Sometimes, data is not shared between various devices and systems due to lack of compatible data format. Therefore, the systems, devices, and methods disclosed herein allow for provisioning of data from various sources for an emergency situation, formatting them into a compatible format, and providing the formatted data to requesting devices/systems such as PSAPs or first responders based on level of authorization or credentials.

In one aspect, disclosed herein are methods for updating an emergency dispatch center for communicating with a communication device during an emergency situation, the method comprising: a) managing, by an emergency management system, one or more communications sent between a communication device and a first emergency dispatch center for the emergency situation; b) determining, by the emergency management system, that a second emergency dispatch center is more suitable than the first emergency dispatch center for responding to the emergency situation; and c) updating, by the emergency management system, the first emergency dispatch center to the second emergency dispatch center for communicating with the communication device during the emergency situation. In some embodiments, managing the one or more communications in step a) comprises routing the one or more communications sent between the communication device and the first emergency dispatch center. In some embodiments, managing the one or more communications in step a) comprises providing updated information for the communication device to the first emergency dispatch center. In some embodiments, managing the one or more communications in step a) comprises providing location information for the communication device to the first emergency dispatch center. In some embodiments, determining that a second emergency dispatch center is more suitable for communicating with the communication device in step b) comprises: obtaining location information for the communication device; determining that the first emergency dispatch center does not serve a location of the communication device based on the location information; and identifying a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that a second emergency dispatch center is more suitable for communicating with the communication device in step b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected to the emergency communication session. In some embodiments, determining that a second emergency dispatch center is more suitable for communicating with the communication device in step b) comprises: obtaining emergency information for the emergency situation; determining that the first emergency dispatch center lacks resources for responding to the emergency situation based on the emergency information; and identifying a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating the communication session between the communication device and the first emergency dispatch center; and establishing a new communication session between the communication device and the second emergency dispatch center. In some embodiments, updating the first emergency dispatch center to the second emergency dispatch center in step c) comprises providing information for the second emergency dispatch center to the first emergency dispatch center. In some embodiments, providing information for the second emergency dispatch center comprises providing contact information for the second emergency dispatch center. In further embodiments, providing information for the second emergency dispatch center comprises providing an interactive link for connecting the first emergency dispatch center to the second emergency dispatch center. In some embodiments, updating the first emergency dispatch center to the second emergency dispatch center in step c) comprises establishing a three-way communication session between the communication device, the first emergency dispatch center, and the second emergency dispatch center. In some embodiments, updating the first emergency dispatch center to the second emergency dispatch center in step c) comprises adding the second emergency dispatch center to the communication session between the communication device and the first emergency dispatch center. In some embodiments, the method further comprises providing location information to the first emergency dispatch center before an emergency communication is sent between the communication device and the first emergency dispatch center. In further embodiments, updated location is periodically provided to the first emergency dispatch center before the communication device sends a request for emergency assistance. In some embodiments, the first emergency dispatch center is pre-selected for communicating with the communication device based on a current location of the communication device. In some embodiments, the communication device stores information for the first emergency dispatch center serving the current location of the communication device. In some embodiments, the communication device stores the first emergency dispatch center as an emergency contact for emergency communications. In some embodiments, updated location information for the communication device is periodically provided to the first emergency dispatch center. In some embodiments, the method further comprises obtaining, by the emergency management system, emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the method further comprises: obtaining, by the emergency management system, responder information; determining, by the emergency management system, a responder forecast based on the responder information and the current location for the communication device; and providing, by the emergency management system, the responder forecast to the communication device.

In another aspect, disclosed herein are emergency management systems comprising at least one processor, a memory, a network element, and a computer program including instructions executable by the at least one processor to create a server application comprising: a) a software module managing one or more communications sent between a communication device and a first emergency dispatch center for the emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation. In some embodiments, managing the one or more communications in a) comprises routing the one or more communications sent between the communication device and the first emergency dispatch center. In some embodiments, managing the one or more communications in a) comprises providing updated information for the communication device to the first emergency dispatch center. In some embodiments, managing the one or more communications in a) comprises providing location information for the communication device to the first emergency dispatch center. In some embodiments, determining that a second emergency dispatch center is more suitable for communicating with the communication device in b) comprises: obtaining location information for the communication device; determining that the first emergency dispatch center does not serve a location of the communication device based on the location information; and identifying a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that a second emergency dispatch center is more suitable for communicating with the communication device in b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected to the emergency communication session. In some embodiments, determining that a second emergency dispatch center is more suitable for communicating with the communication device in b) comprises: obtaining emergency information for the emergency situation; determining that the first emergency dispatch center lacks resources for responding to the emergency situation based on the emergency information; and identifying a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating the communication session between the communication device and the first emergency dispatch center; and establishing a new communication session between the communication device and the second emergency dispatch center. In some embodiments, updating the first emergency dispatch center to the second emergency dispatch center in step c) comprises providing information for the second emergency dispatch center to the first emergency dispatch center. In some embodiments, providing information for the second emergency dispatch center comprises providing contact information for the second emergency dispatch center. In further embodiments, providing information for the second emergency dispatch center comprises providing an interactive link for connecting the first emergency dispatch center to the second emergency dispatch center. In some embodiments, updating the first emergency dispatch center to the second emergency dispatch center in step c) comprises establishing a three-way communication session between the communication device, the first emergency dispatch center, and the second emergency dispatch center. In some embodiments, updating the first emergency dispatch center to the second emergency dispatch center in step c) comprises adding the second emergency dispatch center to the communication session between the communication device and the first emergency dispatch center. In some embodiments, the application further comprises a software module providing location information to the first emergency dispatch center before an emergency communication is sent between the communication device and the first emergency dispatch center. In further embodiments, updated location is periodically provided to the first emergency dispatch center before the communication device sends a request for emergency assistance. In some embodiments, the first emergency dispatch center is pre-selected for communicating with the communication device based on a current location of the communication device. In some embodiments, the communication device stores information for the first emergency dispatch center serving the current location of the communication device. In some embodiments, the communication device stores the first emergency dispatch center as an emergency contact for emergency communications. In some embodiments, updated location information for the communication device is periodically provided to the first emergency dispatch center. In some embodiments, the application further comprises a software module obtaining emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the application further comprises a software module for obtaining responder information; determining a responder forecast based on the responder information and the current location for the communication device; and providing the responder forecast to the communication device.

In another aspect, disclosed herein are non-transitory computer-readable storage media encoded with a computer program including instructions executable by a processor to create a server application comprising: a) a software module managing one or more communications sent between a communication device and a first emergency dispatch center for the emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation. In some embodiments, managing the one or more communications in a) comprises routing the one or more communications sent between the communication device and the first emergency dispatch center. In some embodiments, managing the one or more communications in a) comprises providing updated information for the communication device to the first emergency dispatch center. In some embodiments, managing the one or more communications in a) comprises providing location information for the communication device to the first emergency dispatch center. In some embodiments, determining that a second emergency dispatch center is more suitable for communicating with the communication device in b) comprises: obtaining location information for the communication device; determining that the first emergency dispatch center does not serve a location of the communication device based on the location information; and identifying a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that a second emergency dispatch center is more suitable for communicating with the communication device in b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected to the emergency communication session. In some embodiments, determining that a second emergency dispatch center is more suitable for communicating with the communication device in b) comprises: obtaining emergency information for the emergency situation; determining that the first emergency dispatch center lacks resources for responding to the emergency situation based on the emergency information; and identifying a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating the communication session between the communication device and the first emergency dispatch center; and establishing a new communication session between the communication device and the second emergency dispatch center. In some embodiments, updating the first emergency dispatch center to the second emergency dispatch center in step c) comprises providing information for the second emergency dispatch center to the first emergency dispatch center. In some embodiments, providing information for the second emergency dispatch center comprises providing contact information for the second emergency dispatch center. In further embodiments, providing information for the second emergency dispatch center comprises providing an interactive link for connecting the first emergency dispatch center to the second emergency dispatch center. In some embodiments, updating the first emergency dispatch center to the second emergency dispatch center in step c) comprises establishing a three-way communication session between the communication device, the first emergency dispatch center, and the second emergency dispatch center. In some embodiments, updating the first emergency dispatch center to the second emergency dispatch center in step c) comprises adding the second emergency dispatch center to the communication session between the communication device and the first emergency dispatch center. In some embodiments, the application further comprises a software module providing location information to the first emergency dispatch center before an emergency communication is sent between the communication device and the first emergency dispatch center. In further embodiments, updated location is periodically provided to the first emergency dispatch center before the communication device sends a request for emergency assistance. In some embodiments, the first emergency dispatch center is pre-selected for communicating with the communication device based on a current location of the communication device. In some embodiments, the communication device stores information for the first emergency dispatch center serving the current location of the communication device. In some embodiments, the communication device stores the first emergency dispatch center as an emergency contact for emergency communications. In some embodiments, updated location information for the communication device is periodically provided to the first emergency dispatch center. In some embodiments, the application further comprises a software module obtaining emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the application further comprises a software module for obtaining responder information; determining a responder forecast based on the responder information and the current location for the communication device; and providing the responder forecast to the communication device.

In some aspects, disclosed herein are methods for updating an emergency dispatch center for communicating with a communication device during an emergency situation, the method comprising: a) sending, by the communication device, one or more communications to a first emergency dispatch center; b) determining, by the communication device, that the second emergency dispatch center is more suitable than the first emergency dispatch center for responding to the emergency situation; and c) updating, by the communication device, the first emergency dispatch center to the second emergency dispatch center for communicating with the communication device during the emergency situation. In some embodiments, the one or more communications between the communication device and the first emergency dispatch center are routed through an emergency management system. In some embodiments, the communication device provides location information to the first emergency dispatch center. In some embodiments, determining that a second emergency dispatch center is more suitable for communicating with the communication device in step b) comprises: obtaining location information for the communication device; determining that the first emergency dispatch center does not serve a location of the communication device based on the location information; and obtaining information for a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that the second emergency dispatch center is more suitable for communicating with the communication device in step b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected with the communication device. In some embodiments, determining that a second emergency dispatch center is more suitable for communicating with the communication device in step b) comprises: obtaining emergency information for the emergency situation; determining that the first emergency dispatch center lacks resources for responding to the emergency situation based on the emergency information; and obtaining information for a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating communications with the first emergency dispatch center; and establishing communications with the second emergency dispatch center. In some embodiments, updating the first emergency dispatch center to the second emergency dispatch center in step c) comprises sending a request to an emergency management system to transfer communications to the second emergency dispatch center. In some embodiments, updating the first emergency dispatch center to the second emergency dispatch center in step c) comprises sending a request to the first emergency dispatch center to transfer emergency communications to the second emergency dispatch enter. In some embodiments, the method further comprises establishing a three-way communication session between the communication device, the first emergency dispatch center, and the second emergency dispatch center. In some embodiments, the method further comprises adding the second emergency dispatch center to a communication session between the communication device and the first emergency dispatch center. In some embodiments, the method further comprises providing location information to the first emergency dispatch center before an emergency communication is sent between the communication device and the first emergency dispatch center. In further embodiments, updated location is periodically provided to the first emergency dispatch center before the communication device sends a request for emergency assistance. In further embodiments, the first emergency dispatch center is pre-selected for communicating with the communication device based on a current location of the communication device. In further embodiments, the communication device stores information for the first emergency dispatch center serving a current location of the communication device. In further embodiments, the communication device stores the first emergency dispatch center as an emergency contact for emergency communications. In some embodiments, updated location information for the communication device is periodically provided to the first or second emergency dispatch center. In some embodiments, the method further comprises sending, by the communication device, emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the method further comprises obtaining, by the communication device, a responder forecast from the first or second emergency dispatch center.

In some aspects, disclosed herein are communication devices comprising at least one processor, a memory, a network element, and a computer program including instructions executable by the at least one processor to create an application comprising: a) a software module sending one or more communications to a first emergency dispatch center for an emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation. In some embodiments, the one or more communications between the communication device and the first emergency dispatch center are routed through an emergency management system. In some embodiments, the communication device provides location information to the first emergency dispatch center. In some embodiments, determining that a second emergency dispatch center is more suitable for communicating with the communication device in step b) comprises: obtaining location information for the communication device; determining that the first emergency dispatch center does not serve a location of the communication device based on the location information; and obtaining information for a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that the second emergency dispatch center is more suitable for communicating with the communication device in step b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected with the communication device. In some embodiments, determining that a second emergency dispatch center is more suitable for communicating with the communication device in step b) comprises: obtaining emergency information for the emergency situation; determining that the first emergency dispatch center lacks resources for responding to the emergency situation based on the emergency information; and obtaining information for a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating communications with the first emergency dispatch center; and establishing communications with the second emergency dispatch center. In some embodiments, updating the first emergency dispatch center to the second emergency dispatch center in step c) comprises sending a request to an emergency management system to transfer communications to the second emergency dispatch center. In some embodiments, updating the first emergency dispatch center to the second emergency dispatch center in step c) comprises sending a request to the first emergency dispatch center to transfer emergency communications to the second emergency dispatch enter. In some embodiments, the application further comprises a software module establishing a three-way communication session between the communication device, the first emergency dispatch center, and the second emergency dispatch center. In some embodiments, the application further comprises a software module adding the second emergency dispatch center to a communication session between the communication device and the first emergency dispatch center. In some embodiments, the application further comprises a software module providing location information to the first emergency dispatch center before an emergency communication is sent between the communication device and the first emergency dispatch center. In further embodiments, updated location is periodically provided to the first emergency dispatch center before the communication device sends a request for emergency assistance. In further embodiments, the first emergency dispatch center is pre-selected for communicating with the communication device based on a current location of the communication device. In further embodiments, the communication device stores information for the first emergency dispatch center serving a current location of the communication device. In further embodiments, the communication device stores the first emergency dispatch center as an emergency contact for emergency communications. In some embodiments, updated location information for the communication device is periodically provided to the first or second emergency dispatch center. In some embodiments, the application further comprises a software module sending emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the method further comprises obtaining, by the communication device, a responder forecast from the first or second emergency dispatch center.

In another aspect, disclosed herein are non-transitory computer-readable storage media encoded with a computer program including instructions executable by a processor to create a server application comprising: a) a software module sending one or more communications to a first emergency dispatch center for an emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation. In some embodiments, the one or more communications between the communication device and the first emergency dispatch center are routed through an emergency management system. In some embodiments, the communication device provides location information to the first emergency dispatch center. In some embodiments, determining that a second emergency dispatch center is more suitable for communicating with the communication device in step b) comprises: obtaining location information for the communication device; determining that the first emergency dispatch center does not serve a location of the communication device based on the location information; and obtaining information for a second emergency dispatch center that serves the location of the communication device based on the location information. In further embodiments, determining the first emergency dispatch center does not serve a location of the communication device comprises querying a location database with the location of the communication device and receiving from the location database information for the second emergency dispatch center. In some embodiments, determining that the second emergency dispatch center is more suitable for communicating with the communication device in step b) comprises determining that the first emergency dispatch center is unresponsive. In further embodiments, the first emergency dispatch center is unresponsive for failing to respond to an emergency alert sent by the communication device for at least a threshold time period. In further embodiments, the first emergency dispatch center is unresponsive for failing to respond to a communication sent by the communication device for at least a threshold time period. In further embodiments, the first emergency dispatch center is unresponsive when the first emergency dispatch center is not successfully connected with the communication device. In some embodiments, determining that a second emergency dispatch center is more suitable for communicating with the communication device in step b) comprises: obtaining emergency information for the emergency situation; determining that the first emergency dispatch center lacks resources for responding to the emergency situation based on the emergency information; and obtaining information for a second emergency dispatch center that has resources for responding to the emergency situation based on the emergency information. In further embodiments, the emergency information comprises medical emergency information indicating a medical emergency for a user of the communication device. In further embodiments, the first emergency dispatch center lacks resources for responding to the emergency situation when there are no available responders associated with the first emergency dispatch center that are trained or equipped to respond to the emergency situation. In some embodiments, updating the first emergency dispatch center to the second emergency dispatch center in step c) comprises: terminating communications with the first emergency dispatch center; and establishing communications with the second emergency dispatch center. In some embodiments, updating the first emergency dispatch center to the second emergency dispatch center in step c) comprises sending a request to an emergency management system to transfer communications to the second emergency dispatch center. In some embodiments, updating the first emergency dispatch center to the second emergency dispatch center in step c) comprises sending a request to the first emergency dispatch center to transfer emergency communications to the second emergency dispatch enter. In some embodiments, the application further comprises a software module establishing a three-way communication session between the communication device, the first emergency dispatch center, and the second emergency dispatch center. In some embodiments, the application further comprises a software module adding the second emergency dispatch center to a communication session between the communication device and the first emergency dispatch center. In some embodiments, the application further comprises a software module providing location information to the first emergency dispatch center before an emergency communication is sent between the communication device and the first emergency dispatch center. In further embodiments, updated location is periodically provided to the first emergency dispatch center before the communication device sends a request for emergency assistance. In further embodiments, the first emergency dispatch center is pre-selected for communicating with the communication device based on a current location of the communication device. In further embodiments, the communication device stores information for the first emergency dispatch center serving a current location of the communication device. In further embodiments, the communication device stores the first emergency dispatch center as an emergency contact for emergency communications. In some embodiments, updated location information for the communication device is periodically provided to the first or second emergency dispatch center. In some embodiments, the application further comprises a software module sending emergency information comprising at least one of user information, medical information, environmental information, emergency type, and sensor data. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the method further comprises obtaining, by the communication device, a responder forecast from the first or second emergency dispatch center.

In some aspects, disclosed herein are methods of providing a responder forecast for a responder to a communication device during an emergency situation, the method comprising: a) managing, by an emergency management system, an emergency communication session between the communication device and an emergency dispatch center during an emergency situation; b) obtaining, by the emergency management system, a current location for the communication device; c) obtaining, by the emergency management system, information about responder assets in proximity to the current location of the communication device; d) determining, by the emergency management system, a responder forecast based on the responder information and the current location for the communication device; and e) providing, by the emergency management system, the responder forecast to the communication device. In some embodiments, the responder forecast comprises a current location for each responder. In some embodiments, the responder forecast comprises an estimated time to arrival for the responder assets based on a current location for each of the responder assets and the communication device. In some embodiments, the emergency response information comprises an estimated distance between each of the responder assets and the communication device. In some embodiments, a display of the communication device presents a digital map showing a current location for each of the communication device and the responder assets. In some embodiments, a display of the communication device presents an estimated time to arrival for each of the responder assets. In some embodiments, a display of the communication device presents an estimated travel distance between each of the responder assets and the communication device. In some embodiments, the responder assets comprises at least two responders. In some embodiments, the responder assets comprises at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, information in the responder forecast is made available to the communication device based on user type for a user of the communication device. In some embodiments, the method further comprises determining, by the emergency management system, that a second emergency dispatch center is more suitable for responding to the emergency situation. In further embodiments, the method further comprises facilitating, by the emergency management center, a transfer of the communication session to the second emergency dispatch center. In some embodiments, the emergency management system obtains the current location for the communication device before the emergency communication session is established. In further embodiments, the emergency management system periodically obtains an updated location for the communication device. In further embodiments, the emergency management system pre-selects the emergency dispatch center based on the current location of the communication device before receiving the emergency alert. In further embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the method further comprises obtaining, by the emergency management system, emergency information comprising at least one of user information, medical information, environmental information, emergency type, and sensor data. In further embodiments, the responder assets is selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are emergency management systems comprising at least one processor, a memory, a network element, and a computer program including instructions executable by the at least one processor to create a server application comprising: a) a software module managing an emergency communication session between the communication device and an emergency dispatch center during an emergency situation; b) a software module obtaining a current location for the communication device; c) a software module obtaining information about responder assets in proximity to the current location of the communication device; d) a software module determining a responder forecast based on the responder information and the current location for the communication device; and e) a software module providing the responder forecast to the communication device. In some embodiments, the responder forecast comprises a current location for each responder. In some embodiments, the responder forecast comprises an estimated time to arrival for the responder assets based on a current location for each of the responder assets and the communication device. In some embodiments, the emergency response information comprises an estimated distance between each of the responder assets and the communication device. In some embodiments, a display of the communication device presents a digital map showing a current location for each of the communication device and the responder assets. In some embodiments, a display of the communication device presents an estimated time to arrival for each of the responder assets. In some embodiments, a display of the communication device presents an estimated travel distance between each of the responder assets and the communication device. In some embodiments, the responder assets comprise at least two responders. In some embodiments, the responder assets comprise at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, information in the responder forecast is made available to the communication device based on user type for a user of the communication device. In some embodiments, the application further comprises a software module determining that a second emergency dispatch center is more suitable for responding to the emergency situation. In further embodiments, the application further comprises a software module facilitating a transfer of the communication session to the second emergency dispatch center. In some embodiments, the emergency management system obtains the current location for the communication device before the emergency communication session is established. In further embodiments, the emergency management system periodically obtains an updated location for the communication device. In further embodiments, the emergency management system pre-selects the emergency dispatch center based on the current location of the communication device before receiving the emergency alert. In further embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the application further comprises a software module obtaining emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In another aspect, disclosed herein are non-transitory computer-readable storage media encoded with a computer program including instructions executable by a processor to create a server application comprising: a) a software module managing an emergency communication session between the communication device and an emergency dispatch center during an emergency situation; b) a software module obtaining a current location for the communication device; c) a software module obtaining information about responder assets in proximity to the current location of the communication device; d) a software module determining a responder forecast based on the responder information and the current location for the communication device; and e) a software module providing the responder forecast to the communication device. In some embodiments, the responder forecast comprises a current location for each responder. In some embodiments, the responder forecast comprises an estimated time to arrival for the responder assets based on a current location for each of the responder assets and the communication device. In some embodiments, the emergency response information comprises an estimated distance between each of the responder assets and the communication device. In some embodiments, a display of the communication device presents a digital map showing a current location for each of the communication device and the responder assets. In some embodiments, a display of the communication device presents an estimated time to arrival for each of the responder assets. In some embodiments, a display of the communication device presents an estimated travel distance between each of the responder assets and the communication device. In some embodiments, the responder assets comprise at least two responders. In some embodiments, the responder assets comprise at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, information in the responder forecast is made available to the communication device based on user type for a user of the communication device. In some embodiments, the application further comprises a software module determining that a second emergency dispatch center is more suitable for responding to the emergency situation. In further embodiments, the application further comprises a software module facilitating a transfer of the communication session to the second emergency dispatch center. In some embodiments, the emergency management system obtains the current location for the communication device before the emergency communication session is established. In further embodiments, the emergency management system periodically obtains an updated location for the communication device. In further embodiments, the emergency management system pre-selects the emergency dispatch center based on the current location of the communication device before receiving the emergency alert. In further embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the application further comprises a software module obtaining emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, provided herein are methods of obtaining a responder forecast during an emergency situation, the method comprising: a) communicating, by a communication device, with an emergency dispatch center over an emergency communication session during an emergency situation; b) providing, by the communication device, a current location for the communication device to the emergency dispatch center; and c) obtaining, by the communication device, a responder forecast for responder assets assigned to respond to the emergency situation from the emergency service. In some embodiments, the method further comprises displaying, by the communication device, the responder forecast on a display of the communication device. In further embodiments, the display of the communication device displays the responder forecast by presenting a digital map showing current location for the responder assets and the communication device. In some embodiments, the communication device informs a user of estimated time to arrival for the responder assets. In some embodiments, the communication device informs a user of estimated distance between the responder assets and the communication device. In some embodiments, the responder forecast comprises current location for the responder assets. In some embodiments, the responder forecast comprises estimated time to arrival for the responder assets based on current location for the responder assets and the communication device. In some embodiments, the responder forecast comprises estimated travel distance between the responder assets and the communication device based on current location for the responder assets and the communication device. In some embodiments, the responder forecast comprises information on at least two responders. In some embodiments, the responder forecast comprises information on at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, information in the responder forecast is made available to the communication device based on user type for a user of the communication device. In some embodiments, the method further comprises determining, by the communication device, that a second emergency dispatch center is more suitable for responding to the emergency situation. In further embodiments, the method further comprises obtaining, by the communication device, a transfer of the communication session to the second emergency dispatch center. In some embodiments, the method further comprises providing location information to the emergency dispatch center before the emergency communication session is established. In further embodiments, updated location information is periodically provided to the emergency service before the communication device sends a request for emergency assistance. In further embodiments, the emergency dispatch center is pre-selected for communicating with the communication device based on a current location of the communication device. In some embodiments, the communication device stores information for the emergency dispatch center serving the current location of the communication device. In some embodiments, the communication device stores the emergency dispatch center as an emergency contact for emergency communications. In some embodiments, updated location information for the communication device is periodically provided to the emergency dispatch center after the communication session is established. In some embodiments, the method further comprises sending, by the communication device, emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the communication device displays a map of responder assets. In some embodiments, the emergency management system generates a map of responder assets. In some embodiments, responder assets include one or more of medical assets, police assets, fire response assets, security assets, safety assets, and vehicle servicing assets.

In some aspects, disclosed herein are communication devices comprising at least one processor, a memory, a network element, and a computer program including instructions executable by the at least one processor to create an application comprising: a) a software module communicating with an emergency dispatch center over an emergency communication session during an emergency situation; b) a software module providing a current location for the communication device to the emergency dispatch center; and c) a software module obtaining a responder forecast for responder assets assigned to respond to the emergency situation from the emergency service. In some embodiments, the application further comprises a software module displaying the responder forecast on a display of the communication device. In further embodiments, the display of the communication device displays the responder forecast by presenting a digital map showing current location for the responder assets and the communication device. In some embodiments, the communication device informs a user of estimated time to arrival for the responder assets. In some embodiments, the communication device informs a user of estimated distance between the responder assets and the communication device. In some embodiments, the responder forecast comprises current location for the responder assets. In some embodiments, the responder forecast comprises estimated time to arrival for the responder assets based on current location for the responder assets and the communication device. In some embodiments, the responder forecast comprises estimated travel distance between the responder assets and the communication device based on current location for the responder assets and the communication device. In some embodiments, the responder forecast comprises information on at least two responders. In some embodiments, the responder forecast comprises information on at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, information in the responder forecast is made available to the communication device based on user type for a user of the communication device. In some embodiments, the application further comprises a software module determining, by the communication device, that a second emergency dispatch center is more suitable for responding to the emergency situation. In further embodiments, the application further comprises a software module obtaining a transfer of the communication session to the second emergency dispatch center. In some embodiments, the application further comprises a software module providing location information to the emergency dispatch center before the emergency communication session is established. In further embodiments, updated location information is periodically provided to the emergency service before the communication device sends a request for emergency assistance. In further embodiments, the emergency dispatch center is pre-selected for communicating with the communication device based on a current location of the communication device. In some embodiments, the communication device stores information for the emergency dispatch center serving the current location of the communication device. In some embodiments, the communication device stores the emergency dispatch center as an emergency contact for emergency communications. In some embodiments, updated location information for the communication device is periodically provided to the emergency dispatch center after the communication session is established. In some embodiments, the application further comprises sending emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the communication device displays a map of responder assets. In some embodiments, the emergency management system generates a map of responder assets. In some embodiments, responder assets include one or more of medical assets, police assets, fire response assets, security assets, safety assets, and vehicle servicing assets.

In another aspect, disclosed herein are non-transitory computer-readable storage media encoded with a computer program including instructions executable by a processor to create an application comprising: a) a software module communicating with an emergency dispatch center over an emergency communication session during an emergency situation; b) a software module providing a current location for the communication device to the emergency dispatch center; and c) a software module obtaining a responder forecast for responder assets assigned to respond to the emergency situation from the emergency service. In some embodiments, the application further comprises a software module displaying the responder forecast on a display of the communication device. In further embodiments, the display of the communication device displays the responder forecast by presenting a digital map showing current location for the responder assets and the communication device. In some embodiments, the communication device informs a user of estimated time to arrival for the responder assets. In some embodiments, the communication device informs a user of estimated distance between the responder assets and the communication device. In some embodiments, the responder forecast comprises current location for the responder assets. In some embodiments, the responder forecast comprises estimated time to arrival for the responder assets based on current location for the responder assets and the communication device. In some embodiments, the responder forecast comprises estimated travel distance between the responder assets and the communication device based on current location for the responder assets and the communication device. In some embodiments, the responder forecast comprises information on at least two responders. In some embodiments, the responder forecast comprises information on at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, information in the responder forecast is made available to the communication device based on user type for a user of the communication device. In some embodiments, the application further comprises a software module determining, by the communication device, that a second emergency dispatch center is more suitable for responding to the emergency situation. In further embodiments, the application further comprises a software module obtaining a transfer of the communication session to the second emergency dispatch center. In some embodiments, the application further comprises a software module providing location information to the emergency dispatch center before the emergency communication session is established. In further embodiments, updated location information is periodically provided to the emergency service before the communication device sends a request for emergency assistance. In further embodiments, the emergency dispatch center is pre-selected for communicating with the communication device based on a current location of the communication device. In some embodiments, the communication device stores information for the emergency dispatch center serving the current location of the communication device. In some embodiments, the communication device stores the emergency dispatch center as an emergency contact for emergency communications. In some embodiments, updated location information for the communication device is periodically provided to the emergency dispatch center after the communication session is established. In some embodiments, the application further comprises sending emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor. In some embodiments, the communication device displays a map of responder assets. In some embodiments, the emergency management system generates a map of responder assets. In some embodiments, responder assets include one or more of medical assets, police assets, fire response assets, security assets, safety assets, and vehicle servicing assets.

In some aspects, provided herein are methods of providing a responder forecast for responder assets to a communication device, the method comprising: a) managing, by an emergency management system, an emergency communication session between a communication device and an emergency dispatch center; b) obtaining, by the emergency management system, a current location for the communication device; c) determining, by the emergency management system, a type of emergency service that is sent in response to the emergency situation; d) estimating, by the emergency management system, a responder forecast based on at least one of historical and statistical data; e) adjusting, by the emergency management system, the responder forecast based on current conditions; and f) providing, by the emergency management system, the responder forecast to a communication device of a user based on user type.

In some aspects, disclosed herein are methods of facilitating data exchange during an emergency situation, the method comprising: a) receiving, by an emergency management system, a request for emergency assistance from a communication device; b) obtaining, by the emergency management system, emergency information comprising location information for the communication device; c) identifying, by the emergency management system, an emergency dispatch center for responding to the emergency situation from a plurality of emergency dispatch centers based on the location information; d) sending, by the emergency management system, an emergency alert for the emergency situation to the emergency dispatch center; e) providing, by the emergency management system, the emergency information comprising the location information for the emergency situation to the emergency dispatch center; and f) facilitating, by the emergency management system, data exchange between the at least one communication device and the emergency dispatch center by processing data into a format compatible with a recipient of the data. In some embodiments, the method further comprises obtaining, by the emergency management system, emergency response information for responder assets assigned to the emergency situation from the emergency dispatch center and providing the emergency response information to the communication device. In further embodiments, the emergency response information comprises a current location for each responder. In further embodiments, the emergency response information comprises an estimated time to arrival for each of the responder assets based on a current location for each of the responder assets and the communication device. In further embodiments, the emergency response information comprises an estimated distance between each of the responder assets and the communication device. In further embodiments, a display of the communication device presents a digital map showing a current location for each of the communication device and the responder assets. In further embodiments, a display of the communication device presents an estimated time to arrival for each of the responder assets. In further embodiments, a display of the communication device presents an estimated travel distance between each of the responder assets and the communication device. In some embodiments, the responder assets comprise at least two responders. In some embodiments, the responder assets comprise at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, the emergency management system obtains location information for the communication device before receiving the indication of an emergency situation. In some embodiments, the emergency management system periodically obtains updated location information for the communication device. In some embodiments, the emergency management system pre-selects the emergency dispatch center based on a current location of the communication device before receiving the emergency alert. In some embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the method further comprises obtaining, by the emergency management system, emergency information comprising at least one of user information, medical information, environmental information, emergency type, and sensor data. In further embodiments, the responder assets is selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are emergency management systems comprising at least one processor, a memory, a network element, and a computer program including instructions executable by the at least one processor to create a server application comprising: a) a software module receiving a request for emergency assistance from a communication device; b) a software module obtaining emergency information comprising location information for the communication device; c) a software module identifying an emergency dispatch center for responding to the emergency situation from a plurality of emergency dispatch centers based on the location information; d) a software module sending an emergency alert for the emergency situation to the emergency dispatch center; e) a software module providing the emergency information comprising the location information for the emergency situation to the emergency dispatch center; and f) a software module facilitating data exchange between the at least one communication device and the emergency dispatch center by processing data into a format compatible with a recipient of the data. In some embodiments, the application further comprises a software module obtaining emergency response information for responder assets assigned to the emergency situation from the emergency dispatch center and providing the emergency response information to the communication device. In further embodiments, the emergency response information comprises a current location for each responder. In further embodiments, the emergency response information comprises an estimated time to arrival for each of the responder assets based on a current location for each of the responder assets and the communication device. In further embodiments, the emergency response information comprises an estimated distance between each of the responder assets and the communication device. In further embodiments, a display of the communication device presents a digital map showing a current location for each of the communication device and the responder assets. In further embodiments, a display of the communication device presents an estimated time to arrival for each of the responder assets. In further embodiments, a display of the communication device presents an estimated travel distance between each of the responder assets and the communication device. In some embodiments, the responder assets comprise at least two responders. In some embodiments, the responder assets comprise at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, the emergency management system obtains location information for the communication device before receiving the indication of an emergency situation. In some embodiments, the emergency management system periodically obtains updated location information for the communication device. In some embodiments, the emergency management system pre-selects the emergency dispatch center based on a current location of the communication device before receiving the emergency alert. In some embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the application further comprises a software module obtaining emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In another aspect, disclosed herein are non-transitory computer-readable storage media encoded with a computer program including instructions executable by a processor to create a server application comprising: a) a software module receiving a request for emergency assistance from a communication device; b) a software module obtaining emergency information comprising location information for the communication device; c) a software module identifying an emergency dispatch center for responding to the emergency situation from a plurality of emergency dispatch centers based on the location information; d) a software module sending an emergency alert for the emergency situation to the emergency dispatch center; e) a software module providing the emergency information comprising the location information for the emergency situation to the emergency dispatch center; and f) a software module facilitating data exchange between the at least one communication device and the emergency dispatch center by processing data into a format compatible with a recipient of the data. In some embodiments, the application further comprises a software module obtaining emergency response information for responder assets assigned to the emergency situation from the emergency dispatch center and providing the emergency response information to the communication device. In further embodiments, the emergency response information comprises a current location for each responder. In further embodiments, the emergency response information comprises an estimated time to arrival for each of the responder assets based on a current location for each of the responder assets and the communication device. In further embodiments, the emergency response information comprises an estimated distance between each of the responder assets and the communication device. In further embodiments, a display of the communication device presents a digital map showing a current location for each of the communication device and the responder assets. In further embodiments, a display of the communication device presents an estimated time to arrival for each of the responder assets. In further embodiments, a display of the communication device presents an estimated travel distance between each of the responder assets and the communication device. In some embodiments, the responder assets comprise at least two responders. In some embodiments, the responder assets comprise at least three responders. In some embodiments, the current location of the communication device is calculated using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the current location of the communication device is determined by the communication device. In some embodiments, the current location of the communication device is determined by the emergency management system. In some embodiments, the current location of the communication device is determined by a third party server. In some embodiments, the emergency management system obtains location information for the communication device before receiving the indication of an emergency situation. In some embodiments, the emergency management system periodically obtains updated location information for the communication device. In some embodiments, the emergency management system pre-selects the emergency dispatch center based on a current location of the communication device before receiving the emergency alert. In some embodiments, the emergency management system pre-selects a new emergency dispatch center based on an updated current location of the communication device before receiving the emergency alert, wherein said updated current location is within a jurisdiction of the new emergency dispatch center. In some embodiments, the emergency management system stores the emergency dispatch center serving the current location of the communication device. In some embodiments, the emergency management system stores the emergency dispatch center as an emergency contact for receiving an emergency alert. In some embodiments, the application further comprises a software module obtaining emergency information comprising at least one of user information, medical information, environmental information, emergency type, and sensor data. In further embodiments, the responder assets are selected based on at least one of the emergency type and the current location information for the communication device. In further embodiments, emergency type is selected from the group consisting of medical emergency, fire emergency, police emergency, and car accident. In further embodiments, the sensor data is obtained from one or more sensors of the communication device. In further embodiments, the sensor data is obtained from one or more sensors physically separate from the communication device. In further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are methods of facilitating data exchange between parties to an emergency situation, the method comprising: a) obtaining, by the emergency management system, location information for a plurality of communication devices; b) storing, by the emergency management system, the location information in a location information database; c) formatting, by the emergency management system, the location information in a standard format compatible with industry standards for location based information storage and retrieval for emergency response; d) receiving, by the emergency management system, a request for location information for at least one device of the plurality of communication devices, said request sent by a requesting device; e) authenticating, by the emergency management system, the requesting device for access to the location information; and f) providing, by the emergency management system, the location information to the requesting device. In some embodiments, the requesting device is a computer console of an emergency dispatch center dispatcher. In some embodiments, the requesting device is a communication device of a responder assigned to an emergency situation associated with the at least one device. In some embodiments, the location information for the at least one device comprises a current location obtained using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the method further comprises obtaining, by the emergency management system, emergency information selected from user information, medical information, environmental information, emergency type, and sensor data. In further embodiments, the emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are emergency management systems comprising at least one processor, a memory, a network element, and a computer program including instructions executable by the at least one processor to create a server application comprising: a) a software module obtaining location information for a plurality of communication devices; b) a software module storing the location information in a location information database; c) a software module formatting the location information in a standard format compatible with industry standards for location based information storage and retrieval for emergency response; d) a software module receiving a request for location information for at least one device of the plurality of communication devices, said request sent by a requesting device; e) a software module authenticating the requesting device for access to the location information; and f) a software module providing the location information to the requesting device. In some embodiments, the requesting device is a computer console of an emergency dispatch center dispatcher. In some embodiments, the requesting device is a communication device of a responder assigned to an emergency situation associated with the at least one device. In some embodiments, the location information for the at least one device comprises a current location obtained using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the application further comprises a software module obtaining emergency information selected from user information, medical information, environmental information, emergency type, and sensor data. In further embodiments, the emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In another aspect, disclosed herein are non-transitory computer-readable storage media encoded with a computer program including instructions executable by a processor to create a server application comprising: a) a software module obtaining location information for a plurality of communication devices; b) a software module storing the location information in a location information database; c) a software module formatting the location information in a standard format compatible with industry standards for location based information storage and retrieval for emergency response; d) a software module receiving a request for location information for at least one device of the plurality of communication devices, said request sent by a requesting device; e) a software module authenticating the requesting device for access to the location information; and f) a software module providing the location information to the requesting device. In some embodiments, the requesting device is a computer console of an emergency dispatch center dispatcher. In some embodiments, the requesting device is a communication device of a responder assigned to an emergency situation associated with the at least one device. In some embodiments, the location information for the at least one device comprises a current location obtained using at least one of GPS, cellular network triangulation, Wi-Fi triangulation, Bluetooth triangulation, received signal strength from at least one cellular base station, received signal strength of at least one Wi-Fi router, and received signal strength of at least one Bluetooth beacon. In some embodiments, the application further comprises a software module obtaining emergency information selected from user information, medical information, environmental information, emergency type, and sensor data. In further embodiments, the emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In further embodiments, sensor data comprises at least one of environmental parameters and physiological parameters. In further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are methods of facilitating data exchange during an emergency situation, the method comprising: a) receiving, by an emergency management system, a plurality of emergency communications from a plurality of communication devices, each emergency communication corresponding to an emergency situation for a user of a communication device; b) obtaining, by the emergency management system, location information for the plurality of communication devices; c) determining, by the emergency management system, a current location based on the location information for each communication device; d) determining, by the emergency management system, an emergency dispatch center responsible for a jurisdiction of the location of each communication device; e) sending, by the emergency management system, an emergency alert to an emergency dispatch center for each of the plurality of emergency communications, said emergency alert comprising a current location for a corresponding communication device; and f) facilitating, by the emergency management system, data exchange between the communication device and the emergency service by processing data into a format compatible with each recipient of said data.

In some aspects, disclosed herein are emergency management systems comprising at least one processor, a memory, a network element, and a computer program including instructions executable by the at least one processor to create a server application comprising: a) a software module receiving a plurality of emergency communications from a plurality of communication devices, each emergency communication corresponding to an emergency situation for a user of a communication device; b) a software module obtaining location information for the plurality of communication devices; c) a software module determining a current location based on the location information for each communication device; d) a software module determining an emergency dispatch center responsible for a jurisdiction of the location of each communication device; e) a software module sending an emergency alert to an emergency dispatch center for each of the plurality of emergency communications, said emergency alert comprising a current location for a corresponding communication device; and f) a software module facilitating data exchange between the communication device and the emergency service by processing data into a format compatible with each recipient of said data.

In another aspect, disclosed herein are non-transitory computer-readable storage media encoded with a computer program including instructions executable by a processor to create a server application comprising: a) a software module receiving a plurality of emergency communications from a plurality of communication devices, each emergency communication corresponding to an emergency situation for a user of a communication device; b) a software module obtaining location information for the plurality of communication devices; c) a software module determining a current location based on the location information for each communication device; d) a software module determining an emergency dispatch center responsible for a jurisdiction of the location of each communication device; e) a software module sending an emergency alert to an emergency dispatch center for each of the plurality of emergency communications, said emergency alert comprising a current location for a corresponding communication device; and f) a software module facilitating data exchange between the communication device and the emergency service by processing data into a format compatible with each recipient of said data.

In some aspects, disclosed herein are methods of managing access to data, the method comprising: a) receiving, by an emergency management system, a request to access data and an authorization code from a requesting device; b) checking, by the emergency management system, the authorization code to determine that the requesting device is authorized to access the data; c) obtaining, by the emergency management system, the requested data; and d) sending, by the emergency management system, the requested data in a format compatible with the requesting device. In some embodiments, the requesting device is a computer console of an emergency dispatch center dispatcher. In some embodiments, the requesting device is a communication device of a responder assigned to an emergency situation associated with the at least one device. In some embodiments, the method further comprising obtaining, by the emergency management system, emergency information selected from user information, medical information, environmental information, emergency type, and sensor data. In further embodiments, emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In yet further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In some aspects, disclosed herein are emergency management systems comprising at least one processor, a memory, a network element, and a computer program including instructions executable by the at least one processor to create a server application comprising: a) a software module receiving a request to access data and an authorization code from a requesting device; b) a software module checking the authorization code to determine that the requesting device is authorized to access the data; c) a software module obtaining the requested data; and d) a software module sending the requested data in a format compatible with the requesting device. In some embodiments, the requesting device is a computer console of an emergency dispatch center dispatcher. In some embodiments, the requesting device is a communication device of a responder assigned to an emergency situation associated with the at least one device. In some embodiments, the application further comprises a software module obtaining emergency information selected from user information, medical information, environmental information, emergency type, and sensor data. In further embodiments, emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In yet further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

In another aspect, disclosed herein are non-transitory computer-readable storage media encoded with a computer program including instructions executable by a processor to create a server application comprising: a) a software module receiving a request to access data and an authorization code from a requesting device; b) a software module checking the authorization code to determine that the requesting device is authorized to access the data; c) a software module obtaining the requested data; and d) a software module sending the requested data in a format compatible with the requesting device. In some embodiments, the requesting device is a computer console of an emergency dispatch center dispatcher. In some embodiments, the requesting device is a communication device of a responder assigned to an emergency situation associated with the at least one device. In some embodiments, the application further comprises a software module obtaining emergency information selected from user information, medical information, environmental information, emergency type, and sensor data. In further embodiments, emergency type is selected from medical emergency, fire emergency, police emergency, and vehicle accident. In further embodiments, the sensor data is obtained from one or more sensors of the communication device. In further embodiments, the sensor data is obtained from one or more sensors physically separate from the communication device. In yet further embodiments, a sensor is a wearable sensor, an Internet of Things sensor, or a vehicular sensor. In yet further embodiments, sensor data comprises at least one of environmental parameters and physiological parameters. In yet further embodiments, sensor data is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
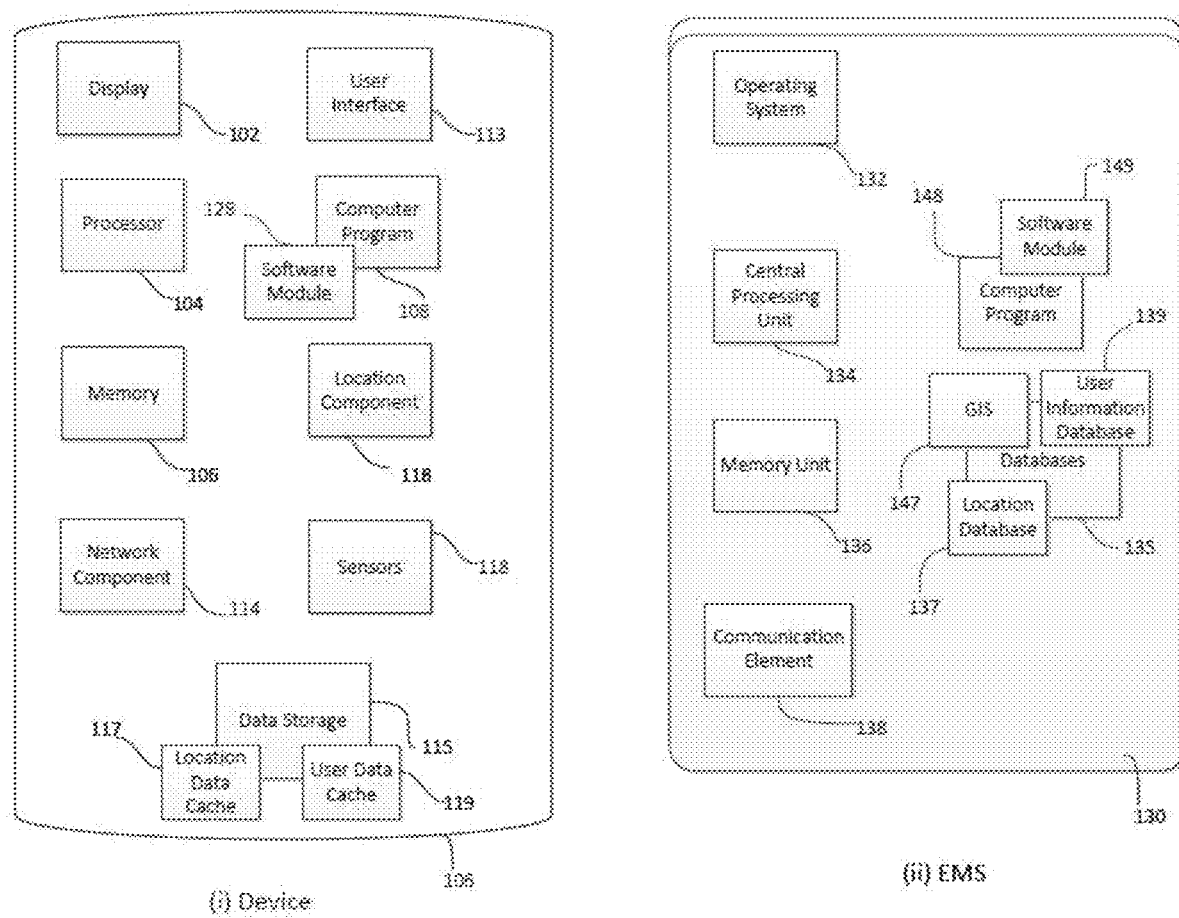
FIGS. 1A, 1B and 1C illustrate embodiments of the device, emergency management system, and software applications for the device, emergency management system and PSAP system.

In certain embodiments, disclosed herein are methods for updating an emergency dispatch center for communicating with a communication device during an emergency situation, the method comprising: a) managing, by an emergency management system, one or more communications sent between a communication device and a first emergency dispatch center for the emergency situation; b) determining, by the emergency management system, that a second emergency dispatch center is more suitable than the first emergency dispatch center for responding to the emergency situation; and c) updating, by the emergency management system, the first emergency dispatch center to the second emergency dispatch center for communicating with the communication device during the emergency situation.

In certain embodiments, disclosed herein are emergency management systems comprising at least one processor, a memory, a network element, and a computer program including instructions executable by the at least one processor to create a server application comprising: a) a software module managing one or more communications sent between a communication device and a first emergency dispatch center for the emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation.

In certain embodiments, disclosed herein are non-transitory computer-readable storage media encoded with a computer program including instructions executable by a processor to create a server application comprising: a) a software module managing one or more communications sent between a communication device and a first emergency dispatch center for the emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation.

In certain embodiments, disclosed herein are methods for updating an emergency dispatch center for communicating with a communication device during an emergency situation, the method comprising: a) sending, by the communication device, one or more communications to a first emergency dispatch center; b) determining, by the communication device, that the second emergency dispatch center is more suitable than the first emergency dispatch center for responding to the emergency situation; and c) updating, by the communication device, the first emergency dispatch center to the second emergency dispatch center for communicating with the communication device during the emergency situation.

In certain embodiments, disclosed herein are communication devices comprising at least one processor, a memory, a network element, and a computer program including instructions executable by the at least one processor to create an application comprising: a) a software module sending one or more communications to a first emergency dispatch center for an emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation.

In certain embodiments, disclosed herein are non-transitory computer-readable storage media encoded with a computer program including instructions executable by a processor to create a server application comprising: a) a software module sending one or more communications to a first emergency dispatch center for an emergency situation; b) a software module determining that a second emergency dispatch center is more suitable than the first emergency dispatch center for responding to the emergency situation; and c) a software module updating the first emergency dispatch center to the second emergency dispatch center for communicating with the communication device during the emergency situation.

In certain embodiments, disclosed herein are methods of providing a responder forecast for a responder to a communication device during an emergency situation, the method comprising: a) managing, by an emergency management system, an emergency communication session between the communication device and an emergency dispatch center during an emergency situation; b) obtaining, by the emergency management system, a current location for the communication device; c) obtaining, by the emergency management system, information about responder assets in proximity to the current location of the communication device; d) determining, by the emergency management system, a responder forecast based on the responder information and the current location for the communication device; and e) providing, by the emergency management system, the responder forecast to the communication device.

In certain embodiments, disclosed herein are emergency management systems comprising at least one processor, a memory, a network element, and a computer program including instructions executable by the at least one processor to create a server application comprising: a) a software module managing an emergency communication session between the communication device and an emergency dispatch center during an emergency situation; b) a software module obtaining a current location for the communication device; c) a software module obtaining information about responder assets in proximity to the current location of the communication device; d) a software module determining a responder forecast based on the responder information and the current location for the communication device; and e) a software module providing the responder forecast to the communication device.

In certain embodiments, disclosed herein are non-transitory computer-readable storage media encoded with a computer program including instructions executable by a processor to create a server application comprising: a) a software module managing an emergency communication session between the communication device and an emergency dispatch center during an emergency situation; b) a software module obtaining a current location for the communication device; c) a software module obtaining information about responder assets in proximity to the current location of the communication device; d) a software module determining a responder forecast based on the responder information and the current location for the communication device; and e) a software module providing the responder forecast to the communication device.

In certain embodiments, provided herein are methods of obtaining a responder forecast during an emergency situation, the method comprising: a) communicating, by a communication device, with an emergency dispatch center over an emergency communication session during an emergency situation; b) providing, by the communication device, a current location for the communication device to the emergency dispatch center; and c) obtaining, by the communication device, a responder forecast for responder assets assigned to respond to the emergency situation from the emergency service.

In certain embodiments, disclosed herein are communication devices comprising at least one processor, a memory, a network element, and a computer program including instructions executable by the at least one processor to create an application comprising: a) a software module communicating with an emergency dispatch center over an emergency communication session during an emergency situation; b) a software module providing a current location for the communication device to the emergency dispatch center; and c) a software module obtaining a responder forecast for responder assets assigned to respond to the emergency situation from the emergency service.

In certain embodiments, disclosed herein are non-transitory computer-readable storage media encoded with a computer program including instructions executable by a processor to create an application comprising: a) a software module communicating with an emergency dispatch center over an emergency communication session during an emergency situation; b) a software module providing a current location for the communication device to the emergency dispatch center; and c) a software module obtaining a responder forecast for responder assets assigned to respond to the emergency situation from the emergency service.

In certain embodiments, provided herein are methods of providing a responder forecast for responder assets to a communication device, the method comprising: a) managing, by an emergency management system, an emergency communication session between a communication device and an emergency dispatch center; b) obtaining, by the emergency management system, a current location for the communication device; c) determining, by the emergency management system, a type of emergency service that is sent in response to the emergency situation; d) estimating, by the emergency management system, a responder forecast based on at least one of historical and statistical data; e) adjusting, by the emergency management system, the responder forecast based on current conditions; and f) providing, by the emergency management system, the responder forecast to a communication device of a user based on user type.

In certain embodiments, disclosed herein are methods of facilitating data exchange during an emergency situation, the method comprising: a) receiving, by an emergency management system, a request for emergency assistance from a communication device; b) obtaining, by the emergency management system, emergency information comprising location information for the communication device; c) identifying, by the emergency management system, an emergency dispatch center for responding to the emergency situation from a plurality of emergency dispatch centers based on the location information; d) sending, by the emergency management system, an emergency alert for the emergency situation to the emergency dispatch center; e) providing, by the emergency management system, the emergency information comprising the location information for the emergency situation to the emergency dispatch center; and f) facilitating, by the emergency management system, data exchange between the at least one communication device and the emergency dispatch center by processing data into a format compatible with a recipient of the data.

In certain embodiments, disclosed herein are emergency management systems comprising at least one processor, a memory, a network element, and a computer program including instructions executable by the at least one processor to create a server application comprising: a) a software module receiving a request for emergency assistance from a communication device; b) a software module obtaining emergency information comprising location information for the communication device; c) a software module identifying an emergency dispatch center for responding to the emergency situation from a plurality of emergency dispatch centers based on the location information; d) a software module sending an emergency alert for the emergency situation to the emergency dispatch center; e) a software module providing the emergency information comprising the location information for the emergency situation to the emergency dispatch center; and f) a software module facilitating data exchange between the at least one communication device and the emergency dispatch center by processing data into a format compatible with a recipient of the data.

In certain embodiments, disclosed herein are non-transitory computer-readable storage media encoded with a computer program including instructions executable by a processor to create a server application comprising: a) a software module receiving a request for emergency assistance from a communication device; b) a software module obtaining emergency information comprising location information for the communication device; c) a software module identifying an emergency dispatch center for responding to the emergency situation from a plurality of emergency dispatch centers based on the location information; d) a software module sending an emergency alert for the emergency situation to the emergency dispatch center; e) a software module providing the emergency information comprising the location information for the emergency situation to the emergency dispatch center; and f) a software module facilitating data exchange between the at least one communication device and the emergency dispatch center by processing data into a format compatible with a recipient of the data.

In certain embodiments, disclosed herein are methods of facilitating data exchange between parties to an emergency situation, the method comprising: a) obtaining, by the emergency management system, location information for a plurality of communication devices; b) storing, by the emergency management system, the location information in a location information database; c) formatting, by the emergency management system, the location information in a standard format compatible with industry standards for location based information storage and retrieval for emergency response; d) receiving, by the emergency management system, a request for location information for at least one device of the plurality of communication devices, said request sent by a requesting device; e) authenticating, by the emergency management system, the requesting device for access to the location information; and f) providing, by the emergency management system, the location information to the requesting device.

In certain embodiments, disclosed herein are emergency management systems comprising at least one processor, a memory, a network element, and a computer program including instructions executable by the at least one processor to create a server application comprising: a) a software module obtaining location information for a plurality of communication devices; b) a software module storing the location information in a location information database; c) a software module formatting the location information in a standard format compatible with industry standards for location based information storage and retrieval for emergency response; d) a software module receiving a request for location information for at least one device of the plurality of communication devices, said request sent by a requesting device; e) a software module authenticating the requesting device for access to the location information; and f) a software module providing the location information to the requesting device.

In certain embodiments, disclosed herein are non-transitory computer-readable storage media encoded with a computer program including instructions executable by a processor to create a server application comprising: a) a software module obtaining location information for a plurality of communication devices; b) a software module storing the location information in a location information database; c) a software module formatting the location information in a standard format compatible with industry standards for location based information storage and retrieval for emergency response; d) a software module receiving a request for location information for at least one device of the plurality of communication devices, said request sent by a requesting device; e) a software module authenticating the requesting device for access to the location information; and f) a software module providing the location information to the requesting device.

In certain embodiments, disclosed herein are methods of facilitating data exchange during an emergency situation, the method comprising: a) receiving, by an emergency management system, a plurality of emergency communications from a plurality of communication devices, each emergency communication corresponding to an emergency situation for a user of a communication device; b) obtaining, by the emergency management system, location information for the plurality of communication devices; c) determining, by the emergency management system, a current location based on the location information for each communication device; d) determining, by the emergency management system, an emergency dispatch center responsible for a jurisdiction of the location of each communication device; e) sending, by the emergency management system, an emergency alert to an emergency dispatch center for each of the plurality of emergency communications, said emergency alert comprising a current location for a corresponding communication device; and f) facilitating, by the emergency management system, data exchange between the communication device and the emergency service by processing data into a format compatible with each recipient of said data.

In certain embodiments, disclosed herein are emergency management systems comprising at least one processor, a memory, a network element, and a computer program including instructions executable by the at least one processor to create a server application comprising: a) a software module receiving a plurality of emergency communications from a plurality of communication devices, each emergency communication corresponding to an emergency situation for a user of a communication device; b) a software module obtaining location information for the plurality of communication devices; c) a software module determining a current location based on the location information for each communication device; d) a software module determining an emergency dispatch center responsible for a jurisdiction of the location of each communication device; e) a software module sending an emergency alert to an emergency dispatch center for each of the plurality of emergency communications, said emergency alert comprising a current location for a corresponding communication device; and f) a software module facilitating data exchange between the communication device and the emergency service by processing data into a format compatible with each recipient of said data.

In certain embodiments, disclosed herein are non-transitory computer-readable storage media encoded with a computer program including instructions executable by a processor to create a server application comprising: a) a software module receiving a plurality of emergency communications from a plurality of communication devices, each emergency communication corresponding to an emergency situation for a user of a communication device; b) a software module obtaining location information for the plurality of communication devices; c) a software module determining a current location based on the location information for each communication device; d) a software module determining an emergency dispatch center responsible for a jurisdiction of the location of each communication device; e) a software module sending an emergency alert to an emergency dispatch center for each of the plurality of emergency communications, said emergency alert comprising a current location for a corresponding communication device; and f) a software module facilitating data exchange between the communication device and the emergency service by processing data into a format compatible with each recipient of said data.

In certain embodiments, disclosed herein are methods of managing access to data, the method comprising: a) receiving, by an emergency management system, a request to access data and an authorization code from a requesting device; b) checking, by the emergency management system, the authorization code to determine that the requesting device is authorized to access the data; c) obtaining, by the emergency management system, the requested data; and d) sending, by the emergency management system, the requested data in a format compatible with the requesting device.

In certain embodiments, disclosed herein are emergency management systems comprising at least one processor, a memory, a network element, and a computer program including instructions executable by the at least one processor to create a server application comprising: a) a software module receiving a request to access data and an authorization code from a requesting device; b) a software module checking the authorization code to determine that the requesting device is authorized to access the data; c) a software module obtaining the requested data; and d) a software module sending the requested data in a format compatible with the requesting device.

In certain embodiments, disclosed herein are non-transitory computer-readable storage media encoded with a computer program including instructions executable by a processor to create a server application comprising: a) a software module receiving a request to access data and an authorization code from a requesting device; b) a software module checking the authorization code to determine that the requesting device is authorized to access the data; c) a software module obtaining the requested data; and d) a software module sending the requested data in a format compatible with the requesting device.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "communication device" refers to a device with a communication component, which will allow it to send and receive information over a wireless channel, a wired channel, or any combination thereof (e.g., sending/receiving information over the Internet). Exemplary communication devices include a mobile phone (e.g., a smartphone), a laptop, a desktop, a tablet, a radio (e.g., a two-way radio), and a vehicular communication system. In some embodiments, a communication device includes a car security system (e.g., OnStar®), a home security system, or a home control system (e.g., a networked control system for providing network controlled and/or smart temperature control such as a Wi-Fi smart thermostat, lighting, entertainment, and/or door control). In some embodiments, a communication device is a wearable device (e.g., a communication device worn by a user). In some embodiments, a communication (e.g., a wearable device) comprises one or more sensors. In some embodiments, a communication device is connected to a communication network, for example, a cellular network or the Internet. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, a "request for assistance" refers to a request or message sent to a recipient asking for help. In some embodiments, an emergency alert is a request for assistance. In some embodiments, an emergency alert comprises a request for assistance. In some embodiments, an emergency alert comprises a request for assistance and digital information associated with the request for assistance. In some embodiments, a request for assistance is an emergency request for assistance (e.g., the request is associated with an emergency situation). In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request. As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "first responder" or "responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder is a person assigned by a private company or organization to respond to an emergency situation. In some embodiments, a first responder includes one or more fire fighters, police officers, emergency medical personnel, community volunteers, private security, security personnel at a university, or other persons employed to protect and serve the public and/or certain subsets of the population. In some embodiments, a first responder is a person assigned by a private towing service to tow a vehicle that has malfunctioned. In some embodiments, a first responder is assigned by a private company (such as a taxi company) to respond to an emergency for one of the taxi vehicles in its fleet.

As used herein, "responder assets" refers to one or more responders (e.g. first responders) to an emergency situation. In some embodiments, responder assets comprise medical assets (e.g. EMTs/ambulances). In some embodiments, responder assets comprise police assets. In some embodiments, responder assets comprise firefighter assets. In some embodiments, responder assets comprise private security assets. In some embodiments, responder assets comprise towing assets (e.g. tow truck assigned to tow a malfunctioning or damaged vehicle).

As used herein, an "emergency situation" or "emergency" refers to a situation requiring assistance or relief. In some embodiments, the need for assistance or relief is urgent. In some embodiments, an emergency situation requires an emergency response providing assistance or aid. In some embodiments, an emergency situation requires assistance under urgent time pressure. In some embodiments, the emergency situation is a vehicle accident or malfunction, a crime, a medical condition, a fire, or other situation requiring assistance.

As used herein, a "recipient" refers to one or more persons, services, or systems that receive a request for assistance. The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center. In exemplary embodiments, an emergency dispatch center is a public safety answering point which is a call center responsible for answering calls to an emergency phone number. In some embodiments, an emergency dispatch center is a private security dispatch center. In some embodiments, an emergency dispatch center is a non-public dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security officers who are closer to the child than the parent. Security is then able to pick up the child quickly using the data set associated with the member device, which they are given authorization to access by the parent's communication device.

As used herein, a "user" refers to one or more person or persons associated with a device (e.g., communication device, member device, second device, device of a first responder, etc). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc).

As used herein, "data" refers to electronically stored information (e.g. digital information). Accordingly, as an example, location information and location data have the same meaning. In some embodiments, data includes digital information about one or more entities (e.g., user of a user communication device) and/or an environment that pertains to characteristics of the one or more entities. In some embodiments, an entity is a person. In some embodiments, an entity is a thing (e.g., a house or a device). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "data set" refers to a collection of digital information comprising the most recent and relevant information about an emergency situation and/or imminent emergency situation. Data set is used interchangeably with "meta-data set." In some embodiments, a "data set" comprises information about a user, information about a surrounding environment of the user and/or the user device. In some embodiments, the data set refers to a collection of information about an emergency situation not involving a user (e.g., emergency situation involves a device or something associated with the device). As an example, in one embodiment, when a home security device sends an emergency request (e.g., fire emergency based on internal thermostat sensor readings) to an emergency service (e.g., local fire department), the data set for the home security device comprises the sensor readings from one or more thermostats or heat sensors located around the home. In some embodiments, a data set is stored on a database or database cache of a device (e.g., communication device). In some embodiments, a data set is stored on a database or database cache external to a device (e.g., on a network). In some embodiments, a data set is stored on a database or database cache of an emergency management system.

As used herein, "emergency data" refers to digital information about a person or a situation that provide awareness about the emergency situation. In some embodiments, emergency data comprises information on devices involved in the emergency situation (e.g., devices belonging to persons involved in the emergency situation). In some embodiments, emergency data comprises the type of emergency (e.g., car accident, crime, medical emergency, or fire emergency), data associated with the user of the device requesting emergency assistance (e.g., location data for the user's device), data about other users in the vicinity of the user, and data about the devices involved in the emergency situation. In some embodiments, emergency data comprises one or more of location data, health data, user data, and sensor data.

Location data, as the term is used herein, refers to digital information for at least one of GPS location information, Wi-Fi based location information, location information manually entered by a user into the user's communication device, position information from the cellular network provider obtained via triangulation of the received signal strengths from three or more separate cellular phone base stations, location information derived from received signal strengths indicators (RSSI) received at a Wi-Fi router and/or signal strengths of signals received at a Wi-Fi router of digital signals sent from the user communication device, and any other form of location information. In some embodiments, location data comprises a location of a device determined using a location determination method. In further embodiments, a location determination method is selected from GPS satellite triangulation, cell tower triangulation, Wi-Fi triangulation, Bluetooth triangulation, RSSI, time-of-flight, angle of arrival, fingerprinting, barometric pressure, or any combination thereof. In some embodiments, location is determined using more than one method in combination to obtain a more accurate location. In some embodiments, location data comprises coordinates (e.g., XYZ coordinates, longitude, latitude, altitude, etc), an address (e.g., an address equivalent to coordinates that provides a current dispatchable location for emergency response). In some embodiments, location data comprises historical location (e.g., where user has traveled in the past). In some embodiments, historical location comprises one or more locations of the user and/or user device equal to or greater than 1, 2, 3, 4, 5, 10, 15, 20, 25, 30, 40, 50, or 60 minutes old, including increments therein. In some embodiments, the historical location comprises one or more locations of the user and/or user device equal to or greater than 1, 2, 3, 4, 5, 6, 7, 8, 9, 10, 11, 12, 13, 14, 15, 16, 17, 18, 19, 20, 21, 22, 23, or 24 hours old. In some embodiments, location data comprises current location, wherein current location comprises one or more locations of the user and/or user device within the past 1, 2, 3, 4, 5, 10, 15, 20, 25, 30, 40, 50, or 60 minutes, including increments therein. In some embodiments, location data comprises current location, wherein current location comprises one or more locations of the user and/or user device within the past 1, 2, 3, 4, 5, 6, 7, 8, 9, 10, 11, 12, 13, 14, 15, 16, 17, 18, 19, 20, 21, 22, 23, or 24 hours.

As used herein, "health data" refers to digital information associated with medical information of a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, health data comprises a "limited data set" of identifiable patient information as defined by the Health Insurance Portability and Accountability Act (HIPAA) (e.g., for purposes of protecting patient confidentiality and/or privacy). In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to digital information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to digital information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge (e.g., to estimate altitude for locating which floor a person is on during an emergency), a thermometer, a proximity sensor, a motion detector (e.g., in a home security system), an occupancy sensor, or any combination thereof, and in some embodiments, sensor data comprises information obtained from any of the preceding sensors. In some embodiments, a sensor is installed on a vehicle such as a car. In some embodiments, a vehicle sensor comprises one or more of an accelerometer, camera (e.g., providing photos and/or video feed), collision sensor, throttle position sensor, manifold absolute pressure sensor, engine coolant temperature sensor, mass air flow sensor, crankshaft position sensor, camshaft position sensor, detonation sensor, oxygen sensor, intake air temperature sensor, EGR position sensor, EGR temperature sensor, air-fuel ratio meter, blind spot monitor, curb feeler, defect detector, parking sensor, radar gun, speedometer, tire pressure sensor, torque sensor, transmission fluid temperature sensor, vehicle speed sensor, water sensor, and wheel speed sensor. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component). In some embodiments, sensors are calibrated using one or more calibration standards or calibration process to provide known accuracies or uncertainties in the sensor values.

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, "about" refers to a value range of 10% less to about 10% more than a stated value. For example, about 1 minute refers to 0.9 minute to 1.1 minute.

Emergency Communications

In some embodiments, an emergency communication such as an emergency alert or call is initiated by a digital processing device or an associated device via a one touch interaction by a user. In some embodiments, a device is configured to recognize a one touch interaction comprising a single user interaction, for example, touch, swipe, voice, tap or other forms of user interactions, as an initiation of a request for emergency assistance from a user of the communication device. In some embodiments, the user interaction is a one touch interaction from the user that causes the communication device to initiate a call requesting emergency assistance. In other embodiments, the user interaction is a sequence of two (dual touch) user interactions. In some embodiments, the communication device uses either a first or a second user interaction to authenticate or verify the identity of the user of the communication device. In some embodiments, the communication device sends an emergency alert to an emergency service (e.g., emergency management system or emergency dispatch center) after user authentication. In some embodiments, the alert comprises information or data about the user (e.g., user name, health records, emergency contact information, family information, or a combination thereof) that are relevant to emergency response personnel in providing emergency assistance to the user.

In some embodiments, the one touch process comprises any single interaction with a physical (e.g. a hard button) or non-physical interactive element (e.g. a soft button on a touchscreen) of a digital processing device. For example, in one particular embodiment, a one-touch process comprises pressing the home button of a smart phone for at least 5 seconds. In some embodiments, a one touch interaction is a user interaction with a soft button on the device display. In some embodiments, an emergency communication is initiated via a voice command (e.g., "no touch" emergency communication/request). In some embodiments, the voice command is configured by a user. In some embodiments, the voice command provides voice authentication authorizing a user to send an emergency communication without requiring the user to unlock the device by, for example, entering a password.

In some embodiments, an emergency management system comprises a server software application comprising a software module for establishing a communication session between a communication device and a recipient of a request for assistance. In some embodiments, the software module is referred to as an emergency communication module. It is understood that one or more functions of the emergency communication module is capable of being performed by one or more other software modules described herein. In some embodiments, the emergency communication module forwards or the request for assistance to another recipient (e.g., an EDC, PSAP, first responder, private security service, friend or relative, etc.). In some embodiments, the emergency management system is an intermediary recipient that facilitates communications between a communication device requesting assistance and an end recipient such as, for example, a PSAP. In some embodiments, the emergency communication module provides digital information associated with the communication device to the recipient. In some embodiments, the emergency management system uses digital location information associated with the communication device to identify an EDC (e.g., a PSAP) serving the jurisdiction where the communication device is located before the emergency management system contacts the EDC. In some embodiments, the emergency management system provides additional digital information relevant and/or useful to facilitating the emergency response (e.g., medical data relevant to a medical emergency) to the recipient.

Data

In some embodiments, a communication device comprises a software module for obtaining digital information about an emergency situation. In some embodiments, the software module is referred to as a data intake module. In some embodiments, the one or more functions of the data intake module are carried out by one or more other software modules described herein. In some embodiments, the digital information comprises at least one of sensor data, user data, health data, and location data as described elsewhere herein. In some embodiments, the data intake module obtains data (e.g., digital information) associated with the communication device and uses the data to update a data set associated with the communication device. In some embodiments, the data intake module autonomously obtains data for the communication device. In some embodiments, the data intake module obtains data for the communication device from a source other than the communication device. For example, in some embodiments, the data intake module obtains data from one or more sensors associated with the communication device (e.g., a wearable heart monitor having a Bluetooth connection with the communication device). In some embodiments, the source is an external sensor capable of communicating with the communication device either directly (e.g., via a Bluetooth or Wi-Fi connection) or indirectly (e.g., communicates via a router or intermediate device or over the Internet). In some embodiments, the source is an associated device of the communication device. For example, in some embodiments, an associated device is a wearable device, a cell phone, a panic button, or a sensor (e.g., security camera, digital thermometer, etc) in proximity to the communication device. In some embodiments, a device in proximity to the communication device has a location that is within 1, 2, 3, 4, 5, 6, 7, 8, 9, 10, 15, 20, 25, 30, 35, 40, 45, 50, 55, 60, 65, 70, 75, 80, 85, 90, 95, or 100 meters, including increments therein, of a location of the communication device.

In some embodiments, the data intake module obtains data periodically. In some embodiments, the data intake module obtains data aperiodically (e.g., not at regular intervals). In some embodiments, the data intake module obtains data continuously (e.g., constantly at short intervals such as, for example, every 5 seconds). In some embodiments, the data intake module comprises settings configurable by a user to determine what data is obtained (e.g., location data, user data, sensor data, or any combination of data), how the data is obtained (e.g., directly from the member device, indirectly from another member device, from a cache database storing data for the group of devices, from an EMS, etc), and how often the data is obtained (e.g., every X minutes or hours, or whenever the current location data changes). In some embodiments, periodicity of task is determined by utilizing algorithms for adjusting frequency, such as exponential back-off, based on a number of heuristics. For example, obtaining data may begin once per second and decrease to once per 10 seconds over a period of 10 minutes.

In some embodiments, the data intake module obtains data (e.g., a data set) comprising one or more categories of data. In some embodiments, data is selected from location data, health data, user data, sensor data, and any combination thereof.

In some embodiments, a communication device comprises a software module for sharing digital information with a recipient (e.g., an emergency service such as an EMS or PSAP). In some embodiments, the digital information comprises location information or data for the device. In some embodiments, the software module for sharing digital information is a data sharing module. In some embodiments, the data sharing module shares data autonomously. In some embodiments, the data sharing module shares data upon request by a recipient (e.g., an emergency service). In some embodiments, the data sharing module shares data upon user instruction (e.g., user input). For example, in some embodiments, the communication device receives a request to share location data from an emergency dispatch center. In some embodiments, the data sharing module shares data periodically. In some embodiments, the data sharing module shares data aperiodically (e.g., not at regular intervals). In some embodiments, the data sharing module shares data continuously (e.g., constantly at short intervals such as, for example, every 1-5 seconds). I some embodiments, data associated with a communication device is stored on one or more associated devices and/or on one or more external databases (e.g., on a network). Accordingly, in some embodiments, the data sharing module stores digital information on an associated device or on an external database. This is useful in situations when the communication device becomes unresponsive and/or has not authorized the member device to obtain data directly. In some embodiments, the data sharing module comprises settings configurable by a user to determine what data is shared (e.g., location data, user data, sensor data, or any combination of data), how the data is shared (e.g., directly with the member device, indirectly via another member device, via a cache database storing data for the group of devices, via an EMS, etc), and how often the data is shared (e.g., every X minutes or hours, or whenever the current location data changes).

In some embodiments, the data sharing module shares digital information updates as new information becomes available. In some embodiments, the data sharing module shares updated digital information when a threshold condition is reached. In some embodiments, a threshold condition is a time since digital information was last shared. For example, in the case of periodic data sharing described above, a threshold is a set time period for sharing data (see above time intervals for sharing data). In some embodiments, a threshold condition is a threshold distance between a current location of the digital processing device and the location shared in the previous data share/update. In some embodiments, a threshold distance is at least 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 450, 500, 600, 700, 800, 900, 1000, or more meters, including increments therein. For example, in one scenario, the digital processing device has a threshold distance set at 20 meters. The previous data update provided a location for the device. When the digital processing device moves during the course of the emergency communications at least 20 meters away, the digital processing device threshold distance is triggered, and the device sends a digital information update comprising the new current location.

PSAP Auto-Update

In some aspects, disclosed herein are systems, methods, and devices for changing or updating an emergency dispatch center (EDC, e.g. a PSAP) during an emergency situation. There are various EDC needs to be changed from the initial EDC during an emergency communication session. In some cases, the location of the communication device requesting emergency assistance has changed. For example, in some cases, the device is on a moving vehicle and moves from the jurisdiction of a first EDC into the jurisdiction of a second EDC during the course of an emergency call with the first EDC. In some cases, the initial location of the communication device is inaccurate (e.g. based on cell tower positioning or triangulation), which results in the emergency call being routed to an incorrect EDC. Then, once updated location information that provides greater accuracy (e.g. GPS or Wi-Fi triangulation) is obtained, there is a need to transfer the call to a new EDC that services the updated location of the communication device. In some cases, the first EDC party to the communication session is the correct EDC, but it is not suitable for handling the emergency situation for any number of reasons. In some cases, the EDC lacks appropriate resources for handling the emergency. For example, the first responders associated with the EDC (e.g. work with the EDC and are assigned to emergencies by the EDC lack training for dealing with a particular emergency type. In some embodiments, emergency information is obtained that provides an indication of the emergency type. For example, medical information such as heart monitor sensor data indicating a cardiac arrest requires medical assistance. In some cases, all the ambulances/EMTs for the particular EDC are not available (e.g. for the next 45 min). Accordingly, in some embodiments, a second EDC that has the appropriate first responders is needed to direct them to the emergency location. In some embodiments, the first EDC does not have any available first responders. In some embodiments, the first EDC does not have first responders trained and/or equipped to respond to the emergency situation. For example, an EMT is not trained or equipped to handle a wildfire.

In some embodiments, an emergency management system (EMS) manages a communication session between a communication device and a first emergency dispatch center (e.g. a PSAP). In some embodiments, the EMS manages the communication session by routing communications between the parties to the session (in this case, the device and the EDC). In some embodiments, the EMS manages the communication session by evaluating information or data sent between the parties to the session.

In some embodiments, the EMS determines that a second EDC is more suitable for responding to the emergency situation than the first EDC for any of the reasons stated earlier. In some embodiments, the EMS obtains location information and/or other emergency information from the communication device. In some embodiments, the EMS determines that the device location has changed such that the first EDC no longer services the location of the device, and identifies a second EDC that does service the location of the device. In some embodiments, the EMS determines that the first EDC lacks resources for responding to the emergency situation based on emergency information for the emergency situation. In some embodiments, the emergency information comprises user information. In some embodiments, the emergency information comprises medical information. In some embodiments, the emergency information comprises location information. In some embodiments, the emergency information comprises information about an EDC. In some embodiments, information about the EDC comprises information on one or more first responders associated with the EDC. For example, information about the EDC include one or more of number of first responders, types of first responders (e.g. police, medical, fire), availability of first responders, contact information of first responders, and location of first responders. In some embodiments, the EMS determines that the first EDC has failed to respond to the emergency situation such as, for example, not responding to an emergency call or communication sent by the communication device for a threshold period of time. In these cases, the communication session is a one-sided communication session since the EDC is not actively participating in the communication session. In some embodiments, the threshold period of time is at least 5, 10, 15, 20, 25, 30, 40, 50, 60 seconds. In some embodiments, the threshold period of time is at least 1, 2, 3, 4, 5, 6, 7, 8, 9, or 10 minutes. In some embodiments, the EMS determines that the first EDC has lost connection to the communication session.

In some embodiments, the emergency management system facilitates the transfer of the communication session. There are a number of ways in which the transfer is accomplished. In some embodiments, the EMS provides contact information for the second EDC to the first EDC that allows an operator/dispatcher at the first EDC to contact the second EDC to transfer the call. In some embodiments, the EMS provides an interactive link to the first EDC that an operator/dispatcher can click to be put in contact with the second EDC. In some embodiments, the EMS adds the second EDC to the ongoing communication session enabling the first dispatcher and second dispatcher to communicate with the communication device. In some embodiments, the EMS then removes the first EDC from the communication session. In some embodiments, the EMS initiates a new communication session between the communication device and the second EDC, and terminates the original communication session between the communication device and the first EDC. It is understood that these are non-limiting examples of how an EMS facilitates transfer of the communication session from the first EDC to the second EDC.

In some embodiments, the changing and/or updating of a EDC/PSAP during an emergency communication session is carried out by the communication device rather than the EMS. In some embodiments, certain functions are carried out remotely (e.g. at the EMS or other third party server), but the command to execute said functions originate with the communication device.

Location Tracking of First Responders

In some embodiments, disclosed herein are systems, methods, and devices for providing location tracking of first responders during an emergency situation. When users make emergency calls using their communication devices, they often receive limited information on the first responders, which is usually provided by dispatchers who assure them that help is on the way. However, in some cases, additional information is useful for reassuring a user in the emergency situation, facilitates self-help, and improves the chances of a successful emergency response. For example, a user who knows help is estimated to arrive soon can experience a boost in motivation or morale. Alternatively, a user who knows help will take more time can prepare mentally and physically for enduring the delay. In some cases, a user who knows a direction the first responders are approaching from is able to head in that direction. For example, a user who is injured and located in a wooded area flanked by two roads will know what road to head to if he is provided with some information on the approach of the first responders (e.g. direction of travel, road being taken, speed of travel, actual location such as GPS coordinates, etc). In some cases, the user has detailed knowledge of the environment and is able to offer corrections or helpful information based on knowledge of the location of first responders. For example, a hiker who is injured hiking in a park during the winter may know that first responders should not approach from a particular bridge because he saw that it was damaged and in need of repair. Accordingly, in some situations, it is helpful for a caller/user in an emergency situation to be given access to location (usually limited) information of first responder(s) assigned to respond to the emergency situation.

In some embodiments, a communication device obtains information for one or more first responders during an emergency situation. In some embodiments, the communication device obtains a first responder forecast. In some embodiments, the first responder forecast is obtained from an emergency service such as, for example, an emergency management system or an emergency dispatch center. In some embodiments, the first responder forecast is obtained upon request. In some embodiments, authorization is provided in order to receive the first responder forecast. In some embodiments, the emergency management system generates the first responder forecast and sends it to the communication device. In some embodiments, the communication device belongs to a user in an emergency situation. In some embodiments, the communication device belongs to an authorized user such as, for example, a first responder who is not responding to the current emergency situation. In some embodiments, an authorized user is a police officer, a firefighter, or an emergency medical technician. In some embodiments, access to information is limited based on user type and/or emergency type. For example, in some embodiments, a police officer responding to a crime/medical emergency has authorization to access real-time location information for other officers responding to the same emergency in order to provide situational awareness for the officers as a group. However, in this example, an emergency medical technician does not have the same real-time access to location information, but has access to medical history information for the user or subject in the emergency situation (e.g. medical history obtained from the user's communication device) to help resolve the medical emergency.

In some embodiments, the communication device displays information from the first responder forecast for a user. For example, in some embodiments, the location of the first responder is displayed as text and/or on a map. In some embodiments, the current location of the first responder is displayed. In some embodiments, the current location is provided with maximum accuracy based on the information available. In some embodiments, the current location is provided as an area. In some embodiments, the area is purposely larger than a minimum area to reduce resolution. For example, in many cases, it is not desirable to let users see exactly where first responders are located during an emergency situation. In some embodiments, the minimum area is at least 10, 20, 30, 40, 50, 60, 70, 80, 90, 100, 200, 300, 400, 500, 600, 700, 800, 900, 1000, 2000, 3000, 4000, or 5000 square meters. In some embodiments, the location of the first responder is not provided. In some embodiments, one or more of a direction of the first responder, a speed of travel, an estimated time to arrival, an estimated distance to arrival (e.g. via straight line or travel distance using roads/navigable pathways), a mode of transportation of the first responder, a type of first responder (e.g. police, firefighter, EMT), and a type of emergency is provided.

Data Sharing

In certain aspects, disclosed herein are systems, methods, and devices for sharing information between various parties. For example, in some embodiments, multiple parties are involved in an emergency situation and response and can include a communication device of a user in the emergency situation, various sensors/devices associated with the user communication device, an emergency dispatch center, third parties such as some ALI databases, and one or more first responders. In many cases, each one of these parties utilize different technologies, devices, and/or software to communicate. In some cases, the technologies are analog or digital. In some cases, mobile devices are used, while other parties use computer consoles. Various data formats and encryption settings are utilized as well and often lack consistency or standardization. As a result, communications between these various parties during emergency situations are inconsistent and vary from jurisdiction to jurisdiction. Accordingly, disclosed herein are systems and methods for harmonizing and bridging these disparate parties through an emergency management system. In some embodiments, an emergency management system acts as an intermediary between various parties during emergency situations to ensure interoperability and that communications are properly formatted so that recipients of said communications are able to receive and open them. User communication devices typically do not format location based data/meta-data in a format that is accessible by an emergency dispatch center or a location database such as an ALI database. In some embodiments, the EMS formats all data received into a data format compatible with industry standards (e.g. emergency communication standards) such as the National Emergency Number Association (NENA) Standard Data Format for ALI Data Exchanges and GIS Mapping. In some embodiments, the EMS formats data into NENA standard format regardless of the incoming data format or the device that sends the data.

In some embodiments, the EMS facilitates data exchange between the various parties during emergency communications by processing and responding to data requests. In some embodiments, the EMS receives a request for data from a requesting device. In some embodiments, the EMS also receives an authorization code for the request for data. In some embodiments, the EMS checks the authorization code to determine that the requesting device is authorized to access the requested data. In some embodiments, the authorization code varies depending on the user type for the requesting device. For example, a police officer and an emergency medical technician have authorization to access different types of data depending on the type of emergency.

In some embodiments, the EMS stores additional information other than location information. In some embodiments, the EMS stores emergency information. In some embodiments, the EMS stores user information. In some embodiments, the EMS stores medical information for the user. In some embodiments, the EMS stores sensor information. In some embodiments, the sensor information comprises physiological parameters. In some embodiments, the sensor information comprises environmental parameters. In some embodiments, the sensor information or data is obtained from an Internet of Things sensor. In some embodiments, the sensor information is obtained from an ad hoc mesh network of sensors. In some embodiments, a sensor is a wearable sensor, an IoT sensor, or a vehicular sensor. In some embodiments, sensor information is obtained from a sensor selected from the group consisting of: a thermometer, an electrical conductance meter, a carbon dioxide sensor, a carbon monoxide sensor, a smoke detector, an oxygen sensor, an air flow sensor, an air speed sensor, a magnetometer, a gyroscope, an accelerometer, an air pressure sensor, an air moisture sensor, a photodetector, a Geiger counter, a magnetic field sensor, a motion sensor, a sound sensor, an acid sensor, a base sensor, a hazardous chemical sensor, a vibration sensor, a volatile organic compound sensor, a smog sensor, and a video camera; wherein a physiological parameter is obtained from a sensor selected from the group consisting of a heart rate monitor, a thermometer, a respirometer, a blood glucose monitor, an electrolyte sensor, a blood pressure sensor, a blood oxygen sensor, an electromyography sensor, an electroencephalogram sensor, an electrocardiogram sensor, a body hydration sensor, and a blood alcohol sensor.

DETAILED FIGURE DESCRIPTIONS

FIG. 1A shows a schematic diagram of one embodiment of a device described herein. In some embodiments, the device 106 is an electronic device such as a communication device (e.g., mobile or cellular phone, computer, laptop, etc.). In some embodiments, a communication device is a wearable device. In some embodiments, a communication device is a wireless mobile device or a smart phone. In some embodiments, a communication device is a walkie-talkie or a two-way radio. In some embodiments, a user 100 (not shown) is selected from one or more persons who are the primary users of the device 106. In some embodiments, a communication device is a requesting device that requests data from an emergency service such as an emergency management system or an emergency dispatch center.

In some embodiments, the device 106 comprises at least one processor 104, a memory 105 (e.g., an EPROM memory, a RAM, a solid-state memory), a display 102, a user interface 113, a network component 114 (e.g., an antenna and associated components, Wi-Fi adapters, Bluetooth® adapters, etc.) and a software application 108 (e.g., mobile application, computer program, application). In some embodiments, the software application comprises one or more software modules 128. In some embodiments, the device is equipped with a location component 118, for example, a global positioning system (GPS). In some embodiments, the device comprises data storage 115. In further embodiments, the device comprises a location data cache 117. In further embodiments, the device comprises a user data cache 119.

In some embodiments, the device 106 has several components including a display 102 and user interface 113, which allow the user 100 to interact with the device 106. In some embodiments, the display 102 is a part of the user interface 113 (e.g., a touchscreen is both a display and provides an interface to accept user interactions). In some embodiments, the display 102 and/or the user interface 113 comprises a touch screen (e.g., a capacitive touch screen), which is capable of displaying information and receiving user input. In some embodiments, the device 106 comprises hardware components not including a display 102 and a user interface 113, wherein the device functions autonomously without requiring active user guidance or interaction. In some embodiments, data may be obtained from devices without a user interface, such as a health monitoring device or environmental monitoring device. In some embodiments, the monitoring device has one or more sensors for sensing health parameters of a user or environmental parameters. In some embodiments, the health monitoring and can be controlled remotely by a medical professional.

In some embodiments, a device 106 includes various accessories 122 (not shown) that allow additional functionality. In some embodiments, the accessories 122 (not shown) include one or more of the following: microphone (e.g., for user voice interaction), a camera (e.g., for input of gestures commands or pictures from the user 100), speakers, one or more sensors such as a fingerprint reader or scanner, USB/micro-USB port, headphone jack, a card reader, SIM card slot, Bluetooth button, and any combination thereof.

FIG. 1A also shows a schematic diagram of one embodiment of an emergency management system 130 as described herein. In some embodiments, the emergency management system 130 comprises one or more of an operating system 132, at least one central processing unit or processor 134, a memory unit 136, a communication element 138, and a computer program such as a server application 148. In some embodiments, the server application 148 comprises one or more software modules 149. In some embodiments, the emergency management system 130 comprises one or more databases 135. In some embodiments, the emergency management system 130 comprises a location database 137. In some embodiments, the emergency management system 130 comprises a user information database 139. In some embodiments, the emergency management system 130 comprises a Geographic Information System (GIS) database 147.

Figure 1B:
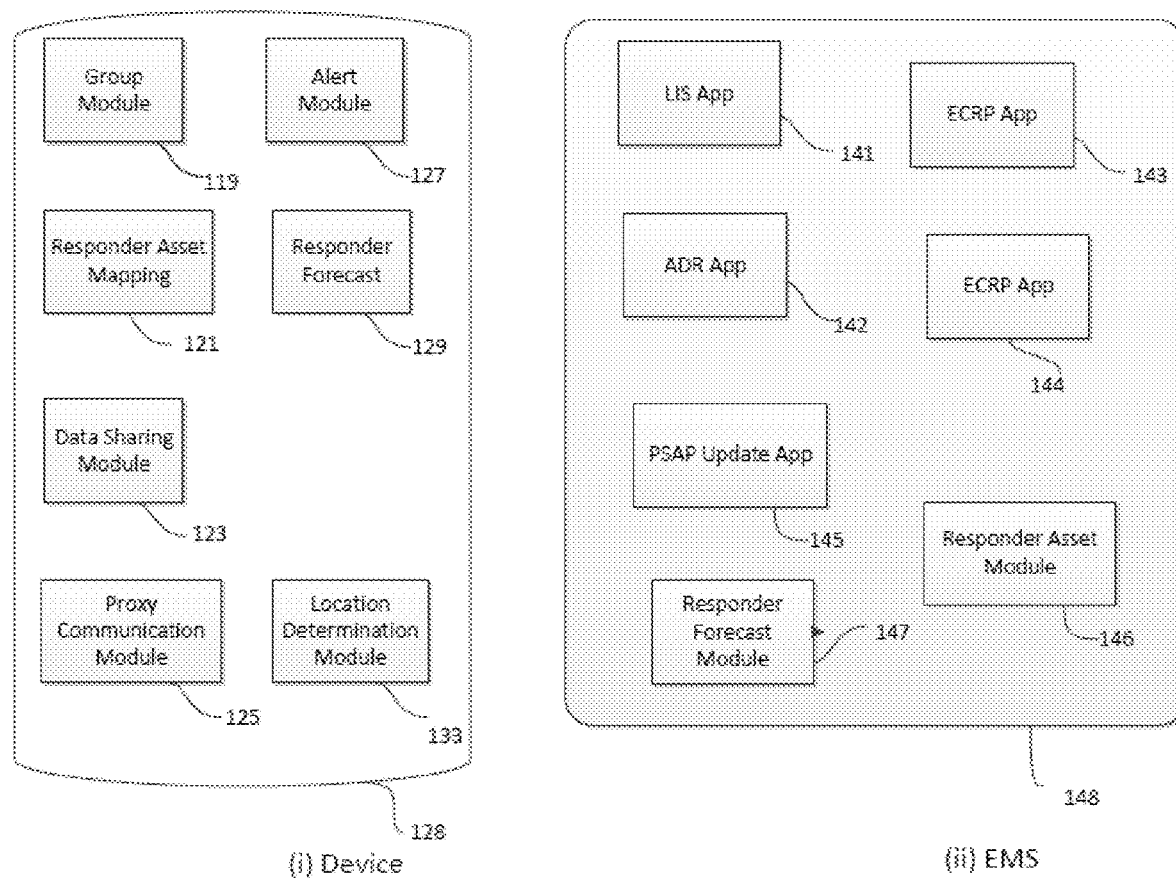

FIG. 1B shows a schematic diagram of one embodiment of a software application or computer program 128 installed on a device. In some embodiments, the software application 128 comprises one or more software modules. In some embodiments, a software module is a group module 119, an alert module 127, a responder asset mapping module 121, a responder forecast module 129, a data sharing module 123, a proxy communication module 125 or a location determination module 133.

FIG. 1B also shows a schematic diagram of one embodiment of a computer program such as a server application 148 installed on a server (e.g., a server in an EMS). In some embodiments, the server application 148 comprises one or more server software modules. In some embodiments, a software module is a LIS App 141, ADR App 142, a first ECRP App 143, a second ECRF App 144, PSAP update App 145, a responder asset module 146 or a responder forecast module 147.

Figure 1C:
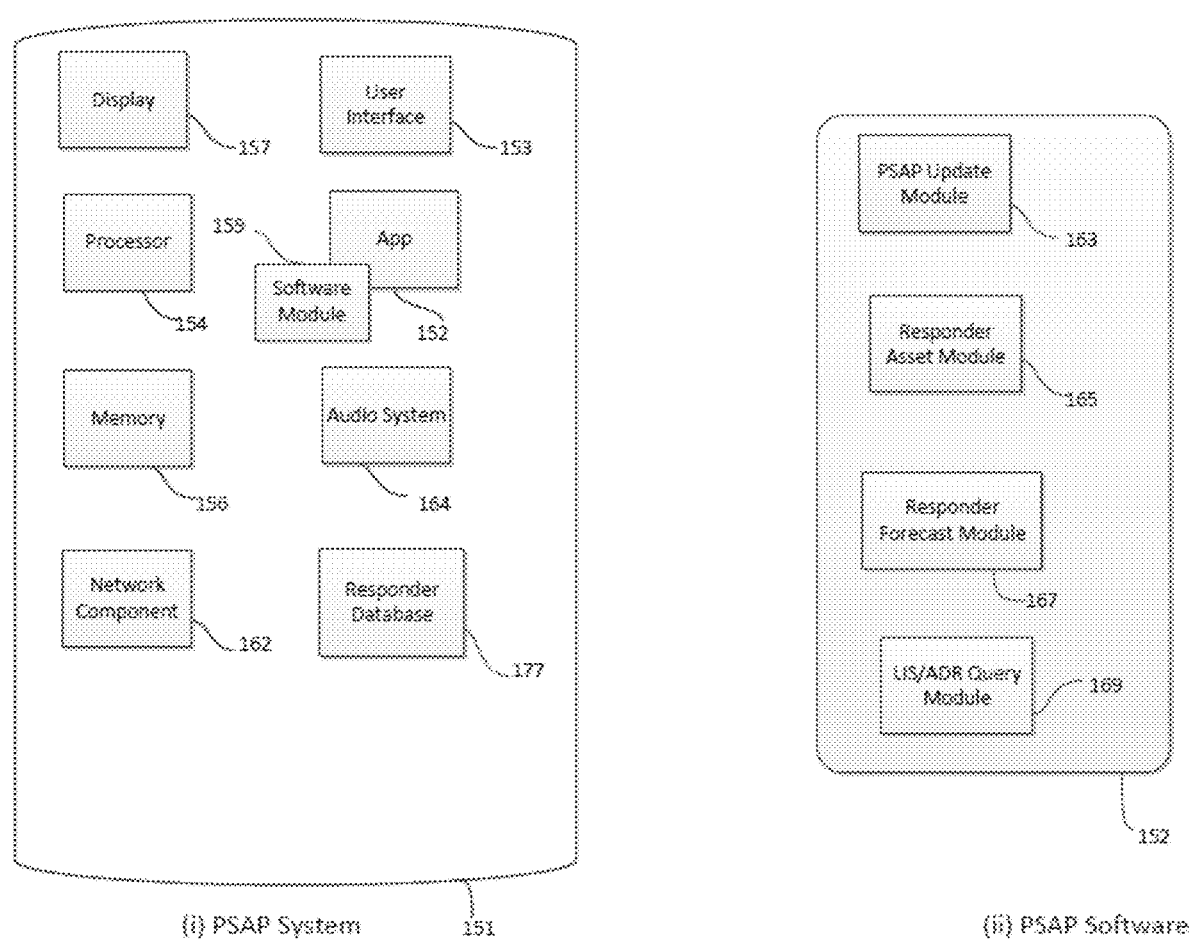

FIG. 1C shows a schematic diagram of one embodiment of a Public Safety Answering Point (PSAP) system 151 as described herein. In some embodiments, the PSAP system 151 comprises one or more of display 157, at least one central processing unit or processor 154, a memory unit 156, a network component 162, an audio system 164 (e.g. microphone, speaker and/or a call-taking headset) and a computer program such as a PSAP Application 152. In some embodiments, the PSAP application 152 comprises one or more software modules 159. In some embodiments, the PSAP system 151 comprises a database of responders 177 (not shown), such as medical assets, police assets, fire response assets, rescue assets, safety assets, etc.

Figure 2:
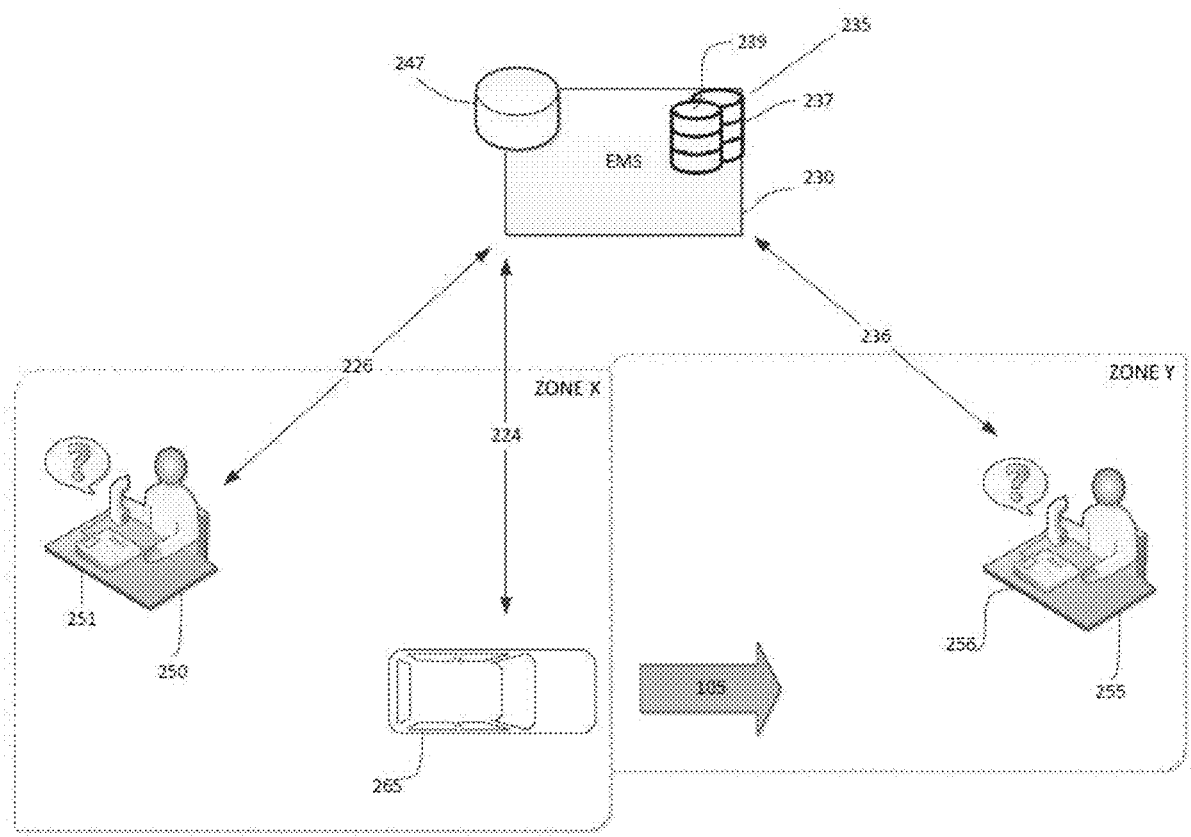
FIG. 2 is an illustration of one embodiment of a communication device traveling from one area to another.

FIG. 1C also shows a schematic diagram of one embodiment of a PSAP application 152 installed on a PSAP system (e.g., a server in the PSAP system). In some embodiments, the server application 152 comprises one or more server software modules. In some embodiments, a software module is a call handling module 161 (not shown), a PSAP update module 163, a responder asset module 165, a responder forecast module 167 or an LIS/ADR query module 169.
PSAP Update FIG. 2 is an illustration of one embodiment of a communication device traveling from one area to another. As shown, a vehicle 265 with a communication device 206 (not shown) is traveling from Zone X to Zone Y serviced by two different emergency service providers—EDC-1 250 & EDC-2 255. Zone X is the jurisdictional boundary of EDC-1 250, which is adjacent to Zone Y, which is the jurisdictional boundary of EDC-2 255. In some embodiments, the jurisdictional boundary is smooth (as shown), straight, curved or irregular. In some embodiments, the jurisdictional boundary includes a natural boundary such as, for example, a body of water, a waterway (e.g. river), a mountain, a trench, a valley, or a rock formation. In some embodiments, the jurisdictional boundary includes an artificial boundary such as, for example, a road or highway. When the jurisdictional boundary is irregular, the appropriate EDC (such as PSAP) to respond to an emergency situation (e.g. a peninsula in the jurisdictional boundary) can change rapidly.

In some embodiments, a communication device 206 (not shown) may be a vehicle console or a car security system. In some embodiments, the vehicle 265 is a connected car configured to send a communication (e.g. an emergency alert). In some embodiments, the communication device 206 (not shown) is a mobile phone (e.g. a smartphone), a laptop, a tablet, a radio (e.g. a two-way radio), or a wearable device. In some embodiments, a user 200 (not shown) is the driver or a passenger in the car and uses the communication device 206 (not shown) to send an emergency alert to an emergency management system 230.

The communication device 206 includes a network component 264 (e.g. a Wi-Fi antenna, not shown) for sending and receiving communication(s). In some embodiments, the communication device 206 includes an interface 263 (not shown) for receiving a user interaction indicative of an emergency situation (e.g. by pressing a soft or hard button, a gesture, or a voice command) by a user 200 (not shown). In some embodiments, the communication device 206 includes a location component 216 (not shown) (e.g. GPS, location API, etc.).

In some embodiments, the communication device 206 shares location data, for example, dependent on whether the last transmitted location data is within a certain time-frame of the current time, based on a cycle for transmission of the location data, or if a certain minimum distance has been covered by the device. In some embodiments, the emergency management system requests location data. In some embodiments, location data is transmitted when the last transmitted location data was received at a time that is equal to or greater than the current time by a threshold time-frame. In some embodiments, the threshold time-frame is at least 1, 2, 3, 4, 5, 6, 7, 8, 9, 10, 15, 20, 25, 30, 35, 40, 45, 50, 55, or 60 or more seconds. In some embodiments, the threshold time-frame is at least 1, 2, 3, 4, 5, 6, 7, 8, 9, 10, 15, 20, 25, 30, 35, 40, 45, 50, 55, or 60 or more minutes. In some embodiments, the threshold time-frame is at least 1, 2, 3, 4, 5, 6, 7, 8, 9, 10, 11, 12, 13, 14, 15, 16, 17, 18, 19, 20, 21, 22, 23, or 24 or more hours. In some embodiments, the location data is transmitted about every 1, 2, 3, 4, 5, 6, 7, 8, 9, 10, 15, 20, 25, 30, 35, 40, 45, 50, 55, or 60 or more seconds. In some embodiments, the location data is transmitted about every 1, 2, 3, 4, 5, 6, 7, 8, 9, 10, 15, 20, 25, 30, 35, 40, 45, 50, 55, or 60 or more minutes. In some embodiments, the location data is transmitted about every 1, 2, 3, 4, 5, 6, 7, 8, 9, 10, 11, 12, 13, 14, 15, 16, 17, 18, 19, 20, 21, 22, 23, or 24 or more hours. In some embodiments, location data is transmitted when the device is estimated to have changed location by a minimum distance from its location based on its previously transmitted location data. For example, location data (GPS coordinates+time-stamp of data packets) transmitted by a device shows the device is traveling north at 60 miles per hour, and once 1 minute has passed (indicating travel distance of 1 mile), the device transmits current location data again. In some embodiments, the distance that the device has traveled is determined, for example, by identification of cellular base station information received from decoding the packets and frames at a communication module of the communication device 206. In some embodiments, the minimum distance that the device has traveled from its location is at least about 10, 20, 30, 40, 50, 60, 70, 80, 90, 100, 150, 200, 250, 300, 350, 400, 450, 500, 600, 700, 800, 900, or 1000 or more meters.

In some embodiments, the communication device 206 shares location data with the EMS 230. As shown, the EMS 230 includes one or more databases 235 for saving data from the communication device 206, such as a location database 237 and a user information database 239. In some embodiments, the location data is saved in a dedicated database as shown (location database 237). In other embodiments, the location data is saved together with other user information in the same database(s) (not shown). In some embodiments, the database(s) 235 are located on a remote server or on the cloud. In some embodiments, the database(s) 235 are third party database(s) that the EMS 230 has access to.

In some embodiments, the database(s) 235 comprise one or more database systems including, by way of non-limiting examples, relational, non-relational, object oriented, associative, and XML database systems. In some embodiments, the database(s) 235 is a relational database with time-stamped columns such as user name, phone number (or call back number), location data, sensor data, saved user data, and other information. In some embodiments, the data is saved in a non-relational or NoSQL database associated with a time-stamp and a user ID (such as phone number, user's name, or device ID, etc.). In some embodiments, the categories of data include one or more of altitude, caller ID, cell carrier, device IMEI, device model, device number, emergency number, location accuracy, location altitude, location latitude, location longitude, location time, place address, source, time, registered address, registered engine, and uncertainty radius.

In some embodiments, the EMS 230 comprises a locationing center including a Geographic Information System (GIS) database 247. The GIS allows for accurate call routing and location validation by providing mapping data such as polygon data for jurisdictional boundaries, location of features such as cell towers and other fixed infrastructure (e.g. streets, buildings). In some embodiments, the EMS 230 comprises an Emergency Call Routing Function (ECRF) and an Emergency Services Routing Proxy (ESRP) for routing emergency calls.

In some embodiments, location data is shared while the communication device is transitioning in-between service areas of EDC-1 250 and EDC-2 252. In some embodiments, a communication device detects a need, either autonomously or based on user input, for transmitting its location data to an EMS 230. In some embodiments, the communication device transmits location data based on a sharing trigger (e.g. a condition or threshold that when satisfied, causes transmission of location data to a recipient such as an EMS). In some embodiments, the sharing trigger can be instantiated by the completion of a periodic time-interval, the completion of a non-time cycle, a sensor value reporting, for example, an accelerometer reporting a change in speed or a gyroscope reporting a change in altitude, and/or a change in distance determined by a computation based on GPS sensor values. In some embodiments, responsive to the instantiation of this trigger, the communication device sends the current location data to the EMS 230. In some embodiments, the location data of the communication device is determined using GPS coordinates, Wi-Fi positioning, Bluetooth beacon positioning, cellular base station triangulation, or any other form of locationing. In some embodiments, when the user has initiated an emergency communication (e.g. call, message, or emergency alert) using the communication device 206, the location data from the communication device is sent to the EMS 230 on a periodic basis during the emergency communication or emergency session and/or after the emergency communication or emergency session. In some embodiments, the emergency alert is triggered by autonomously (e.g. by a crash detection system) and location data is shared periodically.

Upon receiving the latest location data from the communication device 206 via a data communication channel 224, in some embodiments, the EMS 230 saves location data to a location database 235. In other embodiments, the EMS 230 accesses the location data in a remote server or a third-party database. In some embodiments, the EMS 230 obtains location data from other devices associated with the user 200. For example, the user 200 sends an emergency alert using a smart watch, but the EMS 230 obtains the current location data from the vehicle console of the vehicle 265.

In some embodiments, the current location data is used for routing the emergency call or emergency session. For example, an emergency call received at a switch in a selective routing database (SRDB) is routed to an appropriate EDC. In some embodiments, the EMS 230 includes an ECRF for routing the call based on jurisdictional boundaries provided in a GIS database 247 (see FIG. 3). For example, in some embodiments, the database 235 provides the EMS 230 with an indication or warning that the user and the communication device 206 are moving (or will soon move, e.g., within the next 1, 5, or 10 minutes) from the service area of EDC-1 251 (with dispatcher system 251) into the service area of EDC-2 255 (with dispatcher system 256). In some embodiments, once the EMS 230 receives the information about EDC-2 252, the EMS 230 uses an ECRF (not shown) to identify the appropriate EDC-2 as the appropriate EDC. When the vehicle 265 is on the jurisdictional border region (e.g. within 50, 100, 150, 300, 400, 500 or more meters of the border), the fact that it is heading in direction 105 towards Zone Y is determinative of a change in EDC, in some embodiments. Thus, the EMS 230 detects a change in the EDC (such as a PSAP) for user 200 or for communication device 206. In some embodiments, EDC-1 250 is maintained as the previous EDC that the communication device was associated with. In further embodiments, EDC-1 250 is maintained as the previous EDC until another previous EDC for the communication device is identified and saved.

During an emergency situation, in some embodiments, the user-initiated or autonomously detected emergency alert is sent to the EMS 230. Initially, in some embodiments, the EMS 230 identifies the appropriate jurisdiction as EDC 250 for Zone X. In some embodiments, the EMS 230 detects that the user or the communication device has moved to another EDC 255 for Zone Y. In some embodiments, the EMS 230 acts based on a set of rules depending on various factors such as call technology, PSAP system capabilities, state or regional laws and policies, software integration with the PSAP, etc. As an illustrative example, the emergency call is transferred to the second PSAP, if the first PSAP has not answered the call. In further embodiments, there is a timer that must elapse before the call is transferred to another EDC (e.g. PSAP) when the first PSAP has not answered the call. In some embodiments, the EMS 230 initiates an emergency call or emergency session with PSAP-1 250 via communication link 226. Even when there is minimal integration with first PSAP, in some embodiments, the EMS 230 monitors the emergency call using SIP signals for a VoIP call on link 226. Specifically, if the SIP responses indicate that the emergency call has not been successfully connected to EDC-1, in some embodiments, the emergency call is transferred to EDC-2 via communication link 236. In some embodiments, SIP signals or response codes indicate that the emergency call has not been connected, and include, for example, "provisional responses" (e.g. 100. Trying, 180 Ringing, 181 Call is being forwarded, 182 Queued, etc.), "redirection responses", "client failure responses", "server failure responses", and/or "global failure responses". As shown, when the vehicle 265 is crossing the jurisdictional border, in some embodiments, the EMS 230 detects a PSAP change. In some embodiments, if the call has not been answered at PSAP-1, it is transferred to PSAP-2.

In some embodiments, with more integration with the PSAP-1 system 251, the EMS 230 is able to inform the system 251 that the device has moved to a region served by a different EDC, such as PSAP-2 255. In some embodiments, there is a software module within the PSAP-1 system 251 (not shown) that may be able to display the updated PSAP information to PSAP operators who are handling the emergency call. In some embodiments, the display includes the contact information and calling number for PSAP-2 in the message. In some embodiments, the message includes a link for a PSAP operator of PSAP-1 251 to click to be connected to the PSAP-2 255.

In some cases, the emergency call is transferred when the appropriate PSAP (e.g. PSAP-1) has not answered even after a timer delay has passed, e.g., 5, 10, 20, 30, 40, 50, 60 seconds. The EMS 230 uses various methods to identify and assign the emergency call to another PSAP (e.g. PSAP-2) including proximity to the emergency, type of emergency, severity of the emergency, resources available to the new PSAP, or state or regional laws and policies. In some embodiments, the closest PSAP to the emergency location in the same regional or state network is preferred. In some embodiments, some PSAPs may designate neighboring PSAPs as backup or overflow facilities, where the call will be diverted to if the PSAP does not answer or the lines are busy.

Figure 3:
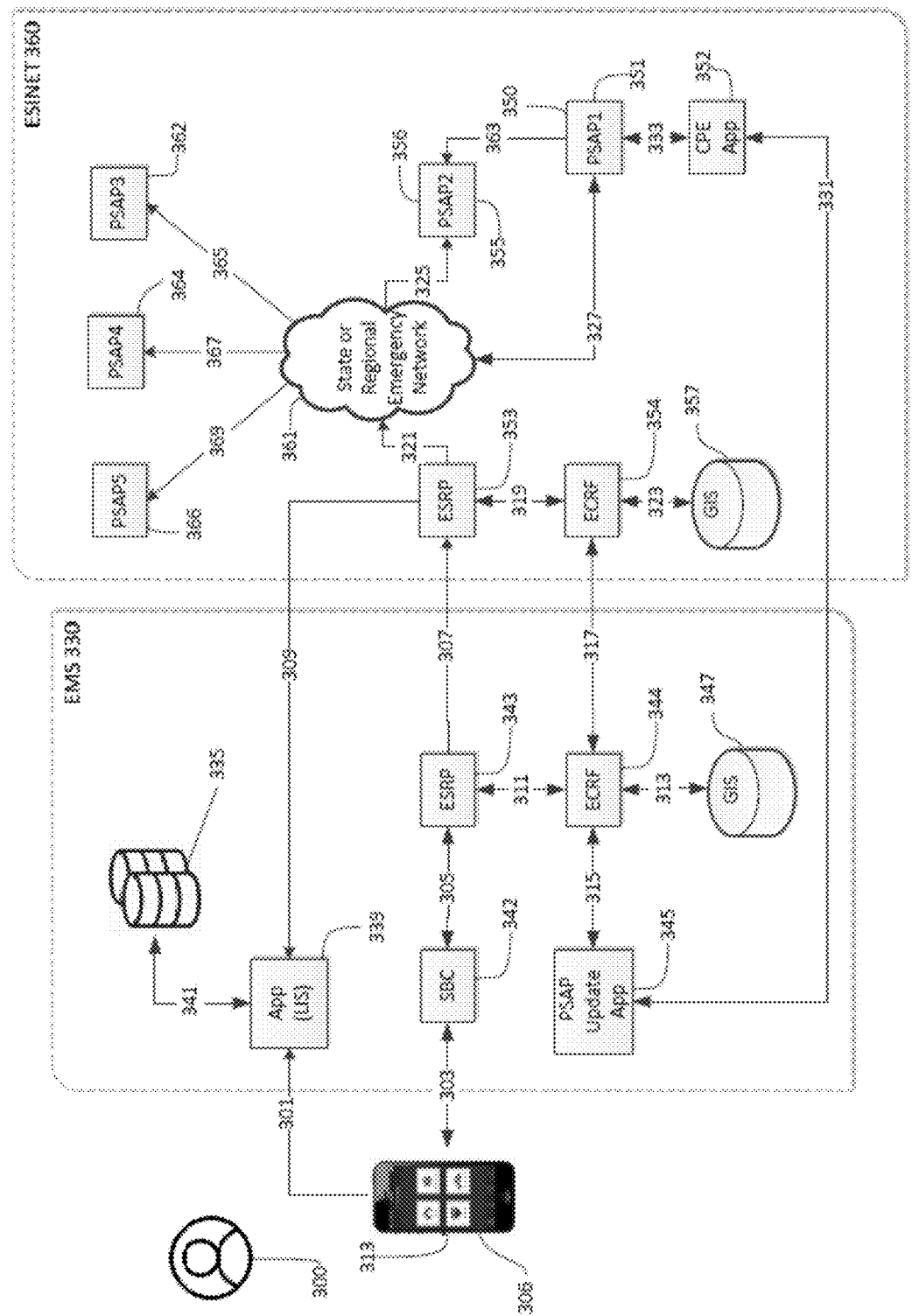
FIG. 3 depicts an embodiment of a system for detecting a change in the jurisdiction of the PSAP.

FIG. 3 depicts an embodiment of a system for detecting a change in the jurisdiction of the PSAP. As shown, user 300 of the communication device 306 (e.g. a mobile phone) initiates an emergency alert by interacting with the user interface 313. The device 306 sends the emergency alert to an EMS 330, which in turn, establishes an emergency session or emergency call with Emergency Services IP Network or ESINet 360. Among other ESINets (not shown), ESINet 360 is the emergency services network that has the jurisdiction for serving the user's 300 location. Specifically, PSAP-1 350, which is a services provider in the ESINet 360 is the "appropriate" emergency service provider serving the location. In some embodiments, the emergency alert is triggered autonomously by the device 306 based on readings from one or more triggers (e.g. a health parameter, an environmental parameter, etc.). In some embodiments, the emergency call or emergency session is initiated when the device 306 initiates an emergency session (such as an emergency call) by sending an emergency alert or indication of an emergency via communication link 303. For example, for voice over long term evolution (VoLTE), the session border controller sends a SIP INVITE to device 306.

Figure 10:
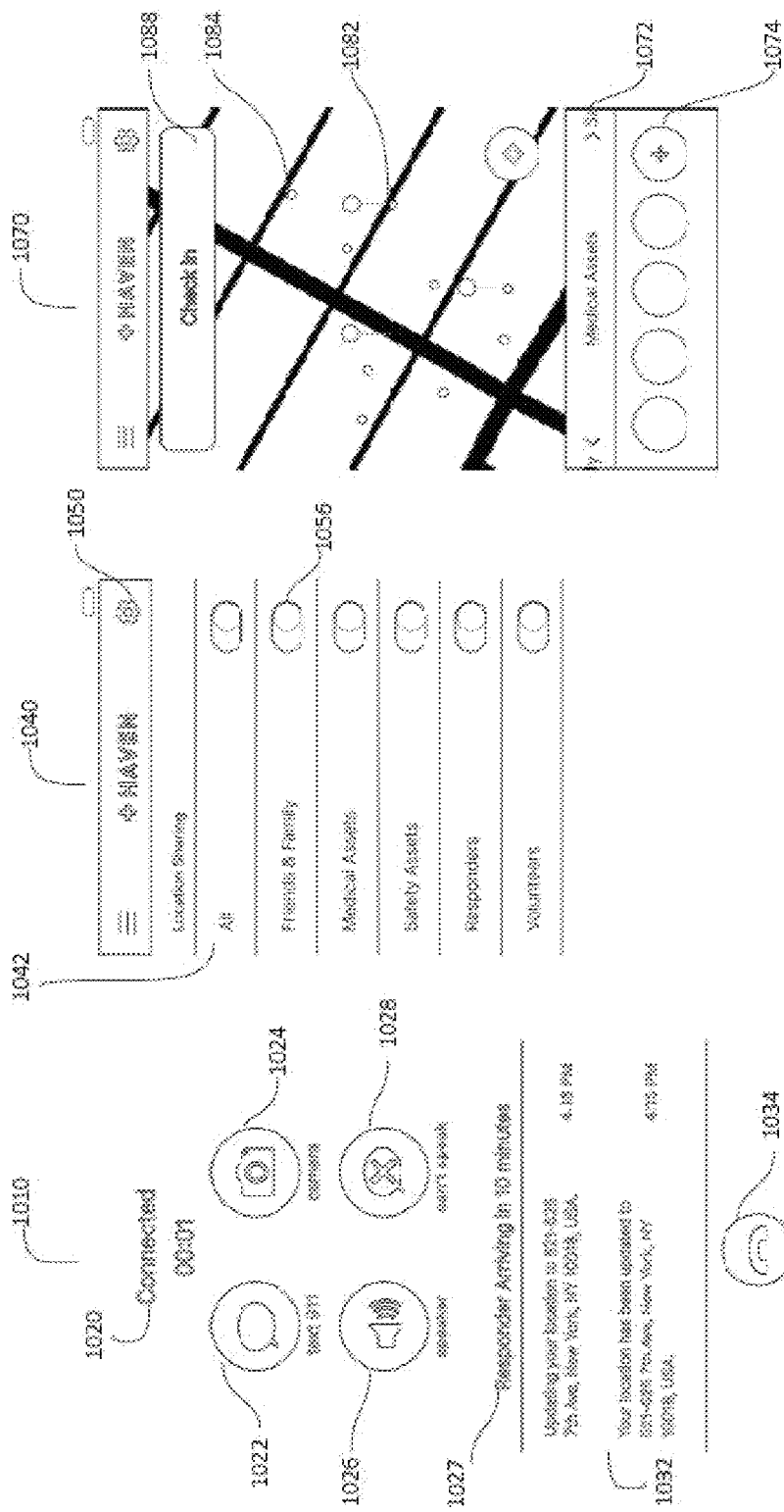
FIGS. 10A-10C depict exemplary screenshots of a communication device.

During an emergency, the device 306 periodically transmits its location (e.g. from GPS positioning, Wi-Fi positioning, cellular base station triangulation, etc.) to the EMS 330. Specifically, the device 306 sends location data to an application 339 via a secure communication link 301. In addition to location data, in some embodiments, the device 306 sends other data such as user data, emergency data, sensor data, or other data informative of the emergency situation. In some embodiments, data from device 306 is saved in one or more databases 235. In some embodiments, the application 339 supports Location Information Server (LIS) and/or Additional Data Repository (ADR) queries for the databases 235 (e.g., via secure communication link 309). The queries, responses and authentication options are described in reference to FIGS. 10-11.

In some embodiments, the EMS 330 also includes an access network with an internal ESINet compatible with National Emergency Number Association (NENA) standards. Specifically, in some embodiments, the EMS 330 includes or has access to ESRP 343, ECRF 344, GIS 347 for determining which ESINet to send the emergency call to, as described in reference to FIG. 2. In some embodiments, ESRP 343 and ECRF 344 are licensed copies of software that are used to make the determination. For this determination, the location data of the device 306 is used by the ESRP and ECRF by referring to the jurisdictional boundaries for the ESINet in the GIS 347.

In some embodiments, the ECRF 344 makes a non-authoritative determination and it is synchronized with the authoritative determination by the ECRF 354 in the ESINet 360 via communication link 317. The non-authoritative determination is helpful for several reasons. First, this allows the EMS 330 to make the initial determination of which ESINet to send the call. In some embodiments, ECRF 344 is dedicated for this determination. In other embodiments, ECRF 344 determines which PSAP within the ESINet is appropriate. Next, in some embodiments, the ECRF 344 is deployed for efficiency and/or speed so that extra time is not spent querying the authoritative ECRF 354 and the authoritative ECRF 354 does not bear undue load. In some embodiments, the emergency call setup takes minimal amount of time (e.g. less than or equal to 10, 9, 8, 7, 6, 5, 4, 3, 2, 1, 0.9, 0.8, 0.7, 0.6, 0.5, 0.4, 0.3, 0.2, or 0.1 seconds). In some embodiments, the ECRF 344 during call setup generates estimate(s) quickly against the coarse ESINet boundaries to determine the ESINet to send the call, while the ECRF 354 inside that ESINet uses granular PSAP boundaries that takes more time to make an accurate determination of the PSAP for call routing. In some embodiments, because it can also generate independent quick estimates of granular PSAP routing inside an ESINet, the ECRF 344 is capable of being queried repeatedly with updated location data via link 315 (unlike ECRF 354 which is typically queried only once around the start of the emergency call). This enables the EMS 330 to repeatedly provide a PSAP with updated location data for an ongoing emergency communication session, without adversely affecting system load in the ESINet 360 and on ECRF 354, and without incurring extra delay while queries traverse into ESINet 360. In some embodiments, once the ECRF 344 syncs with ECRF 354 via link 317, the determination is validated.

In some embodiments, a PSAP Update Application 345 in the EMS 330 periodically check if the jurisdiction of the device 306 has changed by using current/updated location data. In some embodiments, the device 306 periodically sends updated location data. In some embodiments, Application 345 detects if there is a change in the updated location data from the device 306. In some embodiments, Application 345 detects if there is a significant change in the updated location data from the device 306. In some embodiments, the Application 345 inputs the updated location data into ECRF 344 to determine if there is a change in the ESINet and/or PSAP based on jurisdictional boundaries in GIS 347.

On the ESINet 360 side, in some embodiments, the emergency session (e.g. an emergency call) is sent to the ESRP 353, which queries query databases 335 using the Application 339 (e.g. LIS queries for obtaining current location data for device 306). The ESRP 353, ESRF 354 and GIS 357 are used to make a determination of which ESINet, and/or PSAP to send the emergency call to. The ESRF 354 is best situated to make the authoritative determination. In some embodiments, the ESRF 354 within the ESINet 360 has up-to-date information about jurisdictional boundaries within its jurisdiction. In some embodiments, the ESRF 354 also has up-to-date information about resources, staffing, local conditions, etc. at the PSAPs in its region. Once a determination the "appropriate" PSAP is found, in some embodiments, the emergency session or call is routed through the state or regional emergency network 361 to the appropriate PSAP (here, PSAP-1 350). In some embodiments, the network 361 includes several PSAPs such as, for example, PSAP-2 255, PSAP-3 362, PSAP-4 364, PSAP-5 366, etc.

In some embodiments, at PSAP-1 350, there is a PSAP system 351 including hardware and software, which is used by PSAP operators for receiving and transferring the emergency session or call, collecting data about the emergency, sending responders to the emergency location, and/or carrying out other emergency response functions. Specifically, PSAP-1 350 includes a call taking or handling Application—CPE App 352. In some embodiments, a software module for PSAP update 363 (not shown) informs the PSAP operator(s) about a change in the PSAP via 333.

In some embodiments, the PSAP update module 363 allows PSAP operators at PSAP-1 to transfer the call to another PSAP (e.g. PSAP-2 355). In some embodiments, the PSAP operators continue on the line with a three-way call between device 306, PSAP-1 350 and PSAP-2 355. In other embodiments, the PSAP-1 disconnects from the emergency call/communication session when the user 300 is connected to PSAP-2 355. In some embodiments, the call transfer from PSAP-1 to PSAP 2 takes place via several secured pathways (e.g. internet gateway protected by VPN, or end-to-end TLS encryption, etc.). In some embodiments, when the PSAP Update Application 345 in the EMS 330 detects a change in PSAP based on updated location data from device 306, it displays a message with the new PSAP information (e.g. the call-in number, address, resources for PSAP-2 355) in the PSAP system 351 via secure pathway 331. In some embodiments, the message includes a link that allows the PSAP system 351 to connect to the PSAP system 356. In some embodiments, when the PSAP operator presses the link, he or she is connected to the PSAP-2 355 either the regional network 361 (e.g. via 325). In some embodiments, the emergency call is transferred directly from PSAP-1 to PSAP-2 via 335. In some embodiments, when PSAP-2 255 is in the same region or ESINet 360, the emergency session or emergency call is transferred via the regional network 361 via 327 and 325.

In some embodiments, when an emergency session or call is transferred to a new PSAP, the data from the emergency session or call is accessible by the new PSAP. Thus, data about the call (e.g. user's name, type of emergency, location of emergency, etc.) taken by the PSAP operator in one PSAP is accessible by other PSAP systems. For example, for NG911 systems, the PSAP systems that follow NENA XML formats for storing data in the Emergency Incident Data Document (EIDD), the data may be transferred. In other embodiments, legacy PSAP systems do allow such convenient data sharing between PSAPs. In situations with limited software integration, the EMS 330 detects that an emergency call has not been answered based on SIP responses and transfers the call to a new PSAP.

Pre-Emptive PSAP Determination

In some embodiments, even when an emergency situation has not arisen, the EMS proactively prepares for emergencies by associating a particular EDC (e.g. PSAP) with a particular user or device. As an illustrative example, a user has a medical condition such as osteoporosis and is susceptible to falls. Thus, disclosed herein are systems and methods for determining an appropriate PSAP for responding to an emergency before the emergency has taken place. In some embodiments, using the location data from the user's 300 communication device 306, the EMS 330 determines the ESINet and/or PSAP serving that location. For this determination, in some embodiments, a time-stamped last received location data from the communication device 306 is accessed from the databases 337.

In some embodiments, the EMS determines that updated location data is needed. For example, in some embodiments, updated location data is needed when location data has not been received in a certain cycle, the routing cellular base station information or Wi-Fi router information determined from decoding the received packets and frames at the communication modules has changed, the location data stored at the EMS 330 is outdated and does not reflect the latest location of the user 300 (e.g. location data is more than 24 hours old, 2 hours, 30 minutes, 10 minutes, etc.). In some embodiments, upon a determination that updated location data is needed, the EMS 330 sends a request to the communication device for the latest location data from device 306 using the data communication channel 301.

In some embodiments, upon receiving the request for current location data, the communication device 306 retrieves and transmits the latest location data to the EMS 330 over the data communication channel 301. In some embodiments, when the updated location data is received by the EMS 330, the updated location data is used for routing the call to the appropriate ESINet and/or PSAP. In some embodiments, the EMS 330 associates the appropriate ESINet and/or PSAP with the user account, phone number or device ID and saves the association in one or more databases (e.g. databases 235). In some embodiments, the EMS 330 decides whether or not the PSAP (e.g. PSAP-1 250) should be informed about the association. In some embodiments, this decision is made based on information (e.g. meta-data) available about the user 300, information available about the communication device 306, and/or other relevant medical and personal information available at the EMS 330 about the user 300 and the communication device 306 to help decide the urgency and importance of pro-actively informing the PSAP-1 350. In some embodiments, the EMS 330 sends the association information along with any identification and relevant information about the user 300.

Figure 4:
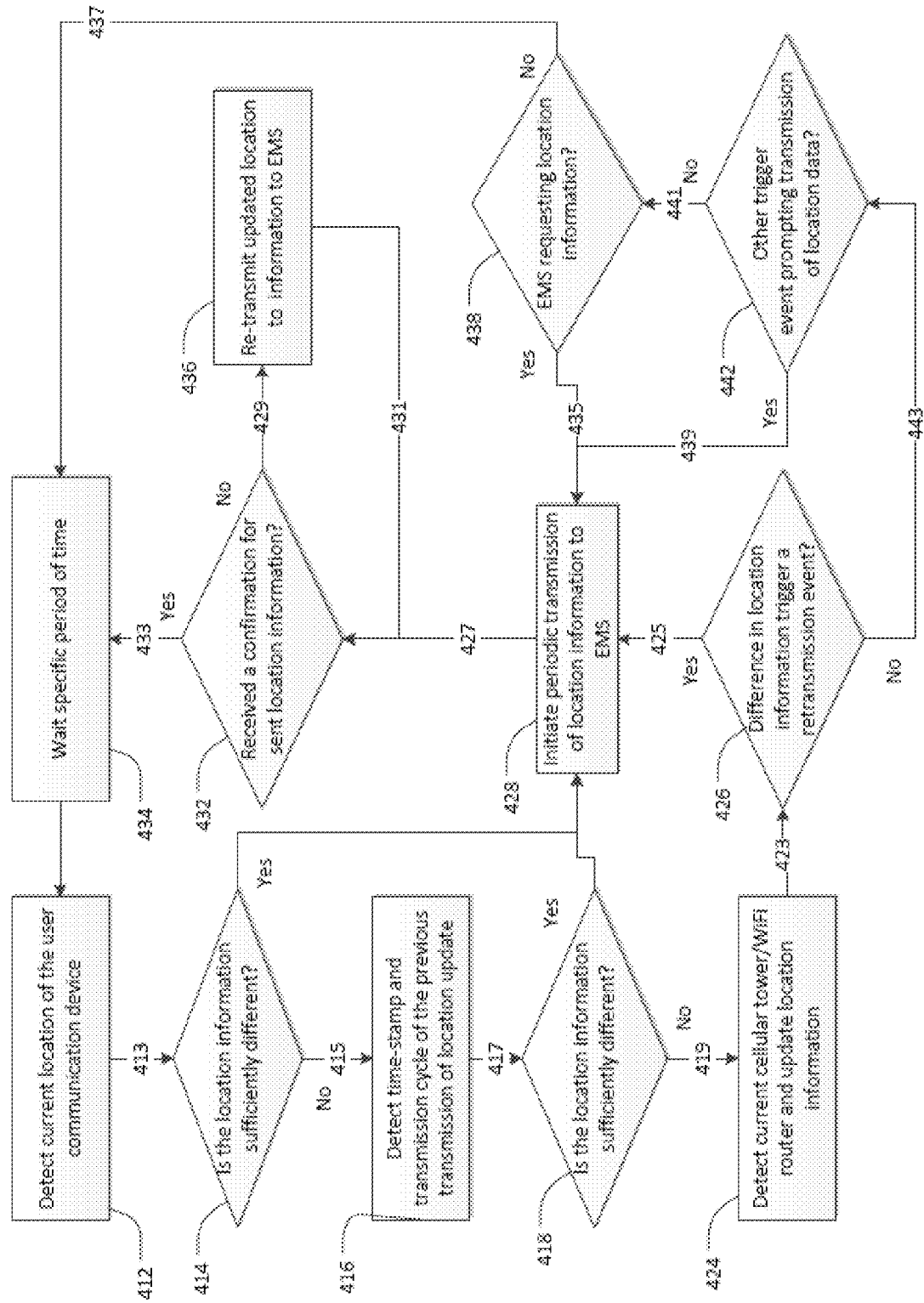
FIG. 4 is a flow chart of a process for a communication device to share location data.

FIG. 4 is a flow chart of one embodiment of a process for a communication device to share location data. In some embodiments, the EMS detects, either on a periodic basis, or as triggered by specific events, a time to update the location data about the device and send the updated location data, either autonomously or with user input (act 412). In some embodiments, the location data of the communication device is determined using GPS positioning, Wi-Fi positioning, Bluetooth beacon positioning, cellular base station triangulation, and/or any other technique known in the art. In the illustrative embodiment of FIG. 4, the communication device determines the latest location data about the device (act 414) and compares this location data to location data stored on the device (act 416 & 418). If the computed latest location data is not significantly different from the stored location data (act 414), then the communication device detects the time-stamp of the previous location data update sent from the communication device to the EMS (act 416), and determines the time difference between the current time and the time-stamp of the previous location data update (act 418). If the time difference is not greater than a pre-defined value for updating the EMS (act 418), the communication device detects identification information about the cellular base station routers or the Wi-Fi routers, in which it is in communication with and attempts to derive location data from the identity of these routers (act 424). If there is no significant difference in the location data derived from the information about the routers and the stored location data on the communication device (act 426), the communication device checks if there is any other trigger event which indicates that there may have been a significant change in the location of the communication device and hence prompts a location update transmission (act 442). If no trigger events are detected (act 442), the communication device checks to see if there is a request from the EMS for sending updated location data (act 438). If no such request is detected (act 438) the communication device waits for a specific period of time (act 434) and goes back to detecting the latest location data about the device (act 412).

If the computed latest location data is significantly different from the stored location data (act 414), and if the time difference between the current time and the time-stamp of the previous location data update is greater than a pre-defined value for updating the EMS (act 418), and if the derived location data from the digital packets from the routers and the stored location data on the device are significantly different (act 414), and if there is at least one trigger event indicating that there is a significant update in the location of the communication device (act 442), or if there is a request from the EMS for sending updated location data (act 438), the communication device initiates a transmission of the updated location data to the EMS (act 428) and confirms the transmission with the EMS (act 432). After sending the updated location data and confirming the transmission the communication device waits for a specific period of time (act 434) and goes back to detecting the latest location data about the device (act 412).

If the communication device in unable to confirm the transmission of the latest location data update with the EMS (act 432), the device re-transmits the location data to the EMS (act 436) and then confirms the transmission with the EMS (act 432). After successfully verifying the transmission the communication device waits for a specific period of time (act 434) and goes back to detecting the latest location data about the device (act 412).

Figure 5:
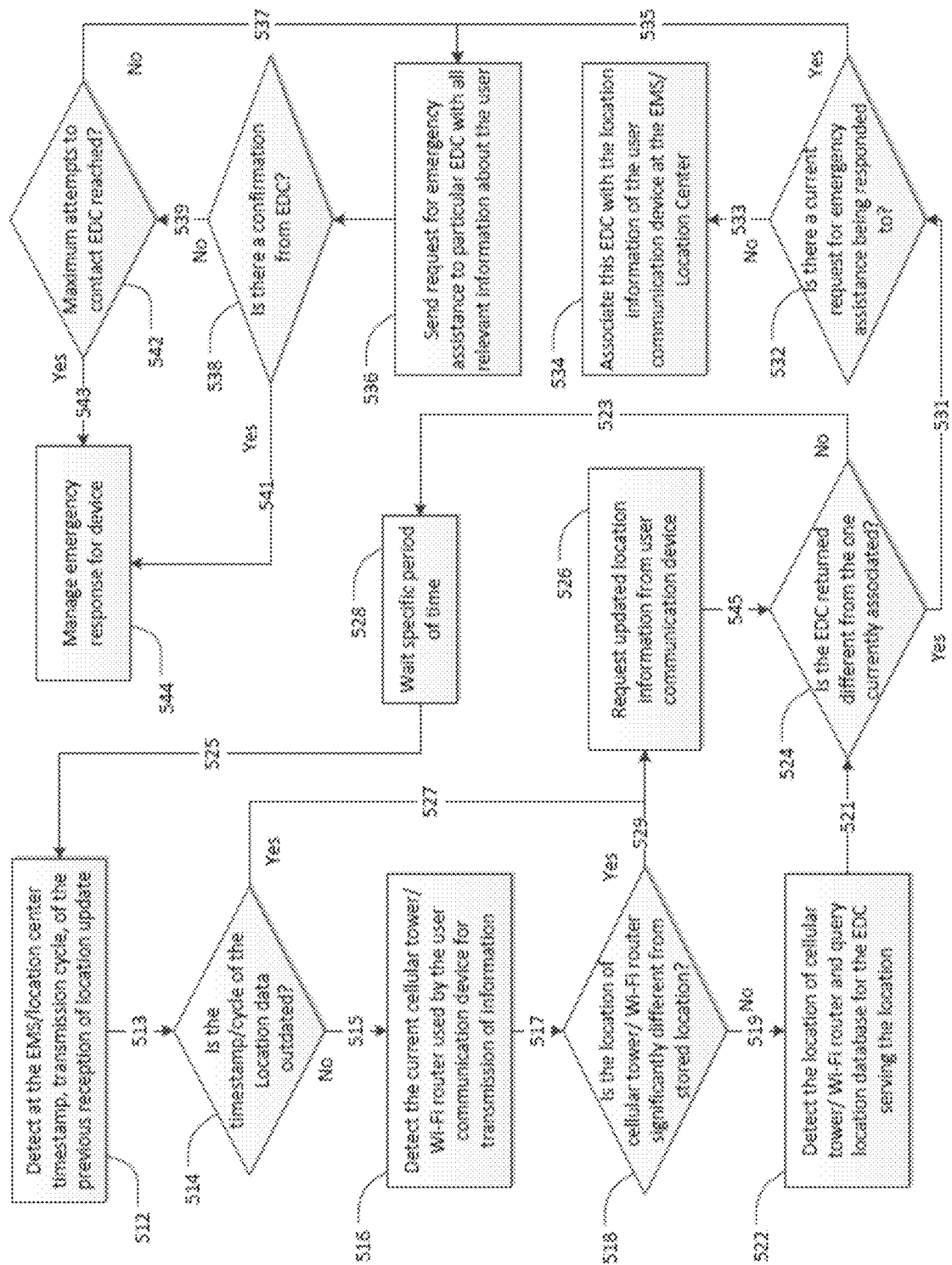
FIG. 5 is a flow chart illustrating one embodiment of a process for updating location data.

FIG. 5 is a flow chart illustrating one embodiment of a process for updating location data. In some embodiments, the EMS detects whether a request should be made for updated location data for a communication device. In this illustrative embodiment, the EMS detects the time-stamp of the previous location data update received from the communication device at the EMS (act 512), and compares the time difference between the current time and that of the time-stamp of the previous location data update (act 514). If the time difference is greater than a pre-defined value for updating the EMS (act 516), the EMS requests location data update from the communication device (act 526). If the time difference between the current time and that of the time-stamp of the previous location data update is not greater than the pre-defined value for updating the EMS (act 514), the EMS detects identification information about the cellular base station routers or the Wi-Fi routers that were used to deliver the latest data packets and messages from the communication device to the EMS and attempts to derive location data from the identity of these routers (act 516).

If there is a significant difference in the derived current location from the information about the routers and the stored location data about the communication device at the EMS 113 (act 518), the EMS 113 requests a location data update from the communication device (act 528). If there is no significant difference in the derived current location from the information about the routers and the stored location data about the communication device at the EMS (act 518), the EMS queries a location database for an EDC (e.g. a PSAP) serving the derived location of the cellular base station routers or the Wi-Fi routers that were used to deliver the latest data packets and messages from the communication device (act 522).

After receiving a response from the location database, the EMS verifies if the information about the EDC is different from the current EDC associated with the communication device (act 524). If the EDC associated with the communication device at the EMS is not the same EDC as the one indicated by the location database in response to the query (act 524), then the EMS verifies if there is an ongoing request for emergency assistance the EDC currently associated to the communication device is responding to (act 532). If the EDC currently associated with the communication device is not responding to any request from emergency assistance sent from the communication device, the EMS associates the new EDC identified by the location database in response to the query by the communication device (act 534) and waits for a specified period of time (act 528) and returns to detecting the time-stamp of the previous location data update received from the communication device at the EMS (act 512). If the EDC indicated by the location database in response to the query (act 532), is same as the EDC associated with the communication device at the EMS, then the EMS waits for a specified period of time (act 528) and returns to detecting the time-stamp of the previous location data update received from the communication device at the EMS (act 512). If the EDC currently associated with the communication device is responding to a request for emergency assistance sent from the communication device (act 532), the EMS sends the existing request for emergency assistance (act 536) to the new EDC identified by the location database in response to the query by the EMS and waits for the new EDC to confirm the reception of the request for emergency assistance (act 538). After successfully confirming the reception of the request for emergency assistance at the new EDC, the EMS manages the emergency response for the communication device (act 544). If the new EDC does not confirm the reception of the request for emergency assistance (act 538), the EMS checks if the maximum number of attempts to contact the EDC have been reached (act 542), and upon verifying that such a maximum number of attempts have not been reached (act 542), the EMS re-sends the existing request for emergency assistance to the new EDC (act 536). Upon detecting that the maximum number of attempts have been reached (act 542), the EMS manages the emergency response for the communication device (act 544).

Figure 6:
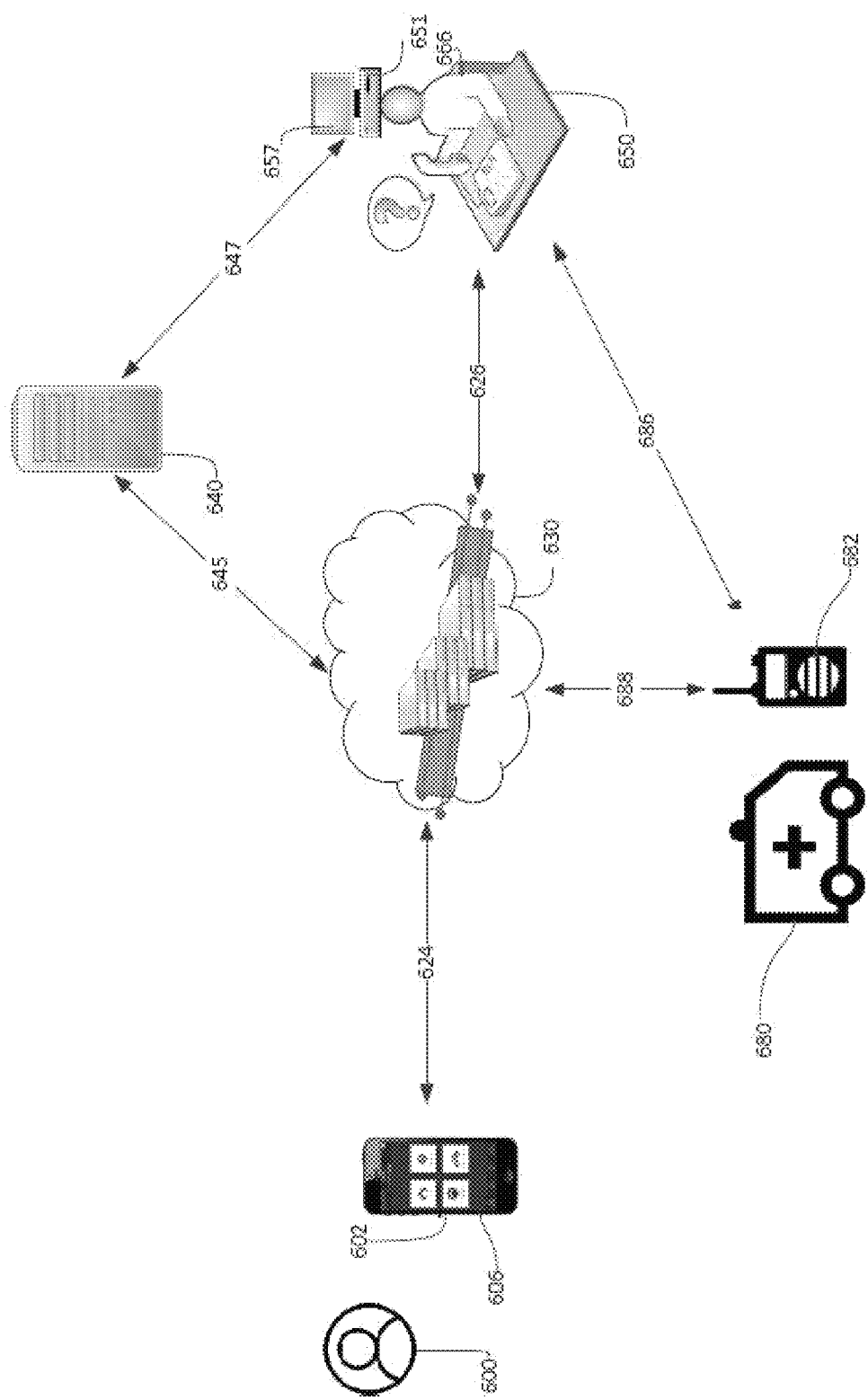
FIG. 6 illustrates an exemplary embodiment of a system for providing forecast for responders.

FIG. 6 illustrates an exemplary embodiment of a system for providing forecast for responders (e.g. first responders). In some embodiments, a user 600 uses his or her communication device 606 to send over a communication link 624 a request for assistance to an EMS 630, wherein the EMS 630 shares this request, via communication link 626, with an EDC 650 (such as a PSAP). In further embodiments, data such as location data regarding the communication device 606 is provided to one or more of the EMS 630, EDC 650, and first responder 682, in a format that is compatible with each entity, through secure and trusted pathways.

In some embodiments, the EMS 630 identifies, with help from the EDC 650, a first responder 680 (e.g., a police unit, an ambulance, fire unit, or another first responder) assigned or to be assigned to the request for emergency assistance. It is understood that the responders are dispatched by both private and public entities including municipalities, counties, hospitals, universities or colleges, private security agencies, road-side assistance companies, corporations, private groups, and other entities.

In some embodiments, a suitable data communication session (via link 626) is established between the EMS 630 and the EDC 650, and between the EMS 630 and the communication device of the first responder 682 (via link 686), wherein these communication sessions are bridged together by the EMS 630 so that information or data received, including multimedia media information, by any of the communication device or the EMS, is made available to the communication device of the first responder 682. In some embodiments, the EMS 630 has access to location data from the first responder 682. Exemplary communication devices of the responders (1882, 1982) include mobile phones, smart phones, tablets, digital radios, walkie talkies, and mobile data terminals in the vehicle or other devices. In some embodiments, the communication devices communicate wirelessly through secure and trusted paths (e.g. a cellular network). In some embodiments, the communication links with the communication devices of the responders 682 utilize secured and encrypted communication pathways (e.g., encryption, password protection, authorization codes, anonymized networks, secure instant messaging, secure VoIP, secure email, etc.). In some embodiments, the EMS 630 is added as a "trusted connection" on the responder device(s) 682 and the communication travels through a trusted path or channel so that unauthorized users or hackers cannot interfere with the communication. In some embodiments, a responder device 682 use techniques for anonymization including proxy connections, encryption, and other methods to maintain the integrity of one or more of the communication links (684, 688, 686).

In some embodiments, the EMS 630 estimates a forecast for the responders such as a estimated time of arrival (ETA) or estimated distance (ED). In some embodiments, a forecast is shared with user 600 via the display 602 of the communication device 606. In some embodiments, the forecast is displayed upon request (e.g. by a user, EMS operator, and/or first responder). In some embodiments, the forecast is shared with PSAP operator(s) (e.g. operator 666) on one or more PSAP systems 651. In some embodiments, the PSAP system 651 includes a display 657 for displaying a forecast.

In some embodiments, the EMS 630 collects location data pertaining to the communication device 606 and shares this estimate of the location with the EDC 650 via links 624 and 626. In some embodiments, the EMS 630 additionally or alternatively sends the digital equivalent of the estimate of the location based meta-data information to a cellular base station tower (not shown) using an analog channel, which in-turn shares this information with the EDC 650 over an analog channel. In some embodiments, the EDC 650 shares this information with the communication device 606 to the user 600, either via the EMS 630 or directly via a hybrid digital or analog channel. In some embodiments, the EMS 630 also shares the estimate of the location of the meta-data information with the communication device via a digital communication channel.

Figure 7:
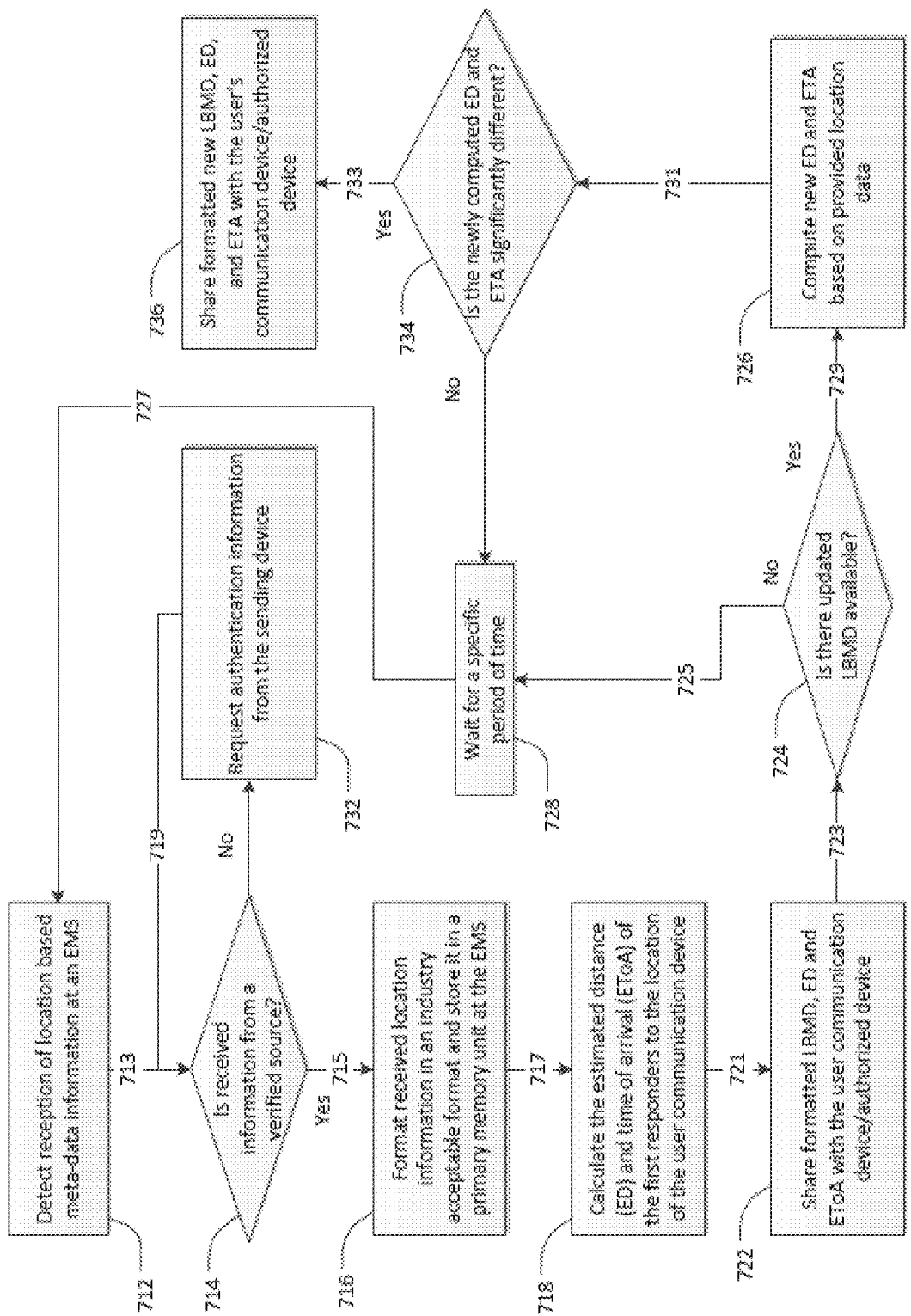
FIG. 7 is a flow chart of an embodiment of a method for communicating information about responders.

FIG. 7 is a flow chart of an embodiment of a method for communicating information about responders. The EMS detects reception of location based meta-data information at at least one first communication module of the EMS (act 712) and verifies the authenticity of the sender of the location based meta-data information (act 714). Responsive to not being able to verify the authenticity of the sender (act 714), the EMS requests authentication information from the sending device (act 732) and then waits to receive the authentication information and then verifies the received information (act 714). After successfully verifying the authenticity of the sender of the location based meta-data information (act 614), the EMS formats the location based meta-data information in an industry acceptable format and stores the information in a primary memory unit hosted in the EMS (act 716). The EMS then calculates the estimated distance and estimated time of arrival of the responders to the location of the communication device, or the location of the emergency. The location of the emergency as known by the EMS is based on the received location based meta-data information including the location of a communication device of the first responder (act 718). The EMS then shares the location based meta-data information, estimated distance and estimated time of arrival of the responders, with the communication device from which the request for emergency assistance was received and/or with any other authorized communication device (act 722).

In some embodiments, the EMS then checks if there is updated location based meta-data information available (act 724). Responsive to verifying that there is no updated location based meta-data information (act 724), the EMS waits for a specified period of time (act 728) and then goes back to detecting any location based meta-data information at the at least one first communication module of the EMS (act 712). If the EMS detects an updated location based meta-data information (act 724), the EMS then computes the new estimated distance and estimated time of arrival of the responders at the location of the communication device (act 726) and checks if the calculated estimated distance and estimated time of arrival information is significantly different from the same already computed and shared information (act 734). Responsive to verifying that the calculated estimated distance and estimated time of arrival information is not significantly different from the same already shared with the communication device (act 734), the EMS waits for a specified period of time (act 728), and then goes back to detecting any location based meta-data information at the at least one first communication module of the EMS (act 712). Responsive to determining that the calculated estimated distance and/or estimated time of arrival information is significantly different from the same already shared with the communication device (act 734), the EMS shares the new location based meta-data information, estimated distance, and estimated time of arrival of the responders with the communication device from which the request for emergency assistance was received and/or with any other authorized communication device (act 736).

Figure 8:
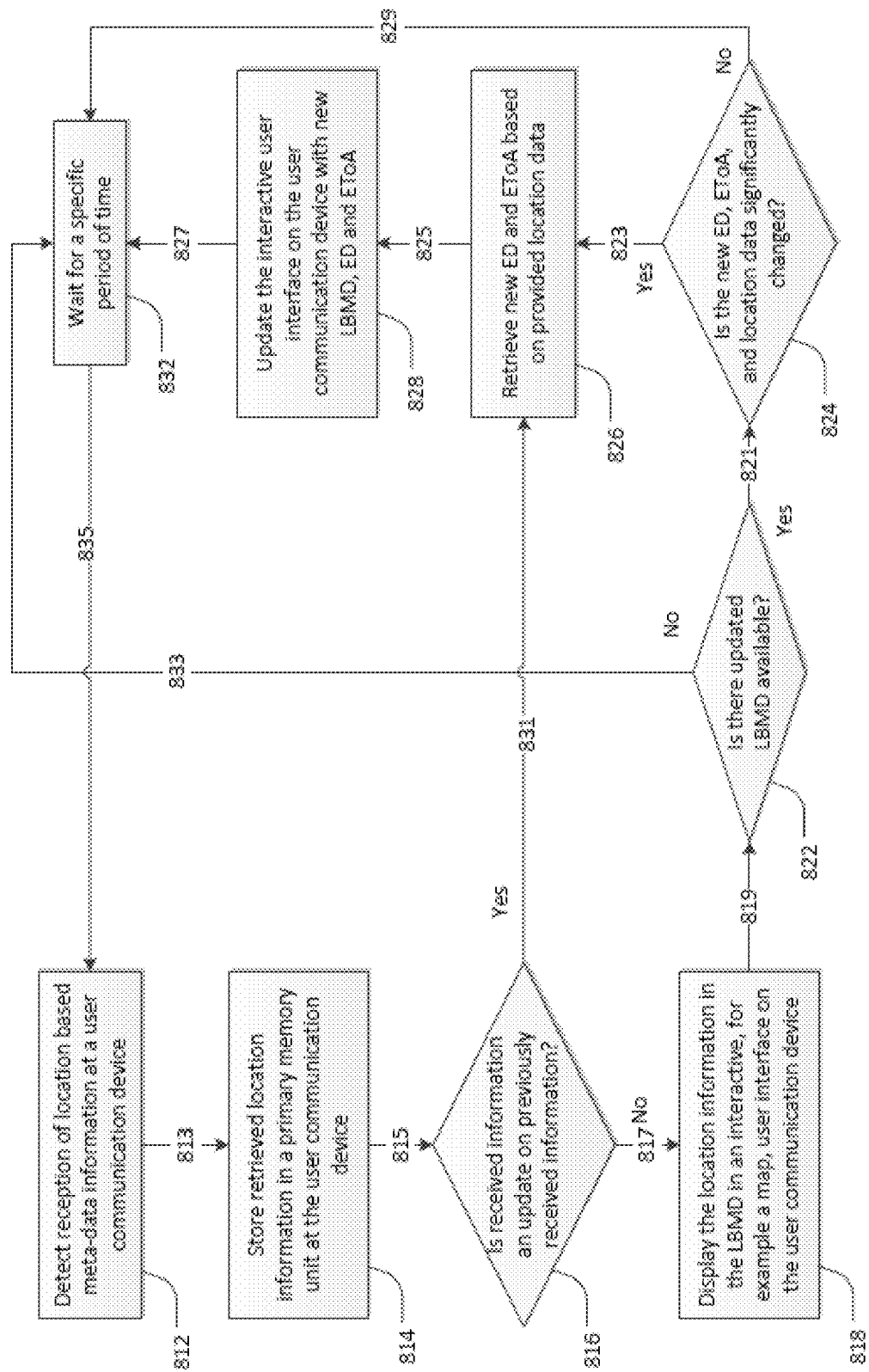
FIG. 8 is a flow chart of an embodiment of a method by which a communication device receives and displays information about responders.

FIG. 8 is a flow chart of an embodiment of a method by which a communication device receives and displays information about responders. The communication device detects reception of location based meta-data information regarding responders from an EMS and displays this information to the user of the communication device in a user interface in an interactive fashion. The communication device detects reception of location based meta-data information from the EMS (act 812) at at least one first communication module of the communication device and stores the location based meta-data information in a primary memory unit hosted in the communication device (act 814). The communication device then verifies if the received location based meta-data information, estimated distance and estimated time of arrival of the responders is an update of previously received location based meta-data information (act 816). Responsive to verifying that the shared location based meta-data information, estimated distance of the responders from the user and/or emergency event, and estimated time of arrival of the responders is indeed an update of previously received location based meta-data information (act 816), the communication device retrieves the new estimated distance of the responders from the user and/or emergency event and estimated time of arrival of the responders from the location based meta-data information (act 826) and displays this information by updating the interactive user interface of the communication device (act 828). Responsive to verifying that the shared location based meta-data information, estimated distance of the responders from the user and/or emergency event, and estimated time of arrival of the responders is not an update of previously received location based meta-data information (act 816), the communication device displays this information on the interactive user interface of the communication device (act 818).

In some embodiments, the communication device then checks if there is updated location based meta-data information available (act 822). Responsive to verifying that there is no updated location based meta-data information (act 822), the communication device waits for a specified period of time (act 832), and then goes back to detecting any location based meta-data information at the at least one first communication module of the communication device (act 812). If the communication device detects updated location based meta-data information (act 822) it compares the updated estimated distance and estimated time of arrival of the responders with the existing location based meta-data information (act 824) and checks if the updated estimated distance and estimated time of arrival information is significantly different from the information already available at the communication device (act 824). Responsive to determining that the updated estimated distance and/or estimated time of arrival information is not significantly different from the same already available with the communication device0 (act 186), the communication device0 waits for a specific period of time (act 185), and then goes back to detecting any location based meta-data information at the at least one first communication module of the communication device (act 180). In some embodiments, there is a significant difference when the updated estimated distance and previous estimated distance (e.g. between the respective centers of the estimated locations) have a difference of at least about 10, 20, 30, 40, 50, 60, 70, 80, 90, 100, 200, 300, 400, 500, 600, 700, 800, 900, or 1000 meters. In some embodiments, there is a significant difference when the updated estimated time of arrival and previous estimated time of arrival have a difference of at least about 1, 2, 3, 4, 5, 6, 7, 8, 9, 10, 15, 20, 25, 30, 35, 40, 45, 50, 55, or 60 minutes.

Alternatively, responsive to determining that the updated estimated distance and estimated time of arrival information is significantly different from the same already shared with the communication device (act 824), the communication device retrieves the new estimated distance and estimated time of arrival information from the received location based meta-data information (act 826) and displays this information by updating the interactive user interface of the communication device (act 828) with the new estimated distance and estimated time of arrival of the responders from the location based meta-data information. The communication device waits for a specified period of time (act 832), and then goes back to detecting any location based meta-data information at the at least one first communication module of the communication device (act 812).

Figure 9:
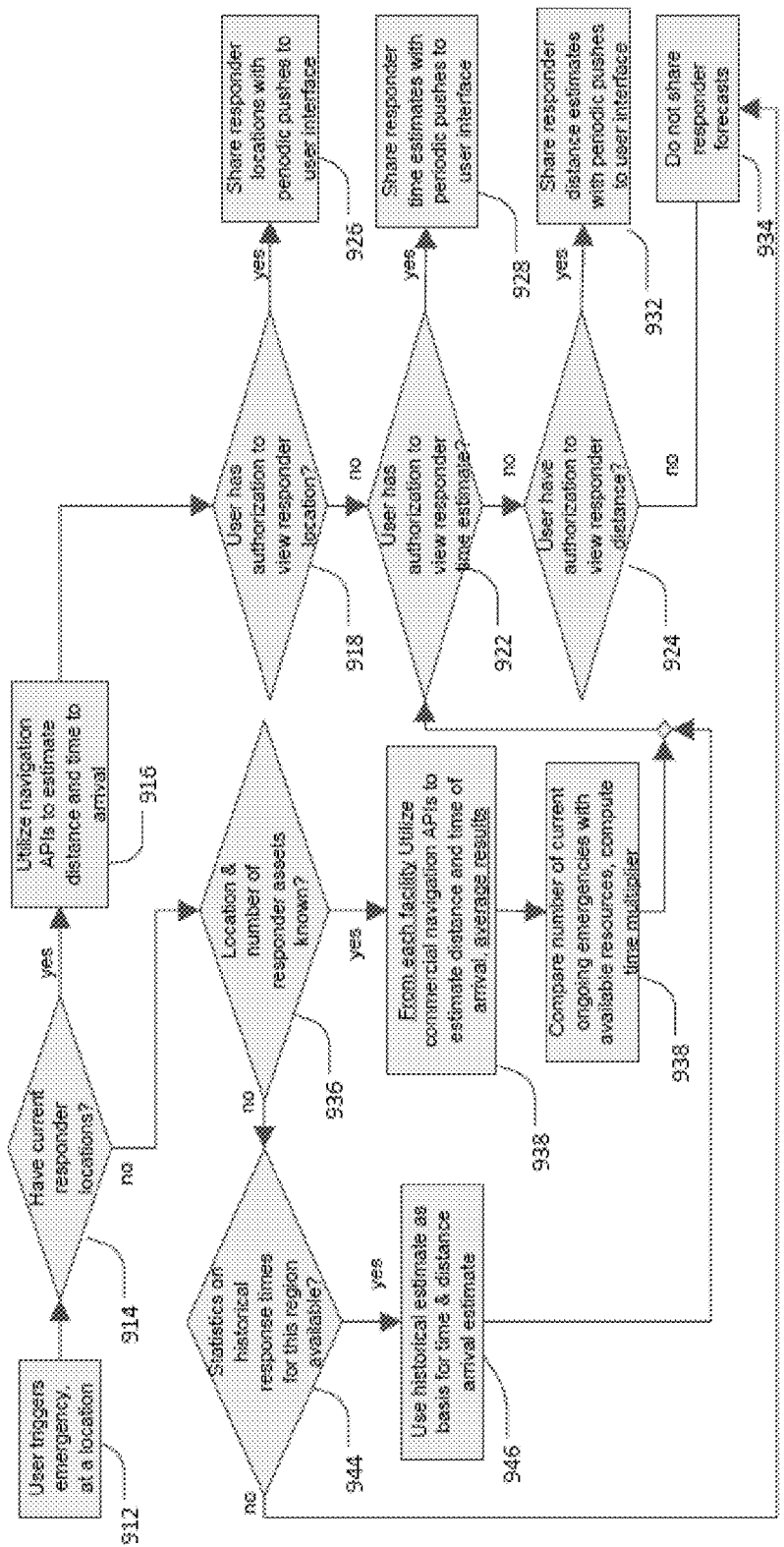
FIG. 9 is a flow chart of one embodiment of a method for providing a forecast for first responder response.

FIG. 9 is a flow chart of an embodiment of a method by which responder forecasts are estimated and selectively shared with users. A user triggers an emergency at an emergency location (act 912). In other embodiments, the emergency is triggered autonomously and confirmed by the user. After the emergency has been triggered, an emergency session (e.g., an emergency call) is established between the user and the PSAP via an EMS or directly. Responders (e.g. police, fire, ambulance, tow truck, etc.) are assigned to respond to the emergency and dispatched to the emergency location (also referred to as "assigned responders." In some embodiments, at the request of the user or automatically, the EMS makes an estimate regarding the arrival of responders to the emergency site. This information provides reassurance to the user who is experiencing the emergency and he and she can plan for the wait. For example, a user who has a bleeding wound may apply pressure to the wound until the first responders are on the scene (e.g., for 5 minutes).

In some embodiments, the EMS determines if it has current location data or real-time location for one or more responder vehicles or devices (act 914). If the current location data of responders is known, then commercial driving navigation APIs are used to estimate distance and time of arrival (act 916). In some embodiments, the responders have been assigned or may be assigned to respond to the emergency. In particular, the responders may be responsible for responding to emergencies at that location. If there are more than one responder (who is assigned or about to be assigned), their location may be averaged. Once the estimate for distance and time of arrival is made, the EMS displays the responder location based on the user's authorization. For example, in some embodiments, certain users such as first responders (e.g. police, fire, or ambulance) who are experiencing an emergency are considered "privileged" users and are authorized to view location of responders who may be dispatched to respond to the emergency. If the user has authorization, the location of the responders is then shared with the user (act 918, 926).

In some embodiments, when the user has authorization, time estimates (e.g. estimated time of arrival, ETA) are shared with the user (act 922, 928). In some embodiments, the ETA is determined using commercially available navigation software. In some embodiments, the ETA is calculated in the EMS. In some embodiments, if time estimates are available and the user is authorized to view them, then distance estimates are not calculated.

In some embodiments, when the user does not have authorization to view time estimates, a responder travel distance is calculated and shared with the user (act 924, 932). In some embodiments, users with lower privilege (e.g. general users) have authorization to view responder distance as compared to real-time location of responders. In some embodiments, the user is not authorized to view any type of responder forecast (act 934).

In some embodiments, one or more of responder location, time estimate, and distance is re-calculated periodically based on updated location data of the responders. Thus, in some embodiments, one or more of acts 914, 916, 918, 926, 922, 928, 924, 932 is repeated when updated responder location data is available.

In some embodiments, responder forecasts are estimated and displayed at PSAP systems (e.g. 651 in FIG. 6). In other embodiments, the responder forecast are estimated and displayed by the communication devices (e.g. 606). An advantage of the disclosed method is that the complete information is not required to generate a forecast. For example, limited information that does not include the identity and real-time location of responders is sufficient to generate a forecast.

In many cases, responder forecasts are generated based on publicly or privately available information. In some cases, information about responder assets, such as locations for police stations, fire stations, hospitals, clinics, are available from mapping services or other sources. In some cases, information (such as police strength, vehicles, location of stations, etc.) about responder resources in a city or county are available on the website of the city or county.

In some embodiments, the EMS uses public and/or private sources to determine the number and/or location of responder assets (e.g. police stations, fire stations, hospitals, etc.), which may be deployed to respond to the particular emergency. For this analysis, in some embodiments, the EMS accounts for at least one of the type of emergency (medical, fire, law & enforcement, etc.), the severity of the emergency, and number of people or pets in the area. In some embodiments, when the location of responder assets are available (act 936), commercial driving navigation APIs are used to estimate the responder forecasts (e.g. responder distance and responder time estimate) from each facility (act 938).

In some embodiments, estimates for the responder forecasts are adjusted taking into account factors such as on-going emergencies, current driving conditions, inclement weather, etc. (act 942). In some embodiments, a time multiplier is computed and the responder forecast is adjusted. In some embodiments, based on the authorization of the user, one or more responder forecasts are displayed (act 918, 926, 922, 928, 924, 932).

In some embodiments, when there is limited information about responder assets, statistical and historical response for the area and region is used to calculate responder forecasts. In some embodiments, statistical and historical data is obtained from publicly or privately available sources including the EMS's historical record of emergency response in the area. In some embodiments, based on historical response times, responder forecasts, such as time and distance estimates are calculated (act 944, 946) and displayed to users (act 922, 928, 924, 932).

FIG. 10A depicts an exemplary screenshot of a communication device with "estimated time of arrival (ETA)" for responders. The screenshot 1010 shows that the user (e.g., user 200 from FIG. 2) is "connected" (1020) with an EDC or PSAP 250 or a private service provider. In some embodiments, the call is routed through EMS 230. After receiving a request for assistance, the EDC provides information (including location data and type of emergency) about the emergency to responders who can provide assistance on the scene. In some embodiments, the EDC or EMS is aware of one or more units of responders who will be deployed on the scene and is able to provide information about the emergency response to the user who is in the emergency situation. Providing information about the emergency response is helpful because the information helps inform the user's attempts to administer self-help while waiting for responders to come on the scene. For example, in the case of a fire, the EDC is able to advise the user to use a fire extinguisher with the understanding that the user just needs to keep the flames under control until the first responders.

As shown, in some embodiments, a responder forecast is calculated and displayed to the an authorized user. Here, an "estimated time of arrival (ETA)" 1030 for responders is shown as "Responder will be arriving in 10 minutes." In some embodiments, the ETA is updated in real-time with accurate information. It is understood that the ETA is capable of being displayed in various ways so that the user experiencing the emergency and/or near-by persons understands how long it will take for responders to arrive. In some embodiments, the screen 2010 includes instructions on what to do while waiting and/or self-help guidelines. In an alternative embodiment, the screen 2010 includes a map showing the location of responders (not shown). In further embodiments, the map showing the location of responders is updated in real-time.

In addition, FIG. 10A shows an exemplary embodiment of a screen 1010 allowing the user to choose 4-options while communicating with the EDC—text or SMS 1022, camera 1027, speaker phone 1026, can't speak 1028. In some embodiments, the screenshot includes a log 1032 about the location data that is being shared with the EMS and/or EDC. Here, the log 1032 indicates that the location of the device has been updated. The "End call" button 1034 allows the user to end the connection.

FIG. 10B depicts an exemplary screenshot of a communication device with location sharing settings. The screen 1040 shows "location sharing" settings on a communication device.

By moving the toggle buttons 1056, a user provides permission or authorization to share his or her location information (e.g., geographical coordinates from GPS on the communication device or a pre-saved location, such as home address) with different users and entities through electronic communications (e.g., with other member devices in a group or service providers). As shown, the data sharing settings allow a user to give permission to share his or her location with various location recipients 1042—"All", "Friends & Family", "Medical assets", "Safety Assets", "Responders", "Volunteers."

In some embodiments, the location recipients 1042 are user-defined groups or individuals such as a list of family members. For example, in one embodiment, an elderly user includes several family members into a group and shares his location with them periodically so that they stay informed about his well-being. In addition to family members, in some embodiments, a user creates a group of medical providers or medical assets who are able to view his location during an emergency.

In some embodiments, the location recipients 1042 are obtained from public or private databases. For example, in some embodiments, one or more contacts are automatically imported into a "friends & family" group. In some embodiments, medical assets include nearby hospitals and clinics from "yellow pages." In further embodiments, stored information about the medical assets include online reviews of the medical assets.

It is noted that the screen 1040 is exemplary, and multiple variations are contemplated including real-time authorization for specific communications, authorization at registration, and/or other variations. In some embodiments, the user chooses to share location information only during emergencies with users in an emergency contact list, users, responders and volunteers in the vicinity, and others. In some embodiments, the user chooses the type of security or encryption procedures used when sharing location information to protect the user's privacy.

In addition to sharing response forecasts, in some embodiments, the EMS generates and displays geographical maps of response assets. FIG. 10C depicts an exemplary screenshot of a communication device showing a map of an exemplary type of response asset—medical assets. In some embodiments, one or more geographical maps for "police assets", "fire response assets", "safety assets", "vehicle rescue assets", "pet rescue assets", "water rescue assets" are generated.

In addition, in some embodiments, a similar screenshot is displayed at an EDC or PSAP (e.g. PSAP 650 in FIG. 6) which has received the emergency request for assistance for dispatching responders to the emergency location and/or for monitoring the emergency response. For example, the CPE App 652 in the PSAP system 651 (via "Assets Mapping Module" 165) shares a similar geographical map of medical assets on display 657 for PSAP operators 666. In some embodiments, depending on the zoom of the map, the PSAP operators 666 view response assets that are in proximity to the emergency location for sending the response. In some embodiments, when current location of the responders is available, the movement of response assets (e.g., fire trucks sent to the scent) is monitored on the map. In some embodiments, the geographical map is generated by the EMS 630 or the PSAP system 651. In some embodiments, as described in FIG. 9 and FIG. 10A, the PSAP system 651 also displays responder forecasts to PSAP operators 666 for monitoring the emergency and informing users in the emergency situation via a "Responder Forecast Module 167").

Referring FIG. 10C, the screen 1070 shows geographical location of medical assets on a map 1080. In some embodiments, medical assets include hospitals, clinics, doctors, nurses, pharmacies, first aid kits, and/or other assets. The navigation bar 1072 at the bottom of the screen 1070 shows individual medical assets and a button for adding assets 1074 by the user of the communication device (or a PSAP operator who is using PSAP system). In some embodiments, the locations of the medical assets are displayed based on their physical addresses listed on public and private lists or databases or from communication devices in those facilities.

In some embodiments, the map 1080 shows location pins or markers 1082 for medical assets (e.g., hospitals, clinics, etc.) and points of interest 1084 (e.g., train stations, public parks, etc.) in relation to streets and intersections. In addition, in some embodiments, if the user or person in the emergency (based on location of associated devices) is located within the viewed area of the map 1080, a user location pin 1086 (not shown) is included. It is understood that the viewed area of the map is adjustable by zooming in or out, rotating the angle of view, and/or panning. In some embodiments, a user uses a "check-in" (such as button 1088) or an "all OK" button to instantly share his or her location with individuals and entities authorized to receive this information.

It is understood that the screen 1070 is exemplary and several variations are contemplated. In some embodiments, the map 1080 shows safety assets (such as police, private security personnel, fire extinguishers, fire hydrants, chemical showers, etc.), responders (EMTs, paramedics, etc.), volunteers (fire marshals, etc.).

Figure 11:
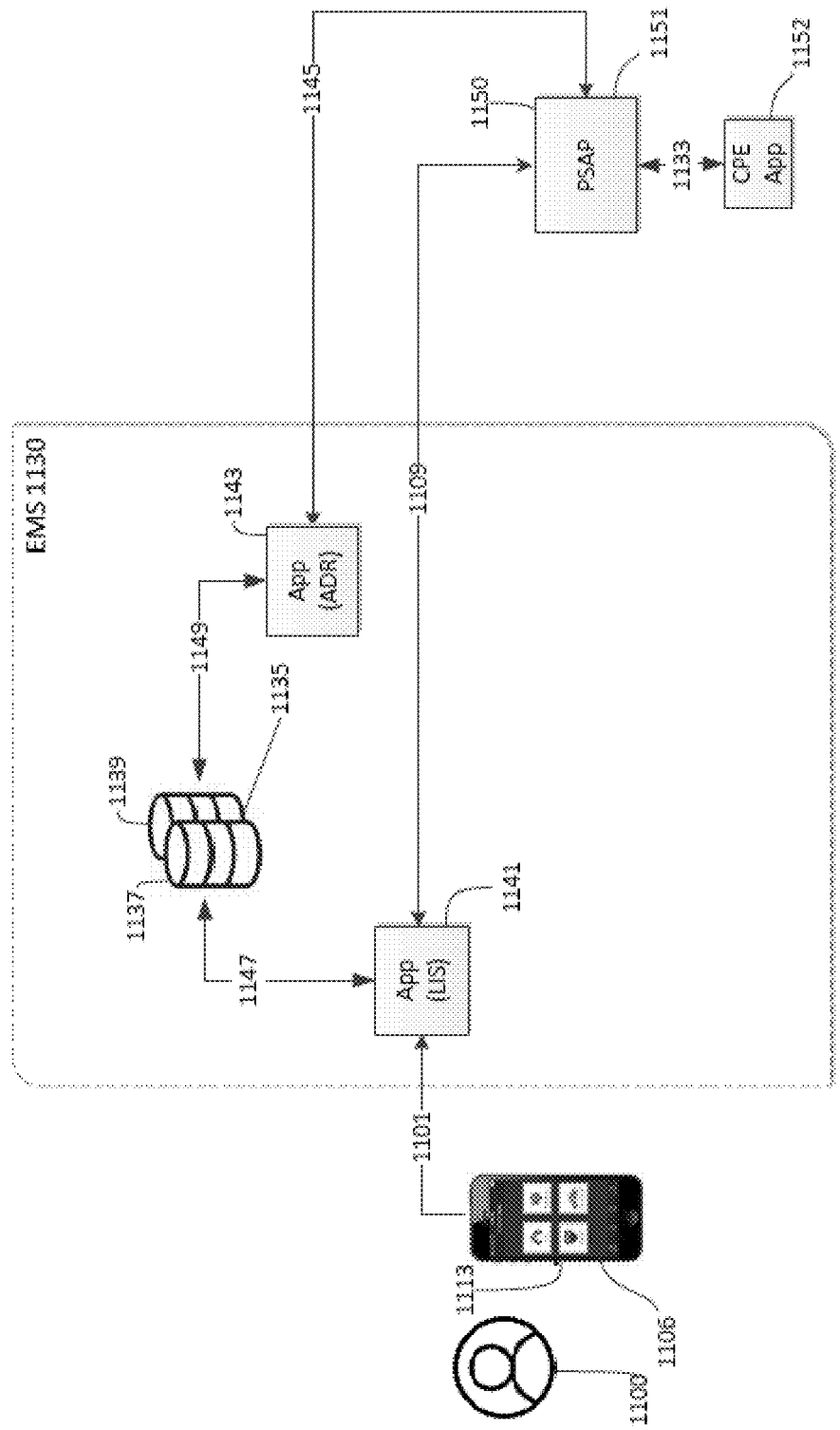
FIG. 11 is an illustration of one embodiment of a system for storing and retrieving location data.

FIG. 11 is an illustration of one embodiment of a system for storing and retrieving location data. In some embodiments, the EMS 1130 includes one or more databases 1135 for storing data, such as a location database 1137 and a user information database 1139. In other embodiments, user data and location data is saved in one or more databases in a distributed manner. In some embodiments, the data is saved in an external server that is accessible to the EMS 1130. In some embodiments, the data in the databases 1135 are obtained from one or more types of communication devices such as mobile phones (e.g., via communication link 1101), wearable devices, laptop, desktop, personal assistants, vehicle consoles, home security systems, IoT devices, camera feeds, vehicle telematics sources, and other data sources. Specifically, in some embodiments, location data is determined on the device(s) using GPS, received location data from cellular base station signal triangulation, Wi-Fi location data, Bluetooth beacon data, or any other form of location data stored at the communication device.

In some embodiments, an emergency is triggered by the user 1100 by using the user interface 1113 of the communication device 1106 (e.g. by pressing a soft button, a physical button, voice command, or gesture). In other embodiments, the emergency is triggered autonomously based on sensor data (e.g. smoke alarms). In some embodiments, the user 1100 confirms the emergency and/or provides authorization for sending the emergency alert. In addition to mobile phones, emergency calls are made by telematics equipped vehicles, medical monitoring devices and wearable devices. In some embodiments, the EMS 1130 formats the location data into a type that is compatible with industry standards for storing and sharing location data. For example, in some embodiments, the location data is formatted to be compatible with NENA standards. In some embodiments, a current location of the device 1106 is saved in databases 1135. In some embodiments, when queries (such as a GET request) following the Location Information Server (LIS) protocol are sent by requesting parties (e.g. PSAPs, call centers, operations center, family and friends, etc.), an application 1141 in the EMS 1130 sends an appropriate response via encrypted pathway 1109. Within the EMS 1130, the App queries in the databases 1135 to respond to the query. In some embodiments, one or more LIS queries are in HTTP-Enabled Location Delivery (HELD), and the responses are in Presence Information Data Format Location Object (PIDF-LO).

An exemplary request for location of a device for phone number "+1 555-555-5555" is shown below. Although not shown, the credential or access key is optionally provided in the header of the query.

```
<?xml version="1.0"?>
<locationRequest xmlns="urn:ietf:params:xml:ns:geopriv:held">
    <locationraType exact="false">
        any
    </locationType>
    <device xmlns="urn:ietf:params:xml:ns:geopriv:held:id">
        <uri>tel:+15555555555</uri>
    </device>
</locationRequest>
```

An exemplary LIS response in a standard format compatible with industry standards, PIDF-LO is shown below. If the query includes an inactive or expired credential or access key, an error response will be generated.

```
<?xml version="1.0" encoding="utf-8"?>
<held:locationResponse xmlns:gbp="urn:ietf:params:xml:ns:pidf:geopriv10:basicPolicy"
    xmlns:gp="urn:ietf:params:xml:ns:pidf:geopriv10"
    xmlns:gs="http://www.opengis.net/pidflo/1.0"
    xmlns:pidf="urn:ietf:params:xml:ns:pidf"
    xmlns:gml="http://www.opengis.net/gml"
    xmlns:held="urn:ietf:params:xml:ns:geopriv:held">
    <held:locationUriSet expires="2016-11-10 01:31:21.123713">
        <held:locationURI>
            https://api-sandbox.rapidsos.com/v1/location/lbyr/?ref=c786f6b9-5e06-4611-a1c9-fbf9333e5652
        </held:locationURI>
    </held:locationUriSet>
    <pidf:presence entity="tel:+15555555555">
        <pidf:tuple id="vcefda6f4-ec1c-4721-9f41-225d5ff38c09">
            <pidf:status>
                <gp:geopriv>
                    <gp:location-info>
                        <gs:Circle>
                            <gml:pos>37.4219983 -122.084</gml:pos>
                            <gs:radius uom="urn:ogc:def:uom:EPSG::9001">
                                20.0</gs:radius>
                        </gs:Circle>
                        <ca:civicAddress xml:lang="en">
                            <ca:A1>CA</ca:A1>
                            <ca:A3>Mountain View</ca:A3>
                            <ca:RD>Amphitheatre</ca:RD>
                            <ca:STS>Pkwy</ca:STS>
                            <ca:HNO>1600</ca:HNO>
                            <ca:PC>94043</ca:PC>
                            <ca:BLD>Google Bldg 40</ca:BLD>
                        </ca:civicAddress>
                    </gp:location-info>
                    <gp:usage-rules>
                        <gbp:retransmission-allowed>
                        false</gbp:retransmission-allowed>
                    </gp:usage-rules>
                </gp:geopriv>
            </pidf:status>
            <pidf:timestamp>
            2016-09-15T23:59:46.778000+00:00
            </pidf:timestamp>
        </pidf:tuple>
    </pidf:presence>
</held:locationResponse>
```

In some embodiments, other information is formatted and saved in the database(s) 1135. In some embodiments, when queries following the Additional Data Repository (ADR) protocol are sent by requesting parties (e.g. PSAPs, other authorized third parties), an application 1143 in the EMS 1130 sends an appropriate response via encrypted pathway 1145. In some embodiments, an authorization code is included in the body, header or meta-data of the query and the EMS 1130 checks that the authorization is active before providing access. In some embodiments, the categories of data available by ADR queries are selected from the group consisting of: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments.

In some embodiments, the data is tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

The sample ADR query for device phone number "+1-777-999-7777" for information in the "device info" block is shown below. Although not shown, the credential or access key may be provided in the header of the query. http://api-demo.rapidsos.com/v1/adr/?caller_id=17779997777&section=device_info An exemplary ADR response in a standard format compatible with industry standards, PIDF-LO is shown below. If the query includes an inactive or expired credential or access key, an error response will be generated.

```
HTTP/1.1 200 OK
Date: Tue, 01 Dec 2016 23:27:30 GMT
Content-Length: 489
Content-Type: application/EmergencyCallData.DeviceInfo+xml
<dev:EmergencyCallData.DeviceInfo
    xmlns:dev="urn:ietf:params:xml:ns:EmergencyCallData:DeviceInfo">
    <dev:DataProviderReference>d4b3072df.201409182208075@example.org
```

TABLE 1

Exemplary Data Blocks for ADR Requests

| Block Name | Description |
|---|---|
| Data Provider | This block supplies name and contact information for the entity that created the data. It includes identification and contact information. |
| Service Information | This block supplies information about the service that the service provider provides to the caller. |
| Device Information | This block supplies information about the device placing the call. |
| Owner/ Subscriber | This block supplies information about the owner of the device or about the subscriber. |
| Comment | This block provides a way to supply free form human-readable text to the PSAP or emergency responders. |

In some embodiments, for LIS and/or ADR queries, authorization and credential management allow differential access to requesting parties. In some embodiments, data is queried over public networks by using API access keys or credentials. In some embodiments, Transport layer Security (TLS) is used in the queries for encryption. In some embodiments, authorization is provided in the "Authorization" header of the query using HTTP Basic Authentication. For example, in some embodiments, authorization is base64-encoded user name and password for the account.

In some embodiments, on the PSAP side, the PSAP 1150 includes a PSAP system 1051 including hardware and software. In some embodiments, the PSAP system 1151 includes a call-handling application, CPE App 1152 with a "LIS/ADR Query module" (See 169 in FIG. 1C) for sending LIS/ADR queries. In some embodiments, when the PSAP requires data about a user or a device (such as current location data), the operator interacts with the CPE App 1152 to send the request. In some embodiments, the response is displayed in a PSAP display (not shown).

In some embodiments, the PSAPs or other requesting parties require credentials or access keys. In some embodiments, access keys are activated by completing due diligence by phone, email or mail verification. In some embodiments, access keys expire and have to be renewed. In some embodiments, access is rate limited to a certain number of queries in a specified time limit (e.g. 1000 requests per minute) and monitored for abuse. In some embodiments, if a request with inactive or expired credentials is received, access is denied and an error is generated. In some embodiments, if an account or site has been compromised, the associated access keys are temporarily or permanently disabled. In some embodiments, access keys or credentials allow for differential access to different requesting parties. For example, in some embodiments, the access key notes the access level of the third party, and some data is excluded from the ADR response based on the access level. In the case of LIS, in some embodiments, an access key is excluded based on user preferences or other reasons from receiving current location data. Thus, in some embodiments, the access key for PSAP systems are different from ambulance consoles, wherein ambulance personnel are given access to data tagged as "medical data" but PSAPs are not granted access to said data. Thus, in such embodiments, when the PSAP operators send an ADR request for data, data tagged as "medical data", are excluded due to the PSAP lacking an access key for the data.

In some embodiments, when the location database stored at a third party server receives a request for information from the EMS 1130 only, as a database query, the location database formats the requested location data and stores this information in the alternate database, and forwards either a database query response or a reference to the alternate database for accessing the location data requested by the EMS 1130, which is provided to the PSAP 1150, over a hybrid analog and/or a data communication channel, depending on the capabilities of PSAP 1150. In some embodiments, the location database stores the location data requested from the location database either by the EMS 1130 or directly by a switching center, in an alternate database for a certain period of time after receiving the request for the location data regarding a user 1100 and any communication devices 1106. In some embodiments, this period of time is a timer value (e.g. a timer countdown or a set time point) defined by the EMS 1130 and the location database in conjunction with each other prior to the addition of the particular information to the alternate database at the location database. In some embodiments, once the timer value has passed and no new requests for the location data pertaining to the particular user 1100 and the communication device 1106 and other devices associated to the user 1100 are received by the location database, then the location database marks the particular alternate database entries to be deleted and waits for another, different, time-out interval. In some embodiments, once this particular second time-out interval has also been completed and no new requests for location data for the particular user 1100 or associated communication devices 1106 is received by the location database, the location database removes the specific marked entries from the alternate database in the next cycle of updates for the alternate database. In some embodiments, after adding the location data in the alternate database by the location database, the location database keeps updating the information in the alternate database on a periodic, or as-needed basis, for the purpose of keeping the location data about the user 1100 current for providing the most recent and accurate location data to the EMS 1130, the switching gateway, and the PSAP 1150 for the purposes of responding to a request for emergency assistance. In some embodiments, the location database is updated by the EMS 1130 for all the location data pertaining to all users and their associated communication devices that are served by the EMS 1130 at any current time.

In some non-emergency situations, there is a need to access location data, user data, emergency data or sensor data. For example, in some embodiments, a user grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g. via onboard vehicle console or terminal).

Figure 12:
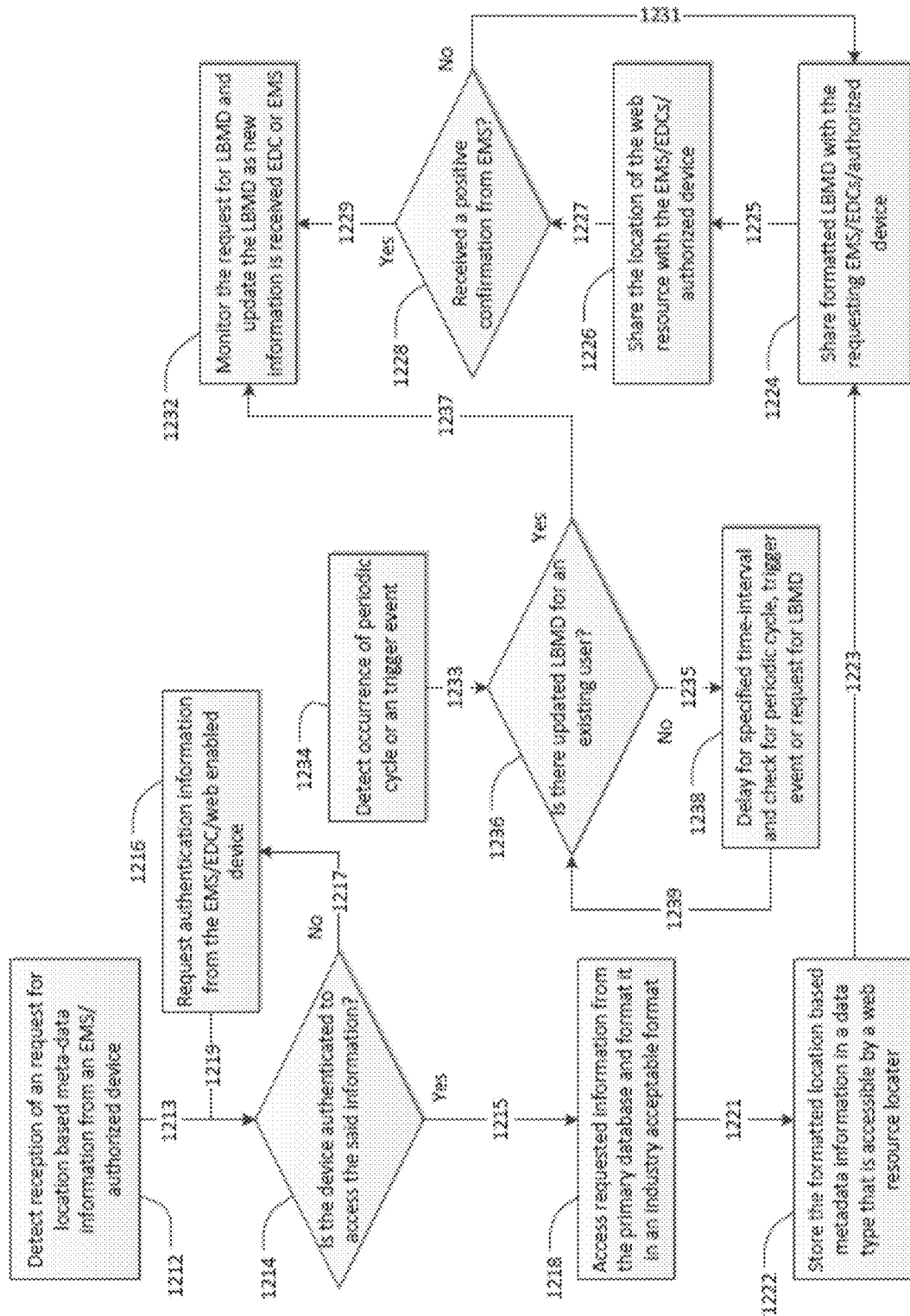
FIG. 12 is an illustration of one embodiment of a method for detecting and sharing location data in a format compatible with industry standards.

FIG. 12 is an illustration of one embodiment of a method for detecting and sharing location data in a format compatible with industry standards. The location Information database (LID) (e.g. database 1135 in FIG. 11) detects a request for location based meta-data information (LBMD) from a pre-authorized or an unauthorized source, for example, an EMS 1130, an EDC 1150, or another source (act 1213). The LID checks if the device requesting LBMD is authenticated to receive the LBMD (act 1214). Responsive to determining that the device is not authenticated, the LID requests authentication information from the device (act 1216). Responsive to successful authentication of the device requesting LBMD, the LID accesses the requested LBMD information from a primary memory source hosted on the LID and formats the information in an industry acceptable format (act 1218). The LID then stores the formatted LBMD in a format that is accessible by a web resource and stores this duly formatted LBMD in a secondary memory location that is accessible by a web resource locator, for example, a web browser (act 1222). The LID then shares the accessed LBMD from the primary memory location in the industry acceptable format with the authorized requesting device (act 1224). The LID also shares the location of the web resource including the LBMD formatted for access by a web resource locator with the requesting device (act 1232). The LID then verifies that the EMS, or other device requesting this LBMD information, for example, EDC received the duly formatted LBMD (act 1226). Responsive to verifying that the LBMD is not received (act 1238), the LID sends the duly formatted LBMD and the location of the web resource including the LBMD formatted for access by a web resource locator to the requesting device (act 1234) one more time and requests verification of the reception of the duly formatted for compatibility with industry standards LBMD. Responsive to successfully verifying that the duly formatted LBMD is received by the requesting device, for example, an EMS or an EDC, the LID monitors the request and updates the LBMD and shares it once more if an update is available (act 1232). Responsive to detecting, via completion of a periodic time-cycle or occurrence of a certain trigger event (act 1238), that new LBMD is available for an existing communication device associated with a user (act 1236), LID stores an updated copy of the LBMD in the primary and secondary memory and shares the LBMD with any requesting devices (act 1232). Upon only detecting a periodic cycle completion (act 1234), LID checks to see if there is updated LBMD (act 1236) and upon not detecting any, delays for a specific time and then checks again or checks based on occurrence of certain trigger events (act 1238). Responsive to detecting updated LBMD LID stores an updated copy of the LBMD in the primary and secondary memory, and shares the LBMD with any requesting devices (act 1232).

Automatic Public Safety Answering Point Look-Up

An emergency call can be a time-consuming process that wastes valuable time in obtaining emergency assistance. For example, a location of the user device making the call has to be queried against a database (e.g. an SRDB) to find an appropriate EDC. At times, the location information available at the location database or SRDB is outdated and does not reflect the current location of the user communication device. For example, the last cellular tower that the user communication device communicated through may not be the cellular tower that is closest to the current location of the user communication device. As a result, the EDC selected by querying the location database may not be the most appropriate EDC for responding to the request for emergency assistance, and therefore delays may be incurred for the user in receiving emergency assistance. Since this process of locating the appropriate EDC at the network end occurs after the user has placed a request for emergency assistance via a user communication device, any delays in identifying the appropriate EDC that should respond to the request for emergency assistance means potential delays for the user to receive emergency assistance.

Therefore, in one aspect, disclosed herein are methods for an EMS or a locationing center to receive periodic and/or aperiodic location data about a user communication device directly from the user communication device or via other sources, for example, cellular base stations or Wi-Fi routers. The EMS or locationing center may request updated location data based on various factors, for example, the periodicity of the received location data or time lapsed since the last received location data from the user communication device. The EMS or locationing center may poll a location database using the location data of the user communication device to identify an EDC that serves the location of the user communication device.

Also disclosed herein are aspects and embodiments of methods including determining at a user communication device if there is a need for the device to transmit updated location information to an EMS or a locationing center. This determination may be made based on various factors, for example, whether or not the last transmitted location information is within a certain time-frame of the current time, whether a certain cycle for transmission of the location information is reached, whether a certain minimum distance has been covered by the device as calculated from the identification of the cellular base station information received from decoding the packets and frames at the communication module, and other forms of identifying that the transmission of the location information to the EMS or a locationing center is due. Responsive to this determination, the user communication device may transmit the latest location information to the EMS or locationing center. Some embodiments include a method for sending the latest location information, stored at the user communication device, to the EMS or a locationing center on a periodic basis.

Also disclosed herein are aspects and embodiments of a method performed at a EMS or a locationing center to detect that a certain user communication device has requested emergency assistance, and this request for emergency assistance has been routed to the latest EDC associated with the user communication device. Based on an analysis at the EMS or a locationing center done over a period of time, over a certain number of update cycles, or after not receiving periodic information update for certain periodicity cycles, that the location information of the user communication device may be significantly different from the stored location information at the EMS or a locationing center, the EMS or locationing center may request the user communication device, or any other device on the network capable of, or possibly storing, location information about the user communication device, to transmit the latest location information of the user communication device. Upon receiving this location information, the EMS or locationing center may query a location database for an EDC serving the latest location of the user communication device. If the EDC serving the latest location of the user communication device is different than the EDC currently processing the request for emergency assistance, the EMS or locationing center may forward the request for emergency assistance to the new EDC and managing the communication between the new and previous EDC to ensure the new EDC is able to process the request for emergency assistance received from the user communication device.

In accordance with one aspect, there is provided a method for a locationing center placed inside of a service network, for example, a call center or a gateway mobile location center (GMLC), that is responsible for identifying the current location of a user communication device, or an emergency management system (EMS), to receive, either via requesting or by the user communication device sending on its own accord, location information derived from various methods, for example, GPS position information or position information derived from the cellular network provider via triangulation of the received signal strengths from 3 separate cellular phone base stations, or location information derived from received signal strengths indicators received at a Wi-Fi router and signal strengths of signals received at a Wi-Fi router of digital signals sent from the user communication device, from the user communication device on a periodic or as-needed basis so that the locationing center or EMS is aware of the latest location of the device in a proactive fashion, and is aware of any significant changes in the location of the user communication device, including a change of location of the user communication device from the service area of a given EDC to the service area of another EDC. Further, in this embodiment the locationing center or EMS, can query a location database, for example, a SRDB, with the location information received from the user communication device, and receive in response an indication of an EDC that serves the latest location estimate of the user communication device. Based on this updated information about the EDC serving the latest location of the user communication device, the locationing center is able to associate the information about the EDC with the user communication device as the preferred EDC to be called if a request for emergency assistance is received from the user communication device. Further, in such an embodiment, when a locationing center or an EMS receives a request for emergency assistance from a user communication device, and the location information available with the locationing center or the EMS about the user communication device is not updated for a certain period of time, the locationing center or EMS sends a request to the user communication device, and/or other devices in the network, for example, a cellular tower or other locationing centers, for receiving from them the latest updated location information about the user communication device. The locationing center or EMS updates the EDC if the received updated location of the user communication device is different from the saved location at the locationing center or EMS.

In certain embodiments the user communication device hosts an application client and sends the location information on a periodic basis, or as triggered by events, to the locationing center or an EMS. The user communication device also uses this application client to respond to requests from the locationing center or EMS for updated location information. The user communication device also, if needed, sends a request for emergency assistance to an EDC via this application client. The application client manages the connection between the user communication device and the locationing center or EMS.

In certain embodiments, the user communication device is a mobile communication device, for example, a Smart Phone, a wearable device, a Tablet Computer, or another device enabled to communicate over a data channel.

In certain embodiments, the user communication device uses locationing services provided by an enterprise wherein the location information about the device is derived from the physical or network address of a network router, for example, a Wi-Fi router or a Ethernet router placed within the enterprise network.

In certain embodiments, the location of the user communication device is defined using a coordinate system, for example, an "X-Y" coordinate system, where the latitude and longitude of the location of the device are provided and the locationing center or EMS and the user communication device are able to geographically locate the actual position of the device using this latitude and longitude information.

In certain embodiments, the location of the user communication device is defined using location and identification information of at least 3 cellular towers that the user communication device is, or was previously, associated to, the 3 or more cellular towers having coverage areas that are overlapping or adjoining to each other.

In certain embodiments, the user communication device updates a third party, for example, a network device, Wi-Fi router, or another call center from a different network than the one the device is currently connected to, for example a network the user communication device was connected to immediately prior to the current network.

In certain embodiments, the data channel between the user communication device and the locationing center or EMS is a SIP data channel or a H.323 data channel.

Other embodiments, aspects, and features of the disclosure will become apparent to those skilled in the art from the present disclosure, including the following detailed description, the accompanying drawings, and the appended claims.

In some embodiments, provided herein are methods for a user communication device to share updated location information with a locationing center, the method comprising: determining, at the user communication device a current location of the user communication device; transmitting an indication of the current location of the user communication device to a locationing center and/or EMS on one of a periodic basis or upon occurrence of a certain specific event; confirming reception of the transmission of the indication of the current location of the user communication device with the locationing center and/or EMS; updating a local database at the locationing center and/or EMS and identifying the current location of the user communication device as a most current location of the user communication device; and querying, by the locationing center and/or EMS, a location database using the most current location of the user communication device; receiving from the location database in response to querying the location database using the most current location of the user communication device, an identity of a first EDC that serves a best estimated location of the user communication device; associating the first EDC with the user communication device in the local database such that the first EDC is contacted if a request for emergency assistance is received from the user communication device at the locationing center and/or EMS in the absence of new information being received regarding the location of the user communication device; actively managing the location information of the user communication device by the locationing center and/or EMS; updating the EDC, by the locationing center, about latest received location information of the user communication device on one of a periodic basis or upon occurrence of a certain specific event; and managing location information for any active request for emergency assistance that the first EDC is currently responding to. In some embodiments, the current location of the user communication device is determined autonomously by the user communication device. In some embodiments, the current location of the user communication device is determined by information input by a user into the user communication device. In some embodiments, the locationing center is one of a call center, a gateway mobile location center, or an EMS, and transmitting the indication of the current location of the user communication device to the locationing center includes transmitting the indication of the current location of the user communication device to one or more of the call center, gateway mobile location center, or EMS. In some embodiments, transmitting the indication of the current location of the user communication device to the locationing center and/or EMS upon occurrence of the certain specific event includes transmitting the indication of the current location of the user communication device to the locationing center and/or EMS upon one or more of movement of the user communication device from a service area of one EDC to a service area of another EDC or determination if a difference between two different time-samples of the location is above a specified amount. In some embodiments, the locationing database is an SRDB. In some embodiments, the method further comprises receiving, at the locationing center and/or EMS, an indication of the location of the user communication device from a network device other than the user communication device. In some embodiments, associating the EDC with the user communication device includes associating identification information about the EDC and an area the EDC serves with the user communication device. In some embodiments, the method further comprises initiating, at the locationing center and/or EMS, a request for verification of the latest location information available at the locationing center about the user communication device responsive to receiving a request for emergency assistance from the user communication device after a certain minimum time-period after the last location update regarding the user communication device was received at the locationing center and/or EMS if within this time-period no new location information for the user communication device was solicited by the locationing center and/or EMS. In further embodiments, the method further comprises: responsive to receiving updated location information for the user communication device at the locationing center and/or EMS and responsive to a request for emergency assistance received from the user communication device being currently responded to, querying, by the locationing center and/or EMS, the location database using the updated location information; receiving, from the location database in response to querying the location database using the updated location information, information about a second EDC that serves an area associated with the updated location information; responsive to the request for emergency assistance being already sent to a third EDC other than the second EDC, re-sending the request for emergency assistance to the second EDC and informing the third EDC about the updated location information and the communication status with the second EDC; and responsive to the request for emergency assistance not yet being responded to by any EDC, sending the request for emergency assistance to an EDC serving an area containing the latest location of the user communication device. In some embodiments, the user communication device hosts an application client and sends and receives all pertinent communication, including periodic location information, or location information sent upon occurrence of a certain specific event, and the request for emergency assistance to the EDC and/or an EMS via this application client, the application client managing connections between the user communication device and all other communication devices. In further embodiments, the application client manages connections between the user communication device and the locating center and/or EDC and/or EMS. In some embodiments, the location of the user communication device is determined using one of GPS positioning information derived from GPS coordinates, position information derived from a cellular network via triangulation of received signal strengths from 3 separate cellular network base stations, location information derived at the user communication device from received signal strengths indicators received from Wi-Fi routers and/or cellular network base stations, and signal strengths of signals received at a Wi-Fi router of digital signals sent from the user communication device and the Wi-Fi router sending the derived location to the device. In some embodiments, the user communication device maintains a time-stamp of the transmission of the location information to the locationing center and/or EMS and based on this time-stamp information makes a decision on the transmission of the next location information to the locationing center and/or EMS. In some embodiments, the locationing center and/or EMS maintains a time-stamp of the reception of the location information from the user communication device and based on this time-stamp information makes a decision to send a request for verification of the location information of the user communication device, and to receive from the user communication device a latest location information about the device. In some embodiments, the user communication device is a smart device capable of communicating over a data communication channel and sending location information on a periodic basis or upon occurrence of a certain specific event, and responding to requests from the locationing center and/or EMS and correspondingly sharing location information with the locationing center and/or EMS. In some embodiments, the locationing center and/or EMS, gains location information about the user communication device via other devices including one or more of other user communication devices, a network device, a cellular tower, a base station, a Wi-Fi router, another locationing center, or another EMS, the location of the user communication device being determined one of autonomously by the other device or via interaction with the user communication device.

In another aspect, provided herein are user mobile communication devices configured to send data communication packets to, or receive data communication packets from other user communication device, a locationing center, or an EMS, the user communications device comprising: a user interface configured to display alerts to the user of the user communication device, these alerts including information sent from a locationing center and/or EMS containing a request for sharing location information from the user communication device; and physical interaction components; a communications module configured to send and receive messages over a communications network including one of a data communication network and an analog communication network; and a processor configured to: determine a location of the user communication device and store an indication of the location on a memory within the user communication device; periodically and/or upon occurrence of a certain specific event, send an indication of the location to a locationing center and/or EMS that the user communication device is associated with, and receive confirmation from the locationing center and/or EMS about reception of the updated location information; responsive receiving a request, from a communication module of the user communication device, and sent from a locationing center and/or EMS for sharing the location, send latest location information about the user communication device, determined and stored at a memory of the user communication device by the processor, to the communication module and addressed to the locationing center and/or EMS; responsive to receiving a request to validate the location of the user communication device, send a validation of the location stored at the locationing center and/or EMS; and establish and manage data communications links with the locationing center and/or EMS and/or any other component of a service network to share and validate the location at the service network on a periodic basis and/or upon occurrence of a certain specific event. In some embodiments, the user communication device does not have a location identification module on the device and the location determination is done via communicating with other devices, in the network for example a GMLC, or outside the network for example a GPS location service, and receiving from these other device the location of the device. In some embodiments, the user communication device has a location identification module including one of a GPS module or a cellular network triangulation module, and the location determination is done via the location identification module. In some embodiments, the user communication device determines its location based on one of GPS positioning information derived from GPS coordinates, position information derived from a cellular network via triangulation of received signal strengths from 3 separate cellular network base stations, location information derived at the user communication device from received signal strengths indicators received from Wi-Fi routers or cellular network base stations, and signal strengths of signals received at a Wi-Fi router of digital signals sent from the user communication device and the Wi-Fi router sending the derived location to the device, and any other form of location determination process used at the user communication device and/or on a network device and shared with the user communication device.

In another aspect, provided herein are emergency management systems (EMS) containing at least one first computing system and at least one first communications system, the EMS comprising: at least one first input/output (I/O) system configured to receive data messages from a user communication device over a data communication channel, the messages containing location information about the user communication device and to receive response messages from the user communication device to a request sent by the at least one first computing system of the EMS for validating location information over at least one first I/O channel; a communications module configured to send and receive messages formatted to be sent over data communication networks and/or analog voice channels, and containing a request for location information from the user communication device over the at least one first I/O channel; and at least one first processing unit in communication with the at least one first I/O system and the communication module and configured to: receive messages from the at least one first communication module containing location information about the user communication device, the messages received one of in response to a request for sharing the location information from the EMS or by initiation from the user communication device, via the at least one first I/O system, interpret the location information received in the messages, extract and store the location information in a memory local to the EMS, and associate the location information with the user communication device in a database local to the EMS; verify the stored location information as being latest location information representing the current location of the user communication device and, based on the verification of the location information, initiate a request for updating the location information of the user communication device at the EMS, and send the request for updating the location information via the communications module to the user communication device via the at least one first I/O system; periodically receive updated location information of the user communication device from the user communication device, send a query including the updated location information to a location database, receive and store information about an EDC that serves the updated location of the device, and update a memory of the EMS and a local database hosted within the EMS with the information about the EDC and associate the information about the EDC with the user communication device; and actively manage data communication links between the EMS, the user communication device, and an emergency dispatch center. In some embodiments, the EMS verifies the stored location information as being the latest location information representing the current location of the user communication device via one of analyzing a time-stamp of latest received location information, distance moved by the user communication device over a period of time based on a multiple of the previous received location information, the last associated cellular network base station by the device, and other means of verifying the stored location information.

Location Tracking of First Responders

When a request for assistance is received by an emergency dispatch center (EDC), an emergency management system (EMS), or another emergency response unit, for example, a response center for an enterprise, the dispatch center, response center, or EMS aims to allocate a group of first responders, for example, a group of fire fighters or emergency medical technicians, who then respond to the emergency situation, and in certain instances, the location of the first responders with respect to the geographic position of the emergency situation is tracked by the dispatch center. This location information regarding the first responders in normally not available to an EDC, for example, a PSAP, an EMS, or another dispatch center, for example, a response center for an enterprise. The dispatch center can generally access information regarding the location(s) of the first responders by contacting the first responders directly. The personnel at the dispatch center may relay this information to the people requesting emergency assistance if the people request this information from the dispatch center. This process, however, results in further delays for the people requesting emergency assistance in terms of knowing how long it will take for assistance, via first responders, to reach them.

Therefore, in some aspects, provided herein are methods for allowing a EDC, EMS, or any other dispatch center, for example, a security office at an enterprise, or any other dispatch center based on the NG911 standard, to gather and store, in a primary memory unit housed in the dispatch center, location based meta-data information regarding first responders assigned to and responding to a request for emergency assistance. The location based meta-data may be gathered using one or more of various techniques, for example, GPS location information, cellular base station triangulation information, Wi-Fi positioning information, and other indicators of position of the user communication devices of the first responders. This location data may be available via various sources to the EDC and/or EMS, for example, from the user communication device(s) of the first responders, the service network of the user communication device(s) and other sources. This location based meta-data information may be useful to the personnel at a dispatch center, and to users requesting emergency assistance, in knowing the relative location of the first responders to the location of the user communication device, or the location of the emergency situation. This location based meta-data information may be conveyed to the user communication device of the user requesting emergency assistance in a format that is compatible with industry standards for storing and retrieving location based meta-data information. Further in such an embodiment an EDC, EMS, or any other dispatch center, for example, a security office at an enterprise, or any other dispatch center based on the NG911 standard, may estimate the time of arrival of the first responders responding to the request for emergency assistance received from, or on behalf of, the user of a user communication device. This time may be estimated based on various geographic information, available to the EDC, EMS, security office of the enterprise location, or any other dispatch center based on the NG911 standard, for example, terrain information, traffic information, weather information, and any other form of geographic information, and updated location based meta-data information about the communication devices of the first responders. The estimated time of arrival information may be stored at the dispatch center in a primary memory unit housed in the dispatch center in a format that is compatible with industry standards. The estimated time of arrival may be shared with the user communication device over an IP based network, for example, the Internet. The estimated time of arrival may be updated as new geographic information is received and the updated estimated time of arrival may be shared with the user communication device.

Further, in such an embodiment, the user communication device may be able to receive the location based meta-data information and the estimated time of arrival information from the EDC, EMS, security office of the enterprise location, or any other dispatch center based on the NG911 standard, and display this information via an I/O system of the user communication device in an interactive fashion, for example, on a geographic map of the location with indication of the estimated time of arrival of the first responders via a visible indication on the map along with the indication of the relative distance of the first responders to the location of the user communication device, or the location of the emergency situation. The user communication device may update this information on the interactive display as and when updated estimated time of arrival information is received. Further, in such an embodiment, the user communication device may update the location information of the device with the EDC, EMS, security office of the enterprise location, or any other dispatch center based on the NG911 standard. Based on this location update the dispatch center may update the estimated time of arrival of the first responders to the best estimated location of the user. The user communication device may update the interactive display on the user interface or I/O system on the user communication device to include an updated distance estimate between the best estimated location of the user of the user communication device and the first responders.

In some embodiments, the location based meta-data information contains information about the geographic location of the first responders that are assigned to and responding to the request for emergency assistance received from the user of the user communication device, and geographic location information about other first responders, in the vicinity of the best estimated location of the user communication device, and/or the location of the emergency situation. The user communication device may display an indication of the location of the other first responders whose location information is received by the user communication device in the location based meta-data information received from the EDC, EMS, security office of the enterprise location, or any other dispatch center based on the NG911 standard.

In some embodiments, the location based meta-data information regarding the location of the first responders, is determined based on various means including GPS location, history of GPS locations, cellular base station triangulation information from the most recent base station the device is associated with, Wi-Fi positioning information, and/or other forms of location information determination.

In some embodiments, the user communication device contains an application client, implemented in software, to analyze the received location based meta-data information about the first responders, and display this information via an I/O system of the user communication device in an interactive fashion, for example, on a geographic map of the location with indication of the estimated time of arrival of the first responders via a visible indication on the map along with the indication of the relative distance of the first responders to the location of the user communication device, or the location of the emergency situation. The user communication device may update this information on the interactive display as and when updated estimated time of arrival information is received.

In some embodiments, user communications devices of both the first responders and the users requesting emergency assistance, comprise portable electronic devices selected from the group consisting of a smart phone, a tablet computer, a laptop computer, and a wearable smart device or other form of Internet enabled portable electronic device capable of detecting and sharing location based meta-data information and capable of displaying location based meta-data information on a user interface, for example, a digital display interface.

Aspects and embodiments disclosed herein provide for a method for autonomously detecting at an EMS, using available meta-data about a user, data available about first responders responding to an emergency situation, information available about a user communication device of the user, and information available about the emergency situation, the estimate of the location of the first responders. In some instances these first responders are first responders who are in the process of responding to a request for emergency assistance from the user. In some embodiments, a relative distance of the first responders from the user of the user communication device is derived from location information of the user and location information of the first responders. In some embodiments, an estimated time of arrival of the first responders at the location of the user communication device, or the estimated location of the user, or the location of the emergency situation is derived from location information of the user and location information of the first responders. In some embodiments, this information is communicated in a format that is compatible to industry standards for sharing location based meta-data information to the user communication device of the user requesting emergency assistance and/or to other communication devices, for example, a communication device at an EDC that is participating in the process of providing emergency assistance to the user.

Also disclosed herein are aspects and embodiments of a method for updating information at an EMS and/or EDC regarding location based meta-data information of the first responders or about the user communication device of the user requesting emergency assistance, and for the EMS and/or EDC to update the estimate of the relative distance and time of arrival of the first responders to the location of the user communication device, or the emergency situation, and for providing this updated information to the user of the user communication device and to other communication devices of entities participating in the process of providing emergency assistance to the user.

Also disclosed herein are aspects and embodiments of a method of updating and displaying location based meta-data information at a user communication device in an interactive fashion, for example, displaying the information on a map. The method may further include displaying the received relative distance of the first responders from the user of the user communication device, and the estimated time of arrival of the first responders to the location of the user communication device or to the location of the emergency situation.

In some aspects, provided herein are methods for an emergency management system (EMS) or an emergency dispatch center (EDC) to communicate the location of first responders to a user communication device of a user calling for emergency assistance, the method comprising: determining, by the EMS and/or EDC, location information including an estimated location of first responders assigned to and responding to an emergency situation that the user has requested emergency assistance for; calculating, at the EMS and/or EDC, one of an estimated distance from a location of the user communication device and the estimated location of the first responders, a location of the first responders relative to the location of the user communication device, or a location of the first responders relative to a location of the emergency situation, and an estimated time of arrival of the first responders to one of the location of the user communication device or the location of the emergency situation; and transmitting the location information to the user communication device along with the one of the estimated distance from the location of the user communication device and the estimated location of the first responders, the location of the first responders relative to the location of the user communication device, or the location of the first responders relative to the location of the emergency situation and the estimated time of arrival. In some embodiments, the method further comprises formatting the location information as location based meta-data information in a format that is compatible with industry standards for storing and sharing location based meta-data information, the industry standards including standards set for storing and accessing location information for legacy systems based on circuit switched networks and for conventional packet switched communication systems. In further embodiments, the method further comprises storing the one of the estimated distance from the location of the user communication device and the estimated location of the first responders, the location of the first responders relative to the location of the user communication device, or the location of the first responders relative to the location of the emergency situation and the estimated time of arrival in the primary memory unit housed in the EMS and/or EDC in a format compatible with the industry standards. In yet further embodiments, the method further comprises transmitting the location information to the user communication device along with the one of the estimated distance from the location of the user communication device and the estimated location of the first responders, the location of the first responders relative to the location of the user communication device, or the location of the first responders relative to the location of the emergency situation and the estimated time of arrival in the format compatible with the industry standards. In some embodiments, the method further comprises storing the location based meta-data information in a primary memory unit housed in the EMS and/or EDC. In some embodiments, the method comprises transmitting the location information to the user communication device along with the one of the estimated distance from the location of the user communication device and the estimated location of the first responders, the location of the first responders relative to the location of the user communication device, or the location of the first responders relative to the location of the emergency situation and the estimated time of arrival over an IP-based network. In some embodiments, the method further comprises, responsive to determining that there is updated location based meta-data information regarding the first responders or the user communication device, re-calculating the one of the estimated distance from the location of the user communication device and the estimated location of the first responders, the location of the first responders relative to the location of the user communication device, or the location of the first responders relative to the location of the emergency situation and the estimated time of arrival. In further embodiments, the method further comprises sending the re-calculated one of the estimated distance from the location of the user communication device and the estimated location of the first responders, the location of the first responders relative to the location of the user communication device, or the location of the first responders relative to the location of the emergency situation and the estimated time of arrival to the user communication device. In yet further embodiments, the method comprises sending the re-calculated one of the estimated distance from the location of the user communication device and the estimated location of the first responders, the location of the first responders relative to the location of the user communication device, or the location of the first responders relative to the location of the emergency situation and the estimated time of arrival to the user communication device in a format that is compatible with the industry standards. In yet further embodiments, the method comprises storing a updated copy of the one of the estimated distance from the location of the user communication device and the estimated location of the first responders, the location of the first responders relative to the location of the user communication device, or the location of the first responders relative to the location of the emergency situation and the estimated time of arrival in a primary memory unit housed in the EMS and/or EDC. In still yet further embodiments, the stored location based meta-data information in the primary memory unit is updated in real-time and the estimate of the relative location and the time of arrival is calculated/re-calculated for each location update. In some embodiments, the method further comprises actively managing location based meta-data information associated with the user and with the first responders, formatting, calculations, or storage performed on the meta-data, and communication of the location based meta-data information to the user communication device, and/or sharing of the location based meta-data information between the EMS and/or EDC and any other communication devices hosted on the Internet and participating in a process of providing emergency assistance to the user. In some embodiments, the method further comprises formatting the location information as location based meta-data information in an extensible markup language (XML) format by one of the EMS and/or EDC, a security office of an enterprise location, or any other dispatch center based on the NG911 standard. In further embodiments, the method further comprises transmitting the location based meta-data information to the user communication device over an Internet Protocol (IP) data channel using hyper-text transfer protocol (HTTP). In some embodiments, the method further comprises formatting the location information as location based meta-data information and collecting and transmitting the location based meta-data information using an application client hosted on a machine that is part of the EMS and/or EDC, the application client being capable of communicating with the user communication device via a communication module of the user communication device, being capable of receiving from the user communication device a request to share the location based meta-data information formatted as per industry defined standards for sharing location based meta-data information for purpose of emergency response, and being capable of including any estimate of the relative location and estimated time of arrival of the first responders in communications with the user communication device. In some embodiments, the estimated distance from the location of the user communication device and the estimated location of the first responders is calculated based on information about the location of the first responders and the user communication device including one or more of GPS location information, Wi-Fi based location information, cellular tower triangulation information, location information from various interactions with the first responders, or information from communication routers present in a network providing access to the user communication device and/or a communication device of the first responders. In some embodiments, the estimated distance from the location of the user communication device and the estimated location of the first responders is calculated based on information about the location of the first responders and the user communication device including one or more of geographic spatial information about the environment from sources of geographic information including one or more of terrain information, traffic information, or weather information, and geographic information pertaining to the estimated location of the first responders and the user communication device derived from a source including one or more of the government, a weather prediction center, a public events database, a traffic information center, freely available public information, or other private sources. In further embodiments, the other private sources include one of a security office of an enterprise location providing unique information about characteristics of building structures and/or campus area of an enterprise, or a third party operated environmental information source. In yet further embodiments, the third party operated environmental information source includes road traffic information from Google Inc.

In some aspects, provided herein are methods for a user communication device to receive location based meta-data information regarding first responders from an EMS and/or EDC, and to display and store the information, the method comprising: receiving location based meta-data pertaining to an emergency situation that a user of the user communication device is facing at the user communication device; determining an estimated distance of first responders responding to the emergency situation from information provided by the EMS and/or EDC, the information provided by the EMS and/or EDC including one of an estimated current location of the user, an estimated current location of the user communication device, or an estimated current location of location of the emergency situation, and an estimated time of arrival of the first responders; and displaying the received location based meta-data information, estimated distance, and estimated time of arrival on an I/O system of the user communication device. In some embodiments, the method further comprises storing the location based meta-data information, the estimated distance, and estimated time of arrival on a primary memory unit of the user communication device. In some embodiments, the method further comprises displaying the received location based meta-data information, estimated distance, and estimated time of arrival on the I/O system of the user communication device in an interactive fashion. In further embodiments, the location based meta-data information received from the EMS and/or EDC is presented in an interactive fashion to the user using a geographic map displayed on a user interface of the user communication device. In some embodiments, the method further comprises, responsive to determining that the user communication device received updated location based meta-data information from the EMS and/or EDC, updating the display of the location based meta-data information on the I/O system. In further embodiments, the updated location based meta-data information is received from the EMS and/or EDC in real-time at the user communication device. In yet further embodiments, the updated location based meta-data information is presented to the user on a user interface of the user communication device in an interactive fashion. In still yet further embodiments, the user communication device displays the updated location based meta-data information using a geographic map on a display on the user communication device. In further embodiments, the updated location based meta-data information is presented in an interactive fashion to the user using text based information and is displayed on a user interface of the user communication device. In yet further embodiments, the updated location based meta-data information is received from the EMS and/or EDC in real-time at the user communication device, and the updated location based meta-data information is presented to the user on the user interface using text based information in an interactive fashion. In further embodiments, the updated location based meta-data information is presented in an interactive fashion to the user using images and/or video based information and is displayed on a user interface of the user communication device. In yet further embodiments, the updated location based meta-data information is received from the EMS and/or EDC in real-time at the user communication device, and the updated location based meta-data information is presented to the user on the user interface of the user communication device using image-based information in an hold and refresh fashion if the location based meta-data information is presented to the user using images, or by updating a video if the location based meta-data information is presented using a video format.

In some aspects, provided herein are emergency management systems (EMS) or emergency dispatch centers (EDC), containing a communications system, the EMS or EDC configured to determine location based meta-data information regarding first responders assigned to and responding to a request for emergency assistance received from a user communication device and to share this information with other devices, the EMS or EDC comprising: at least one input/output (I/O) system configured to: share the location based meta-data information with other devices via a data communication network in a format that is compatible with industry standards for storing and sharing such information; and receive, from the user communication device, one of a request for updated location based meta-data information or information including meta-data providing an indication of a location of the user communication device; and at least one processing unit in communication with the at least one I/O system and configured to: receive location information regarding the first responders from the at least one I/O system; receive location information regarding one or more of the user communication device or the emergency situation from the at least one I/O system; calculate one of an estimated distance between a location of the user communication device and the location of the first responders, a relative location between the first responders and the location of the user communication device, a relative location between the first responders and a location of an emergency situation, and the estimated time of arrival of the first responders to one of the location of the user communication device or the location of the emergency situation; and share the location information regarding the first responders with the user. In some embodiments, the at least one processing unit is further configured to store the location information regarding the first responders in an industry acceptable format at a primary memory unit at the EMS or EDC. In some embodiments, the at least one processing unit is further configured to store the one of the estimated distance between the location of the user communication device and the location of the first responders, the relative location between the first responders and the location of the user communication device, the relative location between the first responders and a the location of the emergency situation, and the estimated time of arrival of the first responders to one of the location of the user communication device or the location of the emergency situation along with the location based meta-data information in a primary memory unit housed in the EMS or EDC in a format that is compatible with the industry standards for storing and sharing location based meta-data information. In some embodiments, the at least one processing unit is further configured to communicate with a server of the EMS or EDC housing a memory unit including personal information associated with the user via a communications network of the EMS or EDC, and read the personal information from the memory unit. In some embodiments, receiving the location information regarding the one or more of the user communication device or the emergency situation from the at least one I/O system includes requesting meta-data transmitted from the user communication device from the at least one I/O system and interpreting the meta-data transmitted from the user communication device. In some embodiments, the at least one processing unit is further configured to share the location information regarding the first responders with the user by one of sending the information to the user communication device in an industry acceptable format, or transmitting the location information regarding the first responders over a data communication channel. In further embodiments, the data communication channel is the Internet.

In another aspect, provided herein are user communication devices configured to receive, display, and store location based meta-data information, the user communication device comprising: a user interface; a communications module; a location determination module; and at least one processing unit in communication with the communications module and configured to: receive an indication of a location of the user communication device from the location determination module; receive location based meta-data information including a location of first responders from the communications module; one of calculate an estimated distance and time of arrival of first responders to the location of the user communication device and/or a location of an emergency situation a user of user communication device is facing, or receive the estimated distance and time of arrival of first responders to the location of the user communication device and/or the location of an emergency situation from an Emergency Management System (EMS) via the communications module; and display one or more of the received location based meta-data information, the estimated distance, or the estimated time of arrival in the user interface. In some embodiments, the communications module is configured to send and receive messages including location based meta-data information over a multitude of communication channels and networks. In some embodiments, the processor is further configured to display the received location based meta-data information, including the estimated distance and the estimated time of arrival in an interactive fashion for the user of the user communication device in the user interface. In some embodiments, the processor is further configured to periodically determine if the location of the user communication device has changed significantly since a last time the location information was shared with an EMS. In some embodiments, the processor is further configured to determine if the location of the user communication device has changed significantly since a last time the location information was shared with an EMS based on the occurrence of a certain event. In some embodiments, the processor is further configured to, responsive to detecting a change in the location information of the user communication device, share updated location information regarding the user communication device with the EMS. In some embodiments, the processor is further configured to update the display of the location based meta-data information in the user interface responsive to receiving one of or more of updated location based meta-data information regarding the user communication device, updated location based meta-data information regarding the first responders, an update in the estimated distance, or an update in the estimated time of arrival of the first responders from the EMS. In some embodiments, the processor is further configured to manage the location based meta-data information including the estimated distance and time of arrival of the first responders, received by the user communication device from the EMS, and store this information on a primary memory unit of the user communication device. In some embodiments, the system further comprises at least one memory unit configured to: store location based meta-data information in a format compatible with industry standards for the transmission and reception and storage of location based meta-data information; and periodically, upon specific request from the processor, or upon reception of new location based meta-data information pertaining to a user and/or a user communication device for which the at least one memory unit has already stored location based meta-data information, update the location based meta-data information within the memory unit for the specific user and/or user communication device.

Facilitating Data Exchange

User communication devices have historically lacked the ability to share meta-data information, for example, location information determined by the device about the user or the user communication device with an EDC and/or an EMS, that the user has called for assistance with an emergency situation due to lack of a process to enable such a data transfer. Further, in many instances meta-data information obtained and stored by a user communication device has not been stored in a format that could be interpreted by a typical EDC to extract, for example, location information from the meta-data information regarding the user or the user communication device, even if the user communication device was capable of sharing the meta-data information with the EDC and/or the EMS. The reasons for such meta-data information not historically being shared between user communication devices and EDCs also include the historical inability of EDCs and/or PSAPs to receive meta-data in a digital format autonomously, or upon a manual request, from a user communication device.

Typical user communication devices, however, lack the ability to share this location specific meta-data information regarding the user communication devices, either in an emergency situation or in general, with other user communication devices, for example, a first responder's communication device, an EDC, an EMS, a third party participating in the process of providing an emergency response, or emergency services communication devices in general. Various industry defined standards for interoperability between communication devices participating in an emergency response process, for example, the standard "National Emergency Number Association (NENA) Standard Data Format for ALI Data Exchanges and GIS Mapping" define a specific format in which location based meta-data can be stored and shared with an EDC from a user communication device. This standard is not typically used by user communication devices that have the ability to sense and store location based meta-data, for example GPS position data, and hence, user communication devices typically do not format location based meta-data in a format that may be easily shared with an EDC, an EMS, or with an multi-media router capable of updating a location database, for example, an ALI database, even if there was a process for the device to share the meta-data on an autonomous basis with the EDC, EMS, or multi-media router. Further, with the convergence of data and voice communication systems for communication network services, EDCs are increasingly acquiring the ability to communicate over digital channels, and as a result the queries performed by an EDC for looking up the location of a device is different from the conventional look up queries performed with an ALI database, or a MSAG database, and are normally in a digital format over data communication channels.

In accordance with one aspect disclosed herein, there is provided a method for a location information database to determine, store, and retrieve location based meta-data information pertaining to a certain user and/or a user communication device. The location based meta-data information is stored in a primary memory unit housed in the location information database in a format that is compatible with industry standards for storing and retrieving the location based meta-data information. The location information database is able to receive a query, either as a query for a database request or a web resource request via a web resource accessing process, for example, a software application, for requesting location information pertaining to a certain user and/or a user communication device, authenticate the sender of the query, and respond to the query with the requested location information in a format that is compatible with existing industry standards for storing and retrieving location based meta-data information. The location information database is able to update the location based meta-data information for a certain user and/or a user communication device based on updated information received for the certain user and/or a user communication device. The location information database is able to format the location based meta-data information into a format that is compatible with industry standards for storing and retrieving the location based meta-data information on a pre-emptive basis and may store the information in a format that is accessible by a web resource accessing process, for example, a hyper-text transfer protocol based software application.

In some embodiments, the location information database determines the location of the user communication device associated with the user by interactions with the user communication device, with an intermediate device, for example, an Internet router that is providing service to the user communication device, and/or from any other interaction between the location information database and another device on the Internet.

In some embodiments, the location information database determines the location of the user communication device associated with the user based on various means including one or more of GPS location, history of GPS locations, cellular base station triangulation information from the most recent base station the device is associated with, Wi-Fi positioning information, and other form of location information.

In some embodiments, the location information database houses a secondary memory unit, and on a periodic basis, or based on occurrence of certain events, for example, a request from an EMS, retrieves the location based meta-data pertaining to certain user and/or a user communication device, formats the information for it to be compatible with industry standards for storing and retrieving location based meta-data information, stores this formatted location based meta-data information in an information display type that is compatible with a web resource access process, for example, the GET method of the hyper-text transfer protocol (HTTP), and maintains this information within the secondary memory unit for a certain period of time or until the occurrence of another event, for example, another request from the EMS to delete this secondary copy of the location based meta-data information pertaining to the certain user.

In some embodiments, the location information database receives a request for sharing the location based meta-data information via a database query to the primary memory unit for the access and retrieval of the location based meta-data information, and in other instances the request is received via a web resource access request, for example an HTTP GET request, and the location based meta-data information is accessed directly by the web resource access process from a secondary memory unit that stores the information in a type compatible with the web resource access process and formatted in an industry standard compatible method.

Aspects and embodiments disclosed herein provide for a method for autonomously determining and recording, at a location information database, location based meta-data information about a certain user or one or more user communication devices associated with the user, using available meta-data about the user, obtained either directly from the user communication device or from a network device that provides a service to the user communication device. The location based meta-data is stored in a format that is compatible with industry standards for storing and retrieving location based meta-data information for the purpose of emergency response. Also disclosed herein are aspects and embodiments of a method of providing location based meta-data information about a certain user or one or more user communication devices associated with the user, in an format that is compatible with industry standards, to an authorized communication device of a responder that is in the process of providing emergency assistance to a user who has requested emergency assistance via a user communication device from an EMS and/or EDC.

In some aspects, provided herein are methods for determining location information about a user and to store this information in a location information database for use in facilitating provision of emergency assistance for the user, the method comprising: determining location based meta-data information regarding the user and a user communication device associated with the user, by the location information database, based on interactions with the user communication device of the user; storing the location based meta-data information in a primary database that can be accessed by the location information database on demand; formatting, at the location information database, the location based meta-data information in a format that is compatible with industry standards for storing and retrieving location based meta-data information for the purpose of emergency response, the industry standards including standards set for storing and accessing location information for legacy systems based on circuit switched networks and for packet switched communication systems; responsive to detecting a request from a system responsible for receiving requests for emergency assistance, pre-formatting the location based meta-data information in a web accessible data type such that the location based meta-data information can be retrieved and stored by a device using a web resource access request that does not require a database query or authentication; responsive to detecting a request from a communication device of the system responsible for receiving requests for emergency assistance, authenticating the communication device to request and to receive the location based meta-data information; responsive to successfully verifying that the communication device is permitted to access and use the location based meta-data information, one of sending a formatted copy, or providing access to a web resource that has a pre-formatted version of the location based meta-data information for the user to the communication device; and actively managing the location based meta-data information, and any formatting performed on the location based meta-data information, stored in the location information database. In some embodiments, determining the location based meta-data information regarding the user further comprises interacting with devices on the Internet other than the user communication device of the user. In some embodiments, the location information database accesses the location based meta-data in the database responsive to receiving a request from a device responsible for providing emergency response services. In further embodiments, the device responsible for providing emergency response services is a communication device at an emergency dispatch center. In some embodiments, the system responsible for receiving requests for emergency assistance is an Emergency Management System (EMS). In some embodiments, the web accessible data type is in an extensible markup language format. In some embodiments, the communication device of the system responsible for receiving requests for emergency assistance is one of a communication device of an EMS and/or EDC, a router within a packet switched network, a device from one of a packet switched network and a circuit switched network that is responsible in part for providing communication services for emergency assistance, or a user communication device associated with the user. In some embodiments, the location based meta-data is formatted in an extensible markup language (XML) format by the location information database and transmitted over an Internet Protocol (IP) data channel using hyper-text transfer protocol (HTTP). In some embodiments, the request for receiving the meta-data information is received from an application programming interface hosted on a machine that is part of an EMS, the application programming interface being capable of formatting and transmitting a request to receive location based meta-data information to the location information database and further capable of receiving from the location information database the location based meta-data information formatted as per industry defined standards for sharing location based meta-data information for purpose of emergency response. In some embodiments, the location information database has a secondary database and on one of a periodic basis or on occurrence of an certain event, the location information database processes the stored information in the primary database of the location information database to be stored in the secondary database of the location information database, in a format that is accessible by a web resource accessing process and is in a format that is compatible to industry standards for storing and accessing location based meta-data information. In some embodiments, the stored data in the secondary database is stored in an extensible markup language (XML) format.

In some aspects, provided herein are location information databases configured to store location based meta-data information, the location information database comprising: a communications module configured to send and receive messages over a multitude of communication channels and networks; at least one first memory unit, the at least one first memory unit configured to: store location based meta-data information in a format compatible with industry standards for the transmission, reception, and storage of location based meta-data information; and one of periodically, upon specific request from the processor, or upon reception of new location based meta-data information pertaining to a user and/or a user communication device for which the at least one first memory unit has already stored location based meta-data information, update the location based meta-data information within the at least one first memory unit for the user and/or user communication device; and at least one processing unit in communication with the at least one first I/O system and configured to: receive an indication of a request from the at least one first I/O system and interpret the request to be a query for accessing specific location based meta-data pertaining to a certain user communication device associated with a certain user; interpret the query, and based on the interpretation of the query, access the specific location based meta-data from the at least one first memory unit, retrieve the specific location based meta-data from the at least one first memory unit, and format the specific location based meta-data in an industry standard format; send the formatted specific location based meta-data to the at least one first I/O system; receive a confirmation from the at least one first I/O system of successful reception of the formatted specific location based meta-data; and on one of a periodic basis or on the occurrence of a certain event, process stored location based meta-data information to be present in a secondary memory unit of the location information database in a format that is accessible by an authorized device without the need to send a query for the same and that is accessible via a web resource accessing protocol. In some embodiments, the web resource accessing protocol is one of a hypertext transfer protocol or a HELD protocol. In some embodiments, the location based meta-data is formatted in an extensible markup language (XML) format by the location information database and stored in the at least one first memory unit in the XML format. In further embodiments, the secondary memory unit of the location information database is accessed by a hyper-text transfer protocol.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux °, and Palm WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one compFIGuter program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

The following illustrative examples are representative of embodiments of the methods, devices, systems, and media described herein and are not meant to be limiting in any way.

Example 1 Dispatch Center Update

John is an avid outdoorsman and decides to go skiing for the weekend in a ski resort located about five hours away. He has to run some errands and ends up leaving late when it is already dark. During the long drive, John falls asleep at the wheel and crashes his car in a ditch on the side of the road. John wakes up in excruciating pain and realizes that his left leg is broken and that he is trapped in the wreckage of his car. Unfortunately, there is little traffic at this time of the night, and no one spots his vehicle laying hidden in the ditch. John pulls out his cell phone and calls 911. Software on his phone routes his 911 call through an emergency management system. The emergency management system pulls location information for John's phone from a location information database. However, the only location information available initially is cell tower triangulation. This leads to the emergency management system obtaining an inaccurate location for John's phone. The emergency management system then queries a database for the appropriate emergency dispatch center serving the jurisdiction where John is located and receives information on a first emergency dispatch center. The emergency dispatch center then routes the phone call to the first emergency dispatch center. An operator at the emergency dispatch center begins speaking with John and assessing his emergency situation. Meanwhile, the emergency management system continues to query John's phone for updated location information. Fortunately, there is a Wi-Fi network located a short distance away at a diner. John's phone uses strength of signal received from the Wi-Fi network to refine the location determined using cellular triangulation and obtain a more accurate location. This information is sent to the emergency management system, which then queries the database to determine whether the first emergency dispatch center services the jurisdiction where John is located. The database sends back information on a second emergency dispatch center that services John's location. The emergency management system then sends a message to the operator/dispatcher at the first emergency dispatch center who is speaking with John. The message tells the operator that John is the responsibility of another dispatch center and contains a link for the second emergency dispatch center. The operator selects the link, which establishes a communication channel with an operator at the second emergency dispatch center. The operator then speaks to the dispatcher at the second emergency dispatch center and transfers John's call to the second EDC. In addition, the EMS provides all location information obtained for John thus far to the second EDC. The second EDC sends an ambulance from the nearest hospital to John's location that stabilizes him, frees him from the wreckage, and takes him to the hospital. Thanks to the efficiency of the emergency response, John makes a full recovery.

Example 2 Location Tracking of First Responders

Dan is a cab driver in Los Angeles. One day, he is dropping off a passenger when his car experiences engine trouble and shuts off in the middle of the road. Dan immediately presses an emergency alert button on his vehicle console, which sends a communication back to a private emergency management system at the taxi company headquarters downtown for managing the taxi fleet. The on-duty manager Bob sees the alert and assigns one of their responder assets, an in-house tow truck, to retrieve Dan and his taxi. The EMS obtains location information from Dan's vehicle console (which has GPS) and location information from the tow truck. The EMS then determines an ETA for the tow truck based on the location for both vehicles, the distance between them, the traffic conditions, and the route being taken by the tow truck. The EMS sends a responder forecast to Dan, the forecast having the ETA and a map showing the location of the tow truck. Dan sees this information on the display of his vehicle console and feels relief that help will arrive soon. However, the tow truck driver gets distracted by a phone call while driving and runs a red light, smashing into another vehicle. The gas tank is ruptured, and fuel begins to leak out. The driver rushes out of the tow truck, which catches on fire as the fuel ignites. The tow truck driver pulls out his smart phone and activates an emergency application to send an emergency alert for a fire emergency to an emergency management system associated with government emergency dispatch centers. The EMS receives the emergency alert and establishes a communication session between the tow truck driver's smart phone and the EDC serving his location. Based on the fire emergency indication contained in the emergency alert, the EMS sends information indicating the fire emergency to the EDC and queries the EDC to determine whether firefighters have been dispatched. The EMS also queries for first responder information including an estimated time to arrival (ETA). In this case, the EDC does not provide location information for the firefighters, but does provide an ETA. The EMS relays this information to the tow truck driver's smart phone. He sees that the firefighters are estimated to arrive within 8 minutes. The driver then notices that the driver of the other car in the accident had forgotten his dog in the backseat. Although the fire was still small, the flames were starting to spread from the tow truck to the car. Realizing the firefighters were not going to arrive in time, the tow truck driver sprang into action and pulled the dog out through an open window. Shortly thereafter, the fire truck pulled up to the accident scene, and firefighters leapt out and put out the flames. Meanwhile, the on-site manager Bob has found out his tow truck was in an accident and has assigned another tow truck to retrieve Dan and his taxi. This updated information is relayed to Dan indicating that the responder assets assigned to his emergency have changed. Dan also receives a new ETA for the new tow truck heading his way.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An emergency management system (EMS) comprising at least one processor, a memory, a network element, and a computer program including instructions executable by the at least one processor to create a server application for storing and retrieving emergency data, the server application configured to:
   (a) obtain the emergency data for a mobile communication device wherein:
      (i) an emergency alert has been triggered on the mobile communication device; and
      (ii) the emergency data comprises a current location determined by the mobile communication device;
   (b) store the emergency data in one or more databases and associating the emergency data with a user of the mobile communication device;
   (c) receive a query for the emergency data associated with the user from a requesting party;
   (d) determine, using a non-authoritative geographic information system (GIS) database within the EMS, that the requesting party has jurisdiction over the emergency alert based at least on the current location of the mobile communication device, wherein the non-authoritative GIS database is configured to determine the jurisdiction of the requesting party independent of an authoritative determination of emergency call routing by an authoritative GIS database;

(e) obtain the emergency data from the one or more databases to provide to the requesting party based at least on the current location of the mobile communication device; and (f) return a response comprising the emergency data from the one or more databases-to the requesting party via a secure pathway.

2. The system of claim 1, wherein the current location is generated on the mobile communication device using at least one of GPS, cellular network triangulation, Wi-Fi triangulation, Bluetooth triangulation, received signal strength from at least one cellular base station, received signal strength of at least one Wi-Fi router, or received signal strength of at least one Bluetooth beacon.

3. The system of claim 1, wherein the server application is configured to calculate an estimate time of arrival of at least one responder dispatched to the current location by the requesting party.

4. The system of claim 1, wherein the query for the emergency data is received from the requesting party through a call handling application using APIs.

5. The system of claim 1, wherein the EMS is configured to return the emergency data in a data format compatible with industry standards comprising NG911, NENA, ALI or GIS standards.

6. The system of claim 1, wherein prior authorization to share location data is provided by the user.

7. The system of claim 1, wherein authorization for sharing location data with member devices in a group of devices is provided by the user.

8. The system of claim 1, wherein the EMS is configured to provide differential access to one or more data categories of the emergency data for different requesting parties.

9. The system of claim 8, wherein the differential access to one or more data categories of the emergency data is granted based on credentials or access keys provided by the requesting party.

10. The system of claim 1, wherein the query is in HTTP-Enabled Location Delivery (HELD) format, and the response is in Presence Information Data Format Location Delivery (PIDF-LO) format.

11. The system of claim 10, wherein the one or more data categories are selected from the group consisting of service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments.

12. The system of claim 1, wherein the emergency data comprises sensor data from an external sensor in communication with the mobile communication device.

13. The system of claim 1, wherein the emergency data comprises data from an associated device in proximity to the mobile communication device.

14. A method for storing and retrieving emergency data, by an emergency management system (EMS), the method comprising:

(a) obtaining the emergency data for a mobile communication device wherein:

(i) an emergency alert has been triggered on the mobile communication device; and (ii) the emergency data comprises a current location determined by the mobile communication device;

(b) storing the emergency data in one or more databases and associating the emergency data with a user of the mobile communication device;

(c) receiving a query for the emergency data associated with the user from a requesting party;

(d) determining, using a non-authoritative geographic information system (GIS) database within the EMS, that the requesting party has jurisdiction over the emergency alert based at least on the current location of the mobile communication device, wherein the non-authoritative GIS database is configured to determine the jurisdiction of the requesting party independent of an authoritative determination of emergency call routing using an authoritative GIS database;

(e) obtain the emergency data from the one or more databases to provide to the requesting party; and (f) returning a response comprising the emergency data from the one or more databases to the requesting party via a secure pathway.

15. The method of claim 14, wherein the current location is generated on the mobile communication device using at least one of GPS, cellular network triangulation, Wi-Fi triangulation, Bluetooth triangulation, received signal strength from at least one cellular base station, received signal strength of at least one Wi-Fi router, or received signal strength of at least one Bluetooth beacon.

16. The method of claim 14, wherein the EMS returns the emergency data in a data format compatible with industry standards comprising NG911, NENA, ALI or GIS standards.

17. The method of claim 14, wherein differential access to one or more data categories of the emergency data is provided to the requesting party.

18. The method of claim 14, wherein the emergency data comprises encrypted and anonymized medical data.

19. The method of claim 18, wherein the medical data is tagged to indicate HIPAA protection.

20. The method of claim 14, wherein the current location is stored temporarily after the query is received.

* * * * *